US012633679B2

(12) United States Patent
Neenan et al.

(10) Patent No.: US 12,633,679 B2
(45) **Date of Patent: *May 19, 2026**

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US); Rauhon Ahmed Shaik, Wylie, TX (US)

(73) Assignee: Parsec Technologies, Inc., Plano, TX (US)

(*) Notice: Subject to any disclaimer, the term of this patent is extended or adjusted under 35 U.S.C. 154(b) by 93 days.

This patent is subject to a terminal disclaimer.

(21) Appl. No.: 18/616,004

(22) Filed: Mar. 25, 2024

(65) Prior Publication Data

US 2025/0079683 A1 Mar. 6, 2025

Related U.S. Application Data

(63) Continuation-in-part of application No. 18/438,362, filed on Feb. 9, 2024.

(Continued)

(51) Int. Cl.

| | |
|---|---|
| ***H01Q 21/28*** | (2006.01) |
| ***H01Q 1/42*** | (2006.01) |
| ***H01Q 5/30*** | (2015.01) |

(52) U.S. Cl.

CPC ............... *H01Q 21/28* (2013.01); *H01Q 1/42* (2013.01); *H01Q 5/30* (2015.01)

(58) Field of Classification Search

CPC ............. H01Q 1/42; H01Q 5/30; H01Q 21/28

See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Daniel Munoz

(74) *Attorney, Agent, or Firm* — Knobbe, Martens, Olson & Bear, LLP

(57) ABSTRACT

An antenna assembly can include a cover, a base, an internal ground plane, a PCB, and a multi-band antenna. The base can be coupled to the cover to define an internal volume, with the internal ground plane positioned there between. The PCB can include a base PCB portion and a first PCB portion. The multi-band antenna can comprise a radiating element formed on the first PCB portion, the radiating element comprising an upright radiating portion and a head radiating portion. The radiating element can be configured to move from a first configuration prior to engagement with the cover to a second configuration when the cover is coupled to the base. In the first configuration, the upright radiating portion can be coplanar to the head radiating portion, and in the second configuration, the upright radiating portion can be at an angle relative to the head radiating portion.

20 Claims, 21 Drawing Sheets

Related U.S. Application Data

(60) Provisional application No. 63/584,445, filed on Sep. 21, 2023, provisional application No. 63/580,930, filed on Sep. 6, 2023.

(56) References Cited

U.S. PATENT DOCUMENTS

| | | | | |
|---|---|---|---|---|
| 6,111,550 | A | 8/2000 | Miller et al. | |
| 9,379,453 | B2 | 6/2016 | Rentz | |
| 10,224,615 | B2 | 3/2019 | Wu | |
| 10,312,583 | B2 * | 6/2019 | Ng | H01Q 21/28 |
| 11,283,149 | B2 | 3/2022 | Neenan et al. | |
| 11,329,363 | B1 | 5/2022 | Neenan et al. | |
| 11,658,382 | B2 | 5/2023 | Neenan et al. | |
| 11,664,574 | B2 | 5/2023 | Neenan et al. | |
| 11,909,090 | B2 | 2/2024 | Neenan et al. | |
| 11,936,094 | B2 | 3/2024 | Neenan et al. | |
| 12,057,641 | B2 | 8/2024 | Neenan et al. | |
| 12,212,035 | B2 | 1/2025 | Neenan et al. | |
| 12,266,845 | B2 | 4/2025 | Neenan et al. | |
| 2010/0253584 | A1 | 10/2010 | Yang et al. | |
| 2011/0080323 | A1 | 4/2011 | Thiam | |
| 2011/0102278 | A1 | 5/2011 | Rozan | |
| 2012/0146872 | A1 | 6/2012 | Chainon et al. | |
| 2012/0280882 | A1 | 11/2012 | Zimmerman | |
| 2014/0139387 | A1 | 5/2014 | Jones et al. | |
| 2014/0375507 | A1 | 12/2014 | Lin et al. | |
| 2015/0042521 | A1 | 2/2015 | Hazen | |
| 2015/0102974 | A1 | 4/2015 | Stoytchev et al. | |
| 2016/0172750 | A1 | 6/2016 | Ng | |
| 2016/0248148 | A1 | 8/2016 | Hill et al. | |
| 2016/0277062 | A1 | 9/2016 | Cheon et al. | |
| 2016/0285161 | A1 | 9/2016 | Apaydin et al. | |
| 2017/0062952 | A1 | 3/2017 | Sundararajan | |
| 2017/0237158 | A1 | 8/2017 | Gibson et al. | |
| 2017/0317428 | A1 * | 11/2017 | Petropoulos | H01Q 21/065 |
| 2017/0324171 | A1 | 11/2017 | Shehan | |
| 2017/0358842 | A1 | 12/2017 | Shehan | |
| 2018/0062731 | A1 | 3/2018 | Ng et al. | |
| 2018/0083348 | A1 | 3/2018 | Thiam et al. | |
| 2018/0109006 | A1 * | 4/2018 | Ng | H01Q 1/405 |
| 2018/0323513 | A1 | 11/2018 | Varnoosfaderani et al. | |
| 2019/0148825 | A1 | 5/2019 | Huerta et al. | |
| 2019/0237850 | A1 | 8/2019 | Fleischer et al. | |
| 2019/0305406 | A1 | 10/2019 | Williams | |
| 2019/0341674 | A1 | 11/2019 | Rosenthal et al. | |
| 2019/0356051 | A1 | 11/2019 | Barrera et al. | |
| 2020/0112101 | A1 | 4/2020 | Yun | |
| 2020/0350664 | A1 | 11/2020 | Thill | |
| 2020/0373668 | A1 | 11/2020 | Wu | |
| 2020/0411972 | A1 | 12/2020 | Hicks et al. | |
| 2021/0305718 | A1 | 9/2021 | Li | |
| 2021/0391655 | A1 | 12/2021 | Brobston et al. | |
| 2022/0384966 | A1 | 12/2022 | Chiang et al. | |
| 2023/0145053 | A1 | 5/2023 | Kilbury et al. | |
| 2023/0223709 | A1 | 7/2023 | Guntupalli | |
| 2023/0402732 | A1 | 12/2023 | Neenan et al. | |
| 2024/0097339 | A1 | 3/2024 | Khatua | |
| 2024/0113450 | A1 | 4/2024 | Neenan et al. | |
| 2024/0113451 | A1 | 4/2024 | Neenan et al. | |
| 2024/0128644 | A1 | 4/2024 | Neenan et al. | |
| 2024/0304958 | A1 | 9/2024 | Matsumura | |
| 2025/0079704 | A1 | 3/2025 | Neenan et al. | |
| 2025/0087905 | A1 | 3/2025 | Neenan et al. | |
| 2025/0105530 | A1 | 3/2025 | Neenan et al. | |
| 2025/0158281 | A1 | 5/2025 | Neenan et al. | |
| 2025/0158289 | A1 | 5/2025 | Neenan et al. | |
| 2025/0167445 | A1 | 5/2025 | Neenan et al. | |
| 2025/0167459 | A1 | 5/2025 | Neenan et al. | |
| 2025/0233306 | A1 | 7/2025 | Neenan et al. | |
| 2025/0233307 | A1 | 7/2025 | Neenan et al. | |
| 2025/0260160 | A1 | 8/2025 | Neenan et al. | |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| CN | 116151285 | 5/2023 |
| DE | 202017002307 U1 | 8/2017 |
| EP | 0 349 499 | 1/1990 |
| EP | 3 474 376 | 4/2019 |
| EP | 3 614 491 | 2/2020 |
| KR | 102260880 | 6/2021 |
| WO | WO 2005/062422 | 7/2005 |
| WO | WO 2013/090783 | 6/2013 |
| WO | WO 2018/140305 | 8/2018 |
| WO | WO 2020/010039 | 1/2020 |
| WO | WO 2023/128683 | 7/2023 |
| WO | WO 2024/035801 | 2/2024 |
| WO | WO 2024/035805 | 2/2024 |
| WO | WO 2024/035810 | 2/2024 |
| WO | WO 2025/072367 | 9/2024 |
| WO | WO 2025/072213 | 4/2025 |
| WO | WO 2025/072553 | 4/2025 |

* cited by examiner

ANTENNA SYSTEMS

INCORPORATION BY REFERENCE TO ANY PRIORITY APPLICATIONS

The present application is a continuation-in-part of, and claims priority benefit to, U.S. patent application Ser. No. 18/438,362, filed Feb. 9, 2024, entitled "ANTENNA SYSTEMS," which is hereby incorporated by reference herein in its entirety. U.S. patent application Ser. No. 18/438,362 claims priority benefit to U.S. Provisional Application No. 63/584,445, filed Sep. 21, 2023, entitled "ANTENNA SYSTEMS," and U.S. Provisional Application No. 63/580,930, filed Sep. 6, 2023, entitled "ANTENNA SYSTEMS." The present application also claims priority benefit to U.S. Provisional Application No. 63/584,445, filed Sep. 21, 2023, entitled "ANTENNA SYSTEMS," and U.S. Provisional Application No. 63/580,930, filed Sep. 6, 2023, entitled "ANTENNA SYSTEMS," each of which is hereby incorporated by reference herein in its entirety. Any and all applications for which a foreign or domestic priority claim is identified in the Application Data Sheet as filed with the present application are hereby incorporated by reference under 37 CFR 1.57.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, 3GPP as a collaborative organization has developed protocols for mobile telecommunications. The latest operational standard is known as 5G. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. 3GPP frequency bands range from 450 MHz to 8 GHz and beyond, however, antennas configured to resonate within this spectrum only resonate below 8 GHz for mobile 3GPP telecommunication standards. To capture a greater portion of the 3GPP or other telecommunication spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems. This may result in a system with poor functionality and/or coverage.

SUMMARY

In some aspects, the techniques described herein relate to an antenna assembly including: a cover comprising one or more side walls and a top wall; a base configured to be coupled to the cover to define an internal volume; an internal ground plane configured to be positioned within the internal volume; a PCB configured to be positioned above the internal ground plane within the internal volume, the PCB comprising: a base PCB portion; a first PCB portion extending from the base PCB portion; a second PCB portion extending from the base PCB portion; and a third PCB portion extending from the base PCB portion; and a multi-band antenna formed on the PCB, the multi-band antenna comprising a plurality of radiating elements comprising: a first cellular radiating element formed on the first PCB portion, the first cellular radiating element comprising a first upright radiating portion and a first head radiating portion; a second cellular radiating element formed on the second PCB portion of the PCB, the second cellular radiating element comprising a second upright radiating portion and a second head radiating portion; and a WiFi radiating element formed on the third PCB portion; wherein the first cellular radiating element and the second cellular radiating element are configured to move from a first configuration prior to engagement with the cover to a second configuration when the cover is coupled to the base, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

In some aspects, the techniques described herein relate to a method of assembling an antenna assembly, the method including coupling one or more radiating elements in a first configuration to an internal ground plane; positioning the internal ground plane on a base; and positioning a cover on the base, with the one or more radiating elements positioned between the cover and the internal ground plane, wherein positioning the cover on the base causes at least a first radiating element of the one or more radiating elements to move to a second configuration, wherein in the first configuration, the first radiating element is substantially flat, wherein in the second configuration, the first radiating element has a three-dimensional shape.

In some aspects, the techniques described herein relate to an antenna assembly including: a cover comprising one or more side walls and a top wall; a base configured to be coupled to the cover to define an internal volume; an internal ground plane configured to be positioned within the internal volume; a PCB configured to be positioned above the internal ground plane within the internal volume, the PCB comprising: a base PCB portion; and a first PCB portion extending from the base PCB portion; and a multi-band antenna positioned between the cover and the internal ground plane, the multi-band antenna comprising a one or more radiating elements comprising: a first radiating element formed on the first PCB portion, the first radiating element comprising a first upright radiating portion and a first head radiating portion; wherein the first radiating element is configured to move from a first configuration prior to engagement with the cover to a second configuration when the cover is coupled to the base, wherein in the first configuration the first upright radiating portion is coplanar to the first head radiating portion, wherein in the second configuration, the first upright radiating portion is at an angle relative to the first head radiating portion.

In some aspects, the techniques described herein relate to an antenna assembly including: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a plurality of radiating elements comprising: a first cellular radiating element formed on a first PCB portion, the first cellular radiating element comprising a first upright radiating portion and a first head radiating portion; a second cellular radiating element formed on a second PCB portion, the second cellular radiating element comprising a second upright radiating portion and a second head radiating portion; and a WiFi radiating element formed on a third PCB portion; wherein the first cellular radiating element and the second cellular radiating element are configured to move from a first configuration prior to engagement with the cover to a second configuration when the cover is coupled to the internal ground plane, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

In some aspects, the techniques described herein relate to a method of assembling an antenna assembly, the method comprising: coupling one or more radiating elements in a first configuration to an internal ground plane; and positioning a cover on the internal ground plane, with the one or more radiating elements positioned between the cover and the internal ground plane, wherein positioning the cover on the internal ground plane causes at least a first radiating element of the one or more radiating elements to move to a second configuration, wherein in the first configuration, the first radiating element is substantially flat, wherein in the second configuration, the first radiating element has a three-dimensional shape.

In some aspects, the techniques described herein relate to an antenna assembly including: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a one or more radiating elements comprising: a first radiating element formed on a first PCB portion, the first radiating element comprising a first upright radiating portion and a first head radiating portion; wherein the first radiating element is configured to move from a first configuration prior to engagement with the cover to a second configuration when the cover is coupled to the internal ground plane, wherein in the first configuration the first upright radiating portion is coplanar to the first head radiating portion, wherein in the second configuration, the first upright radiating portion is at an angle relative to the first head radiating portion.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
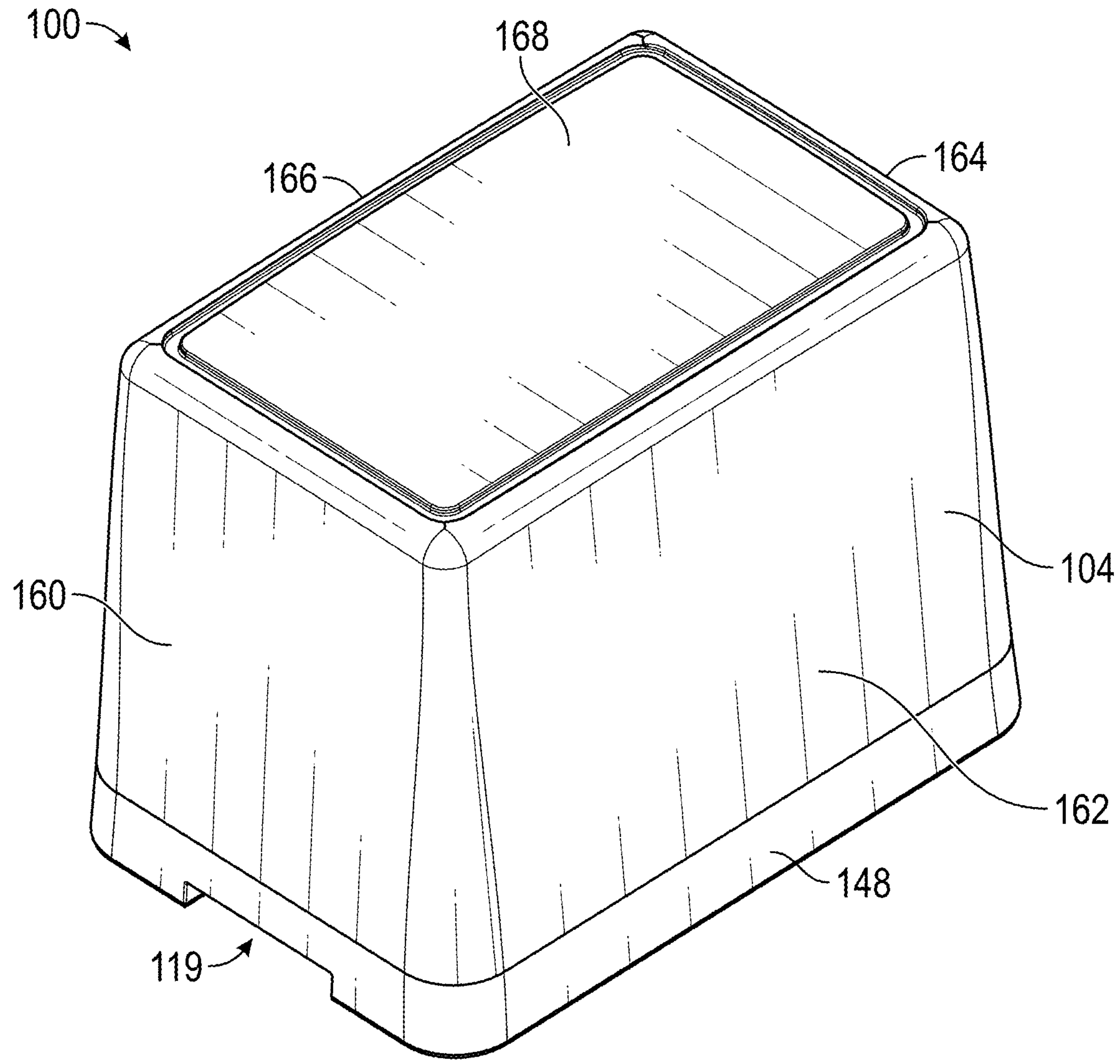
FIG. 1 illustrates a perspective view of an antenna assembly that includes a multi-element multi-band antenna enveloped by a non-conductive cover, according to some embodiments.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENTS

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

First Antenna Assembly

The system and method in accordance with the present disclosure overcomes one or more of the above-discussed problems commonly associated with traditional antenna systems. In particular, the system of the present disclosure is an antenna system having a radome, a formed multi-band radiating elements supported on a flexible printed circuit board (PCB) structure configured and adapted to be housed within the radome such that one or more (e.g., four) bent PCB portions are positioned in a bent orientation during assembly. The PCB portions of the radiating element are paired with a formed ground plane that permits a frequency range of 450 MHz to 8 GHz, which provides a wider range of frequencies than antenna systems currently known in the art, with improved cost effectiveness and simplicity of manufacture. The four bent PCB portions allow for the antenna to be compact, making it ideal for compact 3GPP or other telecommunication transmitters. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Figure 12:
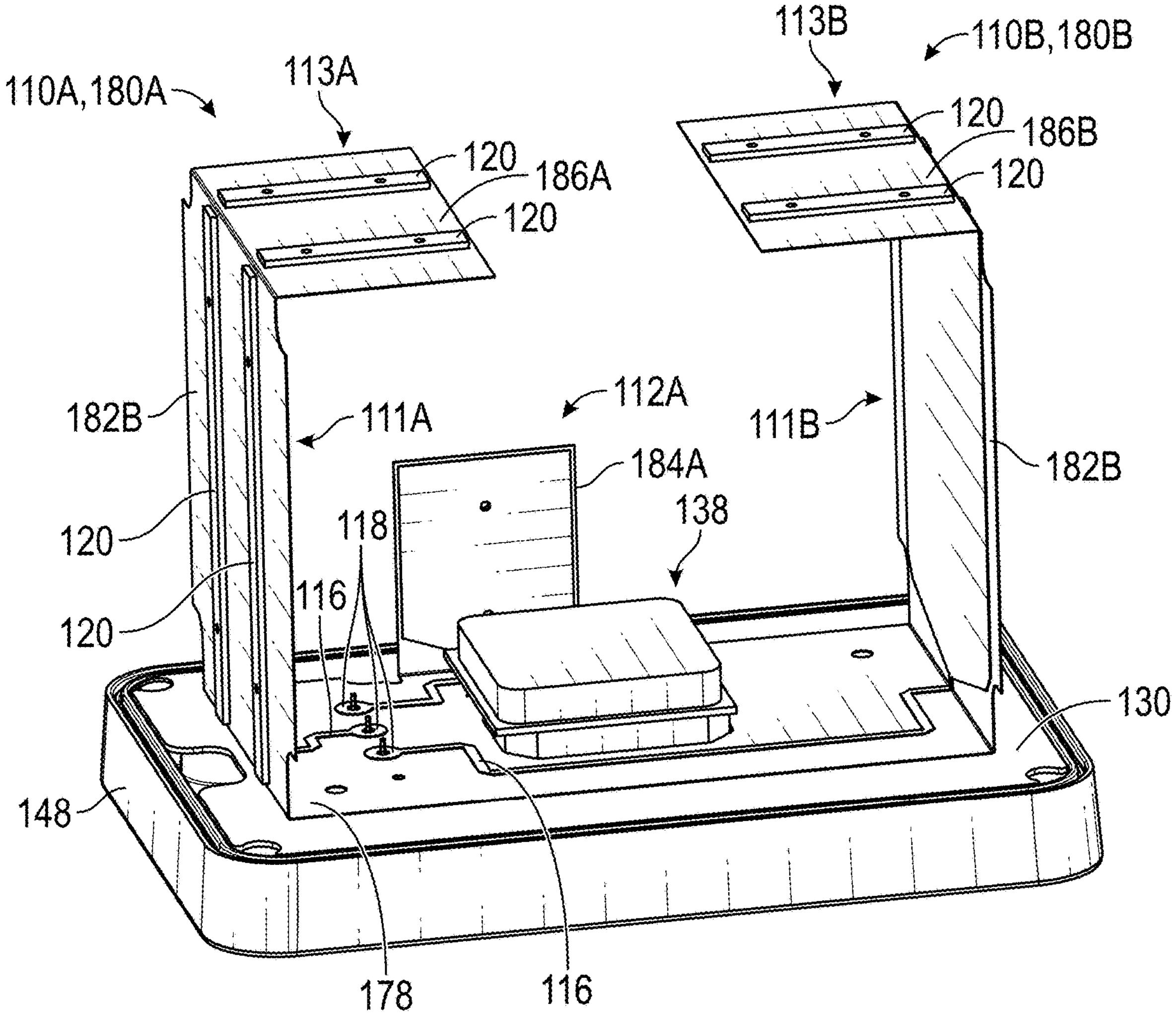
FIG. 12 illustrates a perspective view of a second embodiment of an antenna assembly with the cover removed.
Figure 13:
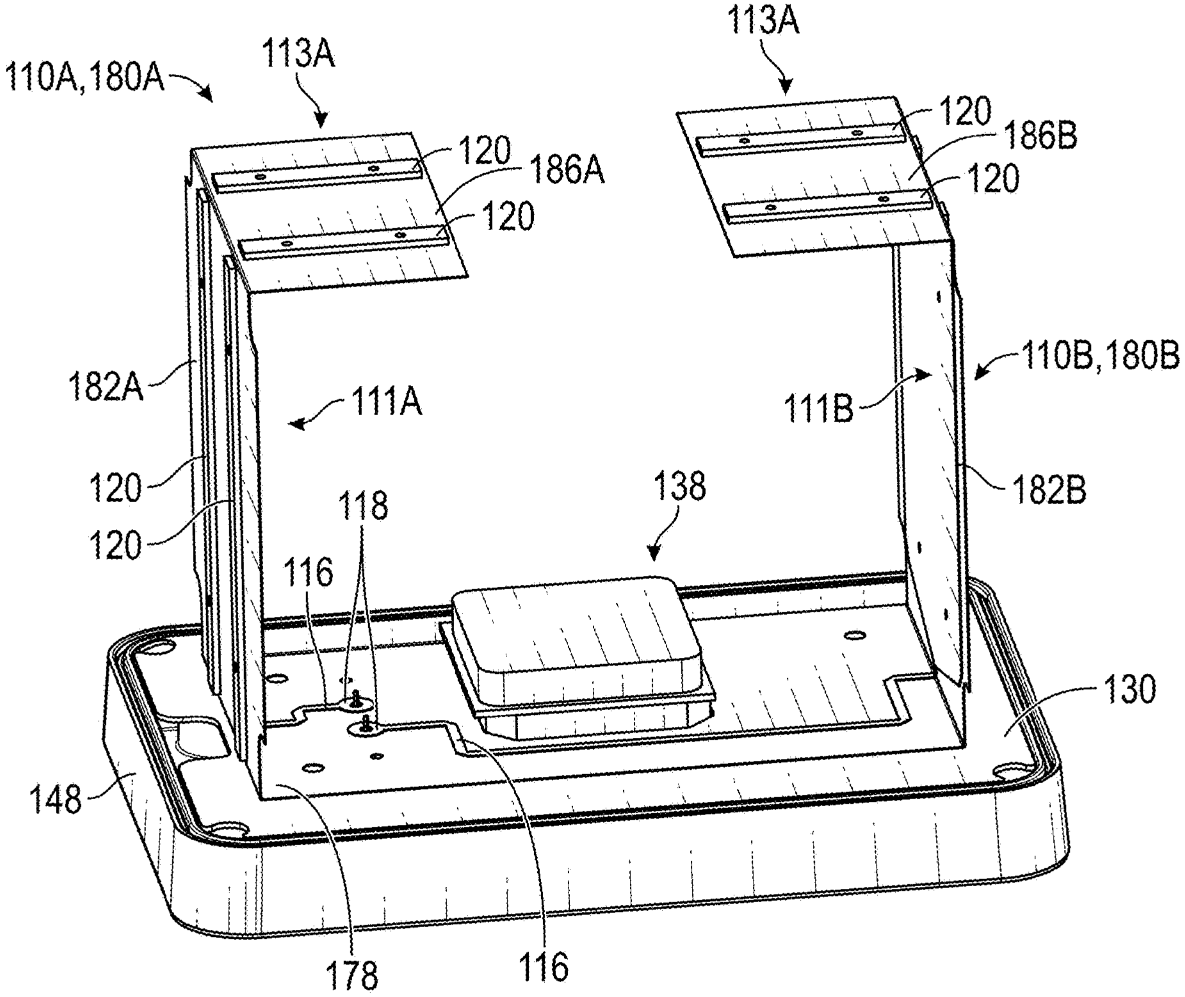
FIG. 13 illustrates a perspective view of a third embodiment of an antenna assembly with the cover removed.

Referring now to the drawings wherein like reference characters identify corresponding or similar elements in form and function throughout the several views. FIGS. 1-11 illustrate various views of an antenna assembly and components thereof. FIGS. 12 and 13 illustrate perspective views of alternative embodiments of the antenna assembly with the radome removed.

According to some embodiments, features and aspects of this disclosure, a multi-band antenna system can be a multi-band monopole antenna system that has a configuration that, when used in conjunction with high order electromagnetic modes generated or received by a transceiver and/or receiver, permit the multi-element multi-band antenna system to have an operating frequency range of between about 450 MHz to about 8 GHz. A radome can be advantageously configured and adapted to have ribs, slots, catch points, and/or the like features within an interior portion of the radome to hold the radiating elements of the antenna in place for proper mechanical alignment during the fabrication of the antenna. Proper mechanical alignment can ensure that the radiating elements are held in their proper place so that the antenna meets it desired electrical performance for return loss and radiation patterns over the desired frequency bands. Flex circuit support portion(s) and/or PCB portion(s) can be made of polyimide or other similar flexible material and can support copper features of one or more radiating elements etched into its structure. The curved features of the flex circuit can be preferably and advantageously obtained during the installation of the flex circuit into the radome due to the unique ribbing and configuration of the interior of the radome such that portions of the flex circuit are bent during manufacturing upon insertion into the radome. The two shorter of the four radiating elements can be configured and adapted to be used for communication between about 1 GHz to about 8 GHz. The two tall radiating elements can be configured and adapted to be used for communication between about 450 MHz to about 8 GHz. The radiating elements are similar in nature to what is commonly known as a monopole antenna. According to some embodiments, systems, and methods, antenna systems disclosed herein present exceptional performance given the volume and profile of the antenna system. The cubic inches of the enclosed space in the radome provide for an advantageous height of the radome above the groundplane. Microstrip transmission lines are used between the coaxial cable conductors and the radiating elements. The antenna system comprises a plurality of monopole antenna elements for all bands including the cellular antenna elements. The 3D forming of the antenna elements (that are constructed from the flex circuit) by the radome during the assembly process advantageously reduces manufacturing time and expense and provides for properly shaped and positioned antenna elements for a single band as well as a multi-band application. According to some methods, antenna elements are positioned within the radome during manufacturing. While positioning the antenna elements into the radome, the antenna elements are formed into position for use in the desired communication configuration. The interior surfaces of the radome as well as the flat sheets of flex material are configured and adapted such that during the installation of the flex material into the radome, the radome forms the flat sheets of flex material into an “L” shape, a “C” shape, or another suitable and desired three-dimensional shape.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1, a perspective view of an antenna assembly 100 is illustrated in accordance with an embodiment of the present disclosure. The antenna assembly 100 may include a multi-element multi-band antenna 102, as shown in at least FIGS. 3, 6A, and 6B. The multi-element multi-band antenna 102 may be configured to provide wireless internet connectivity for a plurality of uses (e.g., data, voice communication, and/or the like). The antenna assembly 100 may have particular benefits when used in places such as kiosks and vehicles, however, the multi-element multi-band antenna 102 may be used in a wide range of applications. For example, the antenna assembly 100 may be a fixed or transportable solution, such as a hot spot accessory. In another example, the antenna assembly 100 can be used to provide cellular backup for internet connectivity for server rooms. Additionally, the antenna assembly 100 can be used for utility monitoring, last mile wireless internet for homes, small offices, and courtyards, to fill a coverage hole in the WiFi network, as a portable or fixed WiFi hot spot for multiple IoT devices, and/or the like. The multi-element multi-band antenna 102 may have a smaller volume and profile when compared to other antenna systems. For example, the multi-element multi-band antenna 102 housed in a radome 104 (as described below) may have a cubic volume between 6 and 20 cubic inches (e.g., between 6 and 20 cubic inches, 9 and 18 cubic inches, 12 and 15 cubic inches, values between the foregoing, etc.). The antenna assembly 100 can be an IP67-rated antenna that can be easy to install on kiosks, POTS replacement boxes, and/or other equipment using a magnetic or adhesive base. In some implementations, the antenna assembly 100 can include a screw on option for secured mounting.

Figure 3:
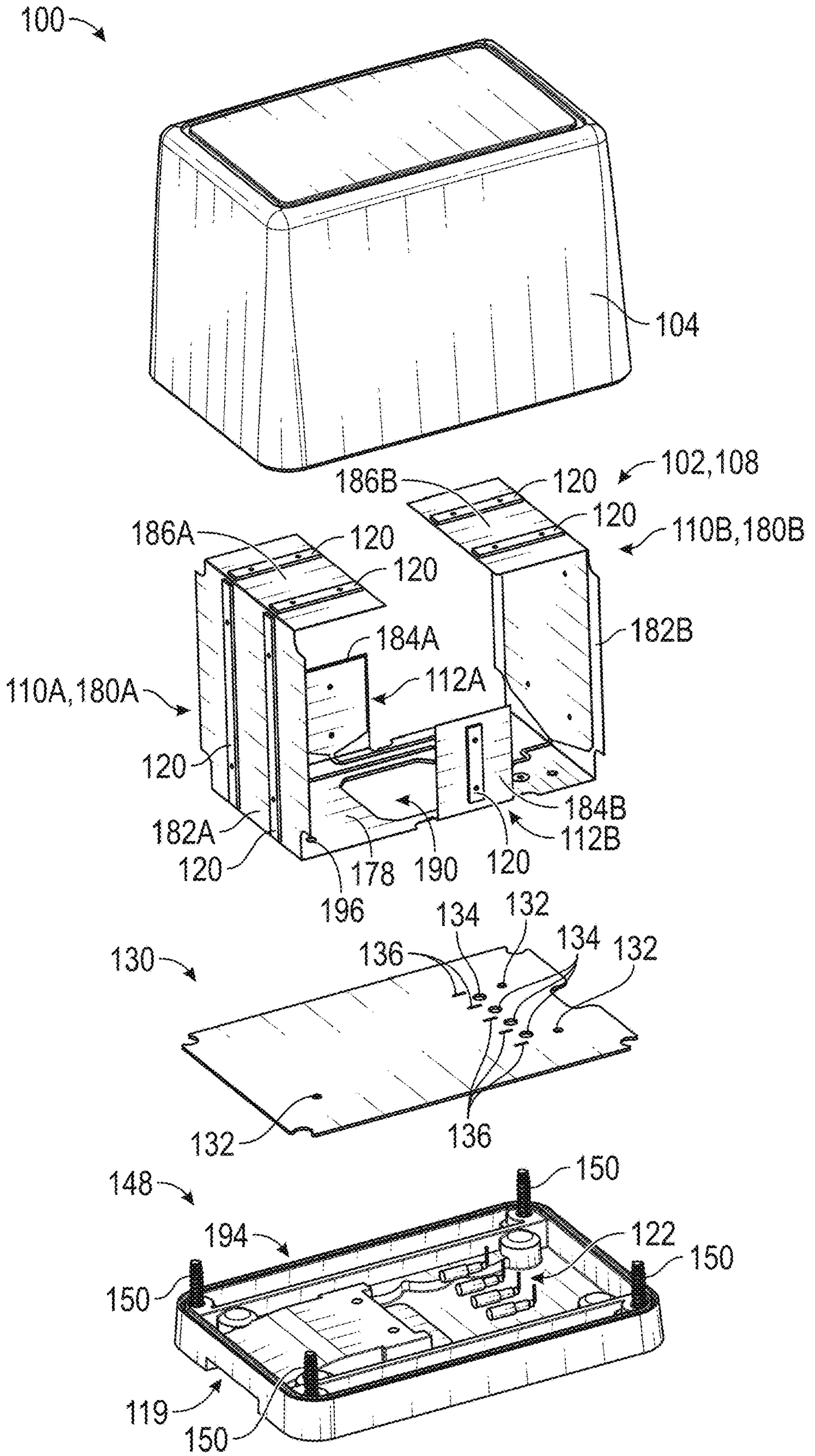
FIG. 3 illustrates an exploded view of the antenna assembly of FIG. 1.

FIG. 3 illustrates an exploded view of the antenna assembly 100. The antenna assembly 100 can include the multi-element multi-band antenna 102, the radome 104 (also referred to herein as the “cover” 104 and the “non-conductive cover” 104), an internal ground plane 130, and/or a support base 148. The components of the multi-element multi-band antenna 102 may be concealed and/or secured within the radome 104 and may be positioned between the radome 104 and the support base 148. As shown in at least FIGS. 3, and 6A, 6B, the multi-element multi-band antenna 102 may include one or more of the following components: a first radiating element 110A, a second radiating element 110B, a third radiating element 112A, a fourth radiating element 112B, and/or a GPS antenna 138. The GPS antenna 138 is not shown in FIG. 3 for illustrative purposes. The antenna assembly 100 may include additional components to enable the function of the multi-element multi-band antenna 102, as described herein. To secure the multi-element multi-band antenna 102 within the antenna assembly 100, the radome 104 can be coupled to the support base 148 with the internal ground plane 130 therebetween. For example, the antenna assembly 100 may include a plurality of fasteners 150 to secure the support base 148 to the radome 104.

The internal ground plane 130 can serve as a ground plane for the multi-element multi-band antenna 102. For example, the internal ground plane 130 can serve as an electrical reference point for operation of the multi-element multi-band antenna 102. In some embodiments, the internal ground plane 130 establishes a surface for the coaxial cables to use as a reference for continuation of the signal from the radio to the radiating elements 110A, 110B, 112A, 112B.

In some embodiments, the antenna assembly 100 may be mounted on a client ground plane (not shown). The client ground plane may be in the form of conducting surfaces on vehicles, buildings, indoor or outdoor equipment enclosures, and other such customer premise equipment. Those skilled in the art would understand that the nature of the deployment of the antenna assembly 100 will change slightly in the deployed performance based on type of structure the antenna assembly 100 is attached to as well as the surroundings in which it is deployed. Those skilled in the art realize that the lower frequency bands of the multi-element multi-band antenna 102 may have optimal performance when placed on a client ground plane but that a client ground plane is not required for all applications, particularly where a reduction in the level of performance is acceptable. Accordingly, in some embodiments, the client ground plane is not required. The radiating elements (e.g., radiating elements 110A, 110B, 112A, 112B) of the multi-element multi-band antenna 102 may also be referred to herein as "radiating antenna elements", "antenna elements" and "radiating portions". The radiating elements can be constructed of any suitable antenna material, such as metal, PCB substrates with conductive traces, dielectric materials, plastics with conductive coatings, ceramics, composite materials, and/or the like. In the illustrated examples, the radiating elements comprise portions of PCB substrates with conductive features. For example, each radiating element can include a portion of a printed circuit board ("PCB") 108. The PCB 108 may be made of a flexible substrate material (e.g., polyimide) that acts as the non-conductive support material and may include a ductile copper or other suitable conductive material for the electrically conductive features. As such, the PCB 108 may be a flex circuit. The PCB 108 may provide structure for the radiating elements 110A, 110B, 112A, 112B of the multi-element multi-band antenna 102. For example, conductive material may be etched into the structure of the PCB 108 to form the radiating elements 110A, 110B, 112A, 112B. In some embodiments, the multi-element multi-band antenna 102 may include a plurality of the PCBs 108 extending from the internal ground plane 130. In other embodiments, including the illustrated embodiment, the PCB 108 can be bent or folded to define a plurality of PCB portions that can remain connected to each other. For example, the PCB 108 can include a bottom PCB portion 178 and a plurality of PCB portions that extend from the bottom PCB portion 178. As such, the multi-element multi-band antenna 102 is a three-dimensional antenna, as opposed to a two-dimensional antenna, which may provide certain benefits. For example, having a three-dimensional antenna can reduce the overall size of the antenna assembly 100 when compared to a two-dimensional antenna, while still maintaining the effectiveness of the multi-element multi-band antenna 102. In some implementations, it is desirable to make the multi-element multi-band antenna 102 as compact as possible. Having a three-dimensional antenna can help reduce the overall size of the multi-element multi-band antenna 102, which is desirable in some use cases, particularly when it is not desirable to see the antenna assembly 100. The multi-element multi-band antenna 102 may be a multi-band monopole antenna that has a configuration that, when used in conjunction with high order electromagnetic modes generated or received by a transceiver and/or receiver, permit the multi-element multi-band antenna 102 to have an operating frequency range of 450 MHz to 8 GHz.

The number of PCB portions extending from the bottom PCB portion 178 included in the antenna assembly 100 may be defined by the number of radiating elements included in the multi-element multi-band antenna 102. For example, in the embodiment illustrated in FIGS. 6A and 6B, the multi-element multi-band antenna 102 includes a first PCB portion 180A, a second PCB portion 180B, a third PCB portion 184A, and a fourth PCB portion 184B (collectively PCB portions 108). However, more or less PCB portions 108 are possible. For example, in the embodiment illustrated in FIG. 12, the multi-element multi-band antenna 102 includes a first PCB portion 180A, a second PCB portion 180B, and a third PCB portion 184A. Similarly, in the embodiment illustrated in FIG. 13, the multi-element multi-band antenna 102 includes a first PCB portion 180A and a second PCB portion 180B. The PCB portions 108 may be positioned above the internal ground plane 130 in the antenna assembly 100. In some implementations, the PCB portions 108 may be coupled to the internal ground plane 130. The PCB portions 108 may extend from the bottom PCB portion 178 in a generally vertical direction when the antenna assembly 100 is assembled. The PCB portions 108 may extend from the bottom PCB portion 178 at approximately 90-degree angles in accordance with some embodiments. In some embodiments, PCB portions 108 may extend from the bottom PCB portion 178 at an angle between 85-degrees and 95-degrees (e.g., between 85 and 95 degrees, 87 and 93 degree, 89 and 91 degrees, values between the foregoing, etc.).

Figure 6A:
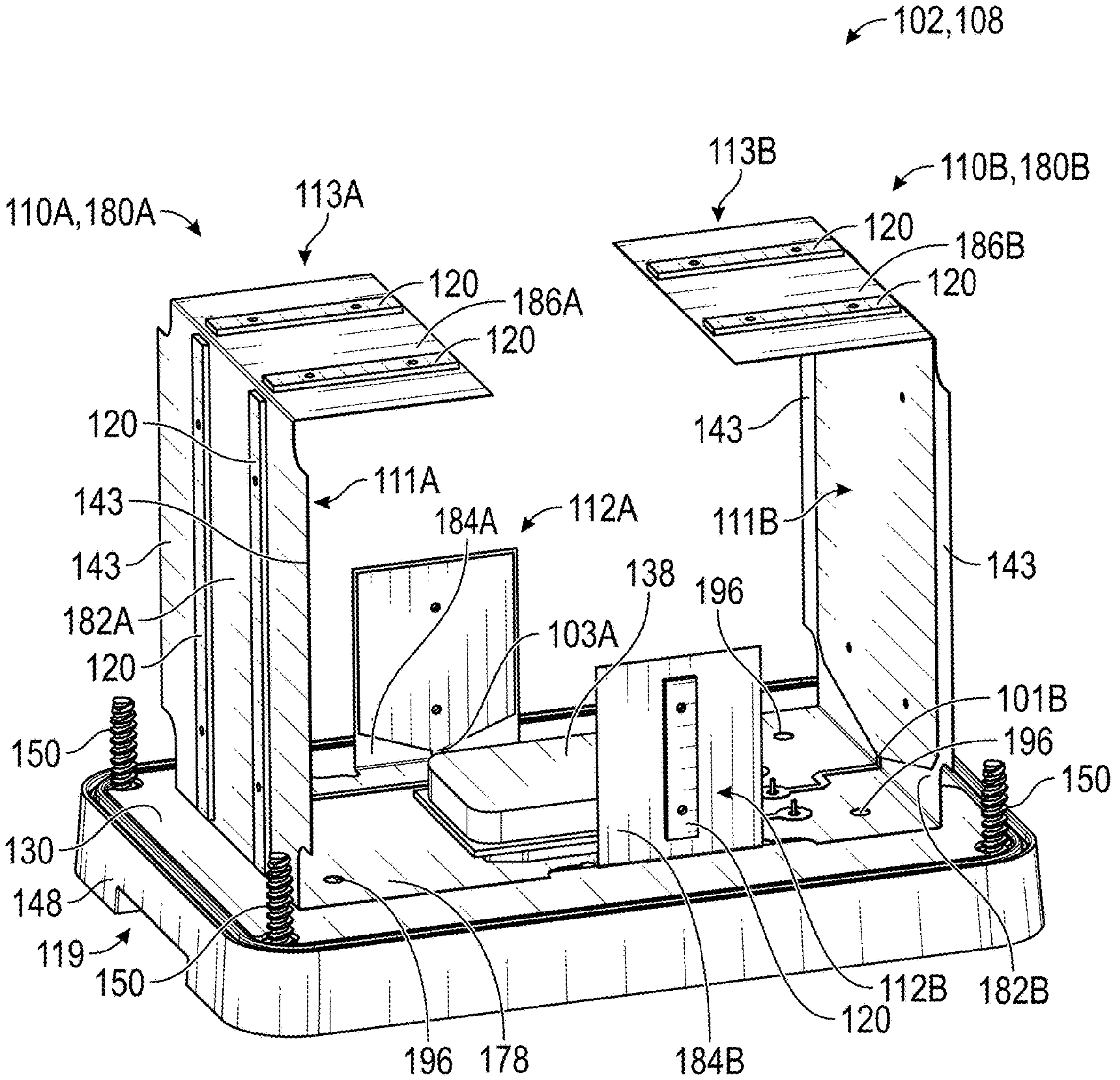
FIG. 6A illustrates a first perspective view of the antenna assembly of FIG. 1 with the cover removed.
Figure 6B:
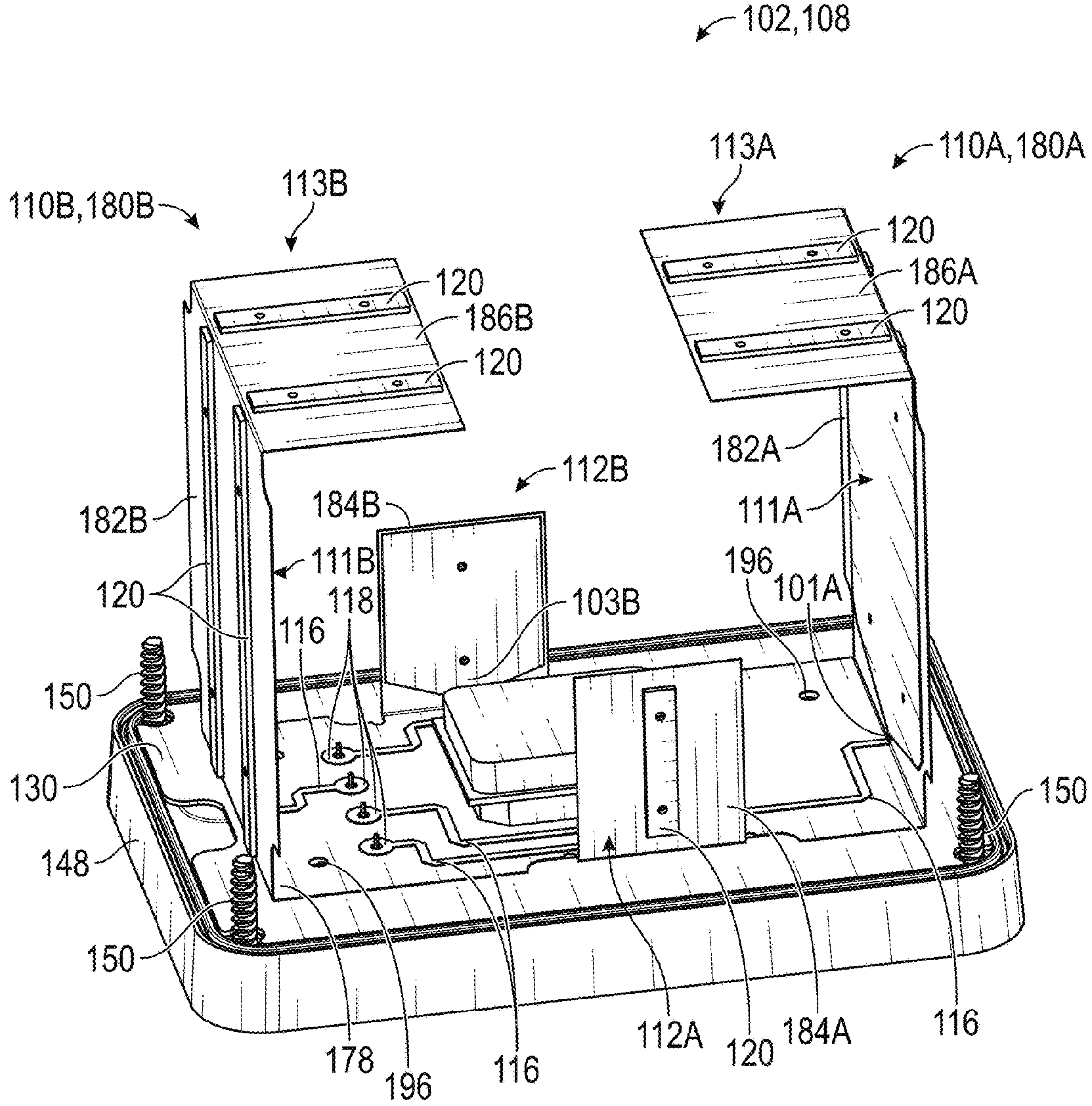
FIG. 6B illustrates a second perspective view of the antenna assembly of FIG. 1 with the cover removed.

As explained further herein, in some implementations, the multi-element multi-band antenna 102 can include a GPS antenna 138 (see e.g., FIGS. 6A and 6B). When the GPS antenna 138 is included in the antenna assembly 100, the bottom PCB portion 178 can include a hole 190 that can be configured to receive the GPS antenna 138 (see e.g., FIG. 3). The hole 190 may be the same shape as the base of the GPS antenna 138. For example, in some embodiments, the hole 190 can be shaped as an octagon of unequal sides. When the antenna assembly 100 does not include the GPS antenna 138, the bottom PCB portion 178 may not include the hole 190.

The PCB portions 108 may be sized based on the desired size and function of the different radiations elements 110A, 110B, 112A, 112B included in the multi-element multi-band antenna 102. For example, the first and second radiating elements 110A, 110B may be configured for cellular communication. Accordingly, the first and second radiating elements 110A, 110B may be referred to as "cellular radiating elements" or "cellular antennas". The third and fourth radiating elements 112A, 112B, may be configured as WiFi radios. Accordingly, the third and fourth radiating elements 112A, 112B may be referred to as "WiFi antennas" or "WiFi radiating elements". Due to the different functions of the different radiating elements, the first and second PCB portions 180A, 180B may be a different size and shape than the third and fourth PCB portions 184A, 184B. For example, the first and second PCB portions 180A, 180B can have larger heights and/or widths than the third and fourth PCB portions 184A, 184B. In some implementations, the cellular radiating elements 110A, 110B may be used for communication between approximately 450 MHz and 8 GHz. For example, the first and second radiating elements 110A, 110B may be able to operate at low bands, mid bands, and high bands. In other embodiments, different frequency ranges are possible. Similarly, in some embodiments, the WiFi radiating elements 112A, 112B may be used for communication between approximately 1 GHz and 8 GHz. For example, the radiating elements 112A, 112B may be able to operate at mid band and high band. In other embodiments, different frequency ranges are possible. The radiating elements 110A, 110B, 112A, 112B may be/function as monopole antennas. In some embodiments, each radiating elements 110A, 110B, 112A, 112B covers the full bandwidth of the radio that is connected to it, with each radiating elements 110A, 110B, 112A, 112B having a unique radio. The four radiating elements 110A, 110B, 112A, 112B can work together in a Multiple-Input Multiple-Output ("MiMo") aspect of the radio link.

In accordance with some embodiments, the first and second PCB portions 180A, 180B may be bent or have a three-dimensional configuration. For example, each PCB portion 180A, 180B may include an upright PCB portion and a top PCB portion, with the conductive material of the radiating element formed on both the upright and top PCB portions. For example, in the illustrated embodiment, the first PCB portion 180A can include a first upright PCB portion 182A and a first top PCB portion 186A, as shown in FIGS. 6A and 6B. Similarly, the second PCB portion 180B can include a second upright PCB portion 182B and a second top PCB portion 186B. The top PCB portions 186A, 186B may be horizontal extensions extending from the upright PCB portions 182A, 182B respectively. In some embodiments, the top portions 186A, 186B extend at approximately a 90-degree angle from the upright PCB portions 182A, 182B in a direction over the bottom PCB portion 178 and the internal ground plane 130 and towards each other. The 90-degree angle may follow a curved path between the upright PCB portions 182A, 182B and the top portions 186A, 186B. In some embodiments, the angle of the bend in the PCB portions 180A, 180B may be between 85-degrees and 95-degrees (e.g., between 85 and 95 degrees, 87 and 93 degree, 89 and 91 degrees, values between the foregoing, etc.). One or both of the upright PCB portions 182A, 182B and the top PCB portions 186A, 186B can include support portions for engaging with features of the radome 104 during assembly and for supporting the radiating elements 110A, 110B during use. For example, the upright PCB portions 182A, 182B can include upright support portions 143 respectively that extend laterally from the sides of the upright PCB portions 182A, 182B and are co-planar to the upright PCB portions 182A, 182B. The upright support portions 143 can be sections of the PCB portions 180A, 180B that do not include conductive material. The upright support portions 143 can begin near the bottom of the upright PCB portions 182A, 182B and may not extend to the top edge of the upright PCB portions 182A, 182B that is defined by the bend (e.g., fold lines C-C in FIG. 20A) between the upright PCB portions 182A, 182B and the top PCB portions 186A, 186B. In some embodiments, the top PCB portions 186A, 186B can include top support portions (not shown) that extend laterally from the sides of the top PCB portions 186A, 186B and are co-planar to the top PCB portions 186A, 186B. The top support portions can be sections of the PCB portions 180A, 180B that do not include conductive material.

The conductive material that forms a part of the radiating elements 110A, 110B may extend at least along both the upright PCB portions 182A, 182B and the top PCB portions 186A, 186B. For example, the first radiating element 110A may include an upright radiating portion 111A formed on the first upright PCB portion 182A and a head radiating portion 113A formed on the first top PCB portion 186A, with the bend in the first PCB portion 180A defining the two radiating portions 111A, 113A of the radiating element 110A. Similarly, the radiating element 110B may include an upright radiating portion 111B formed on the second upright PCB portion 182B and a head radiating portion 113B formed on the second top PCB portion 186B, with the bend in the second PCB portion 180B defining the two radiating portions 111B, 113B of the radiating element 110B. In some embodiments, advantages of a bent of three-dimensional radiating element (e.g., radiating elements 110A, 110B) can include having two distinct radiating portions, reducing the total height of the multi-element multi-band antenna 102 to be more compact and conserve space, and configuring the radome 104 to be able to easily cover and provide protection for the system in a compact configuration with multi-band coverage. For example, the head radiating portions 113A, 113B of the radiating elements 110A, 110B can provide further multi-band performance as well as low band performance while maintaining an efficient volume for the multi-element multi-band antenna 102.

In some embodiments, the upright radiating portion 111A of the first radiating element 110A may face the upright radiating portion 111B of the second radiating element 110B. For example, the upright radiating portion 111A may face in a first direction and the upright radiating portion 111B may face in a second direction that is substantially opposite the first direction. In some embodiments, the upright radiating portion 111A and the upright radiating portion 111B can be the same height and/or width. In some embodiments, the upright radiating portion 111A and the upright radiating portion 111B can have different heights and/or widths. In some embodiments, the head radiating portion 113A of the first radiating element 110A may be co-planer with the head radiating portion 113B of the second radiating element 110B. In some embodiments, the head radiating portion 113A of the first radiating element 110A may be not co-planer with the head radiating portion 113B of the second radiating element 110B. In some embodiments, the head radiating portion 113A and the head radiating portion 113B can be the same length and/or width. In some embodiments, the head radiating portion 113A and the head radiating portion 113B can have different length and/or widths. In some embodiments, the radiating elements 110A, 110B, 112A, 112B are spaced close together to reduce the overall volume of the multi-element multi-band antenna 102.

In some implementations, the top PCB portions 186A, 186B may engage with features (e.g., slots 192) of the radome 104 to provide support for the PCB portions 180A, 180B as well as to define their shape and placement, as shown and described further with reference to at least FIGS. 7A-7C, and 8-10. Similarly, the third and fourth PCB portions 184A, 184B of the radiating elements 112A, 112B may engage with features (e.g., slots 176) of the radome 104, as described below to provide support for the PCB portions 184A, 184B as well as to define their shape and placement. In some embodiments, the shape of the PCB portions 108 may be obtained during installation of the PCB portions 108 into the radome 104. For example, prior to installation, the PCB portions 108 may be assembled as a flat sheet (see e.g., FIG. 20A) and bent to define the upright portions and top portions (see e.g., FIGS. 7B and 7C) when inserted and engaged with the ribbings and slots of the radome 104.

In some embodiments, one or both of the first and second PCB portions 180A, 180B may not include the top portions 186A, 186B respectively. For example, one or both of the first and second PCB portions 180A, 180B may be substantially vertical such that they only include the upright PCB portions 182A, 182B. In this example, the radiating element 110B would not include the head radiating portion 113B and/or the radiating element 110A would not include the head radiating portion 113A. Having vertical radiating elements 110A, 110B can simplify the assembly of the multi-element multi-band antenna 102 and may be desirable when the size/height of the multi-element multi-band antenna 102 is not an important design consideration. However, including bends in the radiating elements 110A, 110B (e.g., having both upright radiating portions 111A, 111B and head radiating portions 113A, 113B) can provide a benefit of reducing the overall size of the multi-element multi-band antenna 102, which can be desirable. Bending the radiating elements 110A, 110B may also define the radiation patterns of the higher order modes.

In some embodiments, one or more of the radiating elements 110A, 110B, 112A, 112B can include one or more apertures (not shown). For example, the one or more apertures may extend through the radiating elements 110A, 110B, 112A, 112B (e.g., through both the conductive material and the PCB portions 108. The apertures can be any suitable shape, such as circular, oval, square, rectangular, elliptical, and/or the like. In some embodiments, including radiating elements 110A, 110B, 112A, 112B with apertures can enhance the multi-element multi-band antenna's 102 performance and characteristics for some applications. In one example, apertures can be used to shape the radiation pattern of the multi-element multi-band antenna 102 (e.g., the shape and size of apertures can be used to direct and focus the radiation pattern on the multi-element multi-band antenna 102 in a specific direction, which can increase the gain and/or enhance the multi-element multi-band antenna's 102 directivity). In another example, apertures can be used as resonant structures such that the multi-element multi-band antenna 102 is a frequency-selective antenna (e.g., the size and shape of the apertures can be tuned to resonate at a specific frequency, which would make the multi-element multi-band antenna 102 more responsive at the specific frequency). Other benefits, such as impedance matching and antenna radiation pattern shaping, can also be realized by including apertures in one or more of the radiating elements 110A, 110B, 112A, 112B.

With reference to FIG. 20A, which shows the PCB 108 of the multi-element multi-band antenna 102 in an initial assembly state, the PCB 108 can include the bottom PCB portion 178. The PCB portions 180A, 180B, 184A, 184B can extend from the bottom PCB portion 178. The PCB portions 180A, 180B can extend from the bottom PCB portion 178 at the lines A-A, and the PCB portions 184A, 184B can extend from the bottom PCB portion 178 at the lines B-B. The multi-element multi-band antenna 102 can include a feeding system. The feeding system/portion may be a plurality of transmission lines 116 that may be embedded in at least the bottom portion 178 of the PCB 108. The number of microstrip transmission lines 116 included in the multi-element multi-band antenna 102 may be defined by the number of radiating elements in the multi-element multi-band antenna 102. For example, the PCB 108 may include four microstrip transmission lines 116, one for each of the radiating elements, that extend from each radiating element 110A, 110B, 112A, 112B, to individual coaxial inputs 118. More or less transition lines are also possible, where the multi-element multi-band antenna 102 includes a different number of radiating elements. For example, in the embodiments shown in FIGS. 12 and 13, the multi-element multi-band antenna 102 may include three or two microstrip transmission lines 116 respectively due to the reduced number of radiating elements. The transmission lines 116 facilitate an electrical connection between the coaxial cables 122, and the feed points of the radiating elements 110A, 110B, 112A, 112B to electrically excite the radiating elements 110A, 110B, 112A, 112B.

As shown in FIG. 20A, each radiating element 110A, 110B, 112A, 112B can include a feed point. The feed points are the locations in the multi-element multi-band antenna 102 where the radio frequency (RF) signal is applied to or extracted from the respective radiating element 110A, 110B, 112A, 112B. The feed points can be connected to microstrip transmission lines 116 of the multi-element multi-band antenna 102. For example, the radiating elements 110A, 110B can be coupled to the feeding portion 116 at feed points 101A, 101B (collectively referred to herein as "feed points 101") respectively to electrically excite the radiating elements 110A, 110B. Similarly, the radiating elements 112A, 112B can be coupled to the feeding portion 116 at feed point 103A, 103B (collectively referred to herein as "feed points 103") respectively, to electrically excite the radiating elements 112A, 112B.

The geometry of the feed points 101, 103 can impact the performance (e.g., impedance matching, radiation pattern, polarization, gain and directivity, bandwidth, and/or the like) of the radiating elements 110A, 110B, 112A, 112B. As such, the geometry of the feed points 101, 103 may vary between the radiating elements 110A, 110B, 112A, 112B, depending on the desired performance. The feed points 101, 103 can be tapered or "V" shaped portions at the bottom of the radiating elements 110A, 110B, 112A, 112B respectively. The angle of the V-shaped portions relative to the horizontal (e.g., defined by the bottom PCB portion 178 or the internal ground plane 130) and/or the starting point of the V-shaped portions (e.g., relative to the vertical) can be selected to obtain impedance matching over a broad frequency range between the radiating elements 110A, 110B, 112A, 112B and the microstrip transmission lines 116. In some embodiments, the starting point and angle of the V-shaped portions can differ between the radiating elements 110A, 110B, 112A, 112B. In some embodiments, the starting point and angle of the V-shaped portions can be the same for one of more of the radiating elements 110A, 110B, 112A, 112B. In some embodiments, where the radiating elements 110A, 110B, 112A, 112B include one or more apertures, as described herein, an aperture can be placed slightly above the V-shaped portions, which can help with impedance matching. In other implementations, other feeding systems are possible.

The coaxial inputs 118 of the feeding portion 116 can include holes to receive the center conductor 124 of the terminated coaxial cables 122. The holes of the coaxial inputs 118 can extend through the bottom PCB portion 178. In the assembled configurations, the transmission lines 116 allow the terminated coaxial cables 122 to be electrically coupled to the radiating elements 110A, 110B, 112A, 112B. For example, the microstrip transmission lines 116 allow the radio frequency ("RF") signals to propagate from the attachment point (e.g., the coaxial inputs 118) of the terminated coaxial cables 122 to the feeding points 101, 103 of the radiating elements 110A, 110B, 112A, 112B. The microstrip transmission lines 116 preferably allow for an economical use of space to route microwave energy from a location of the internal ground plane 130 and connecting to radiating portions 110A, 110B, 112A, 112B dispersed across the ground reference. The transmit/receive radios are connected to the internal ground plane 130 via coaxial transmission lines. Generally, it is desirable for the spacing between the microstrip transmission lines 116 and the internal ground plane 130 to be less than 1 mm, which can allow the multi-element multi-band antenna 102 to operate effectively up to ranges of at least 450 MHz to 8 GHz.

In accordance with some embodiments, the PCB 108 may include one or more tooling holes 196. For example, as shown in FIG. 20A, the bottom PCB portion 178 can include three tooling holes 196. The tooling holes 196 are configured to be aligned with the other tooling holes of other components of the multi-element multi-band antenna 102 (e.g., the tooling holes 132 of the internal ground plane 130, the tooling holes a PCB support (not shown), and/or the like). The tooling holes 196, 132 can serve as reference points during the manufacturing and assembly of the antenna assembly 100. For example, the tooling holes 196, 132 can facilitate accurate and consistent positioning of the components of the antenna assembly 100 (e.g., fabrication, assembly, and testing).

Figure 2A:
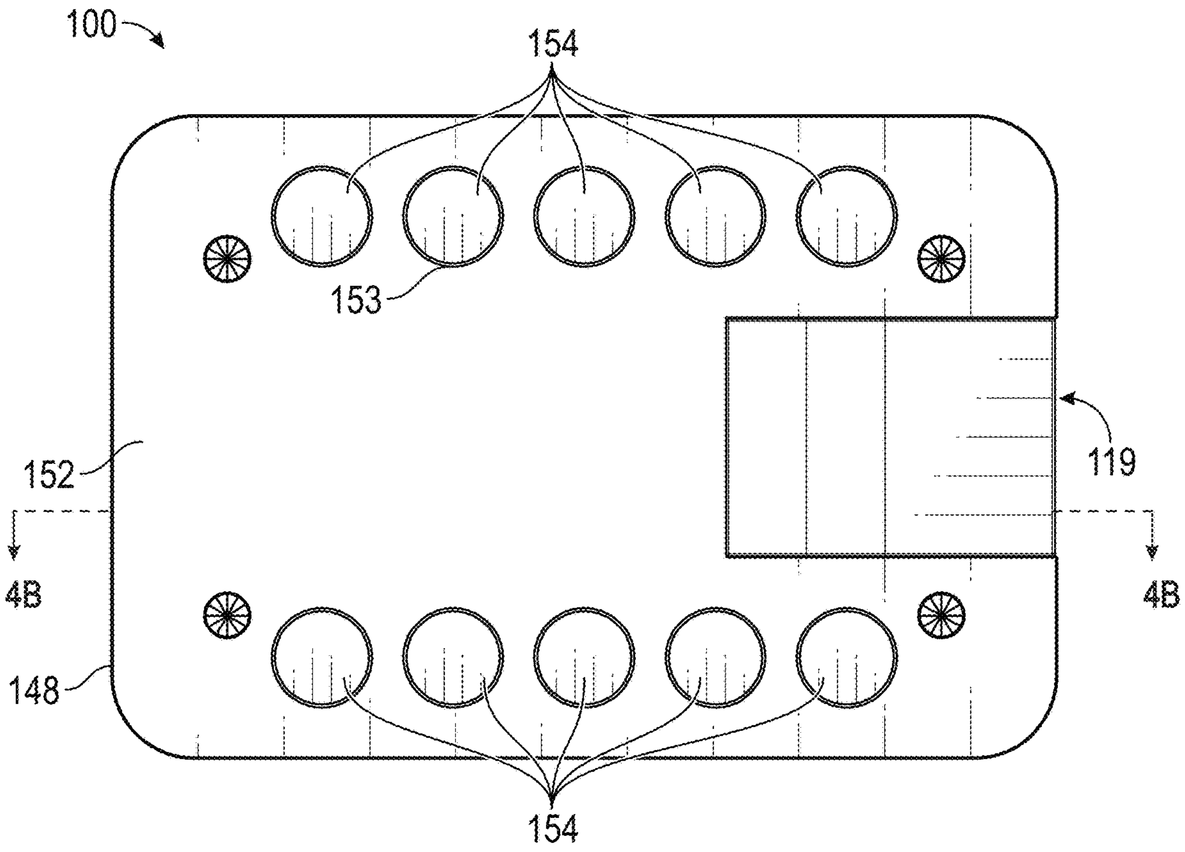
FIG. 2A illustrates a bottom view of the antenna assembly of FIG. 1.
Figure 2B:
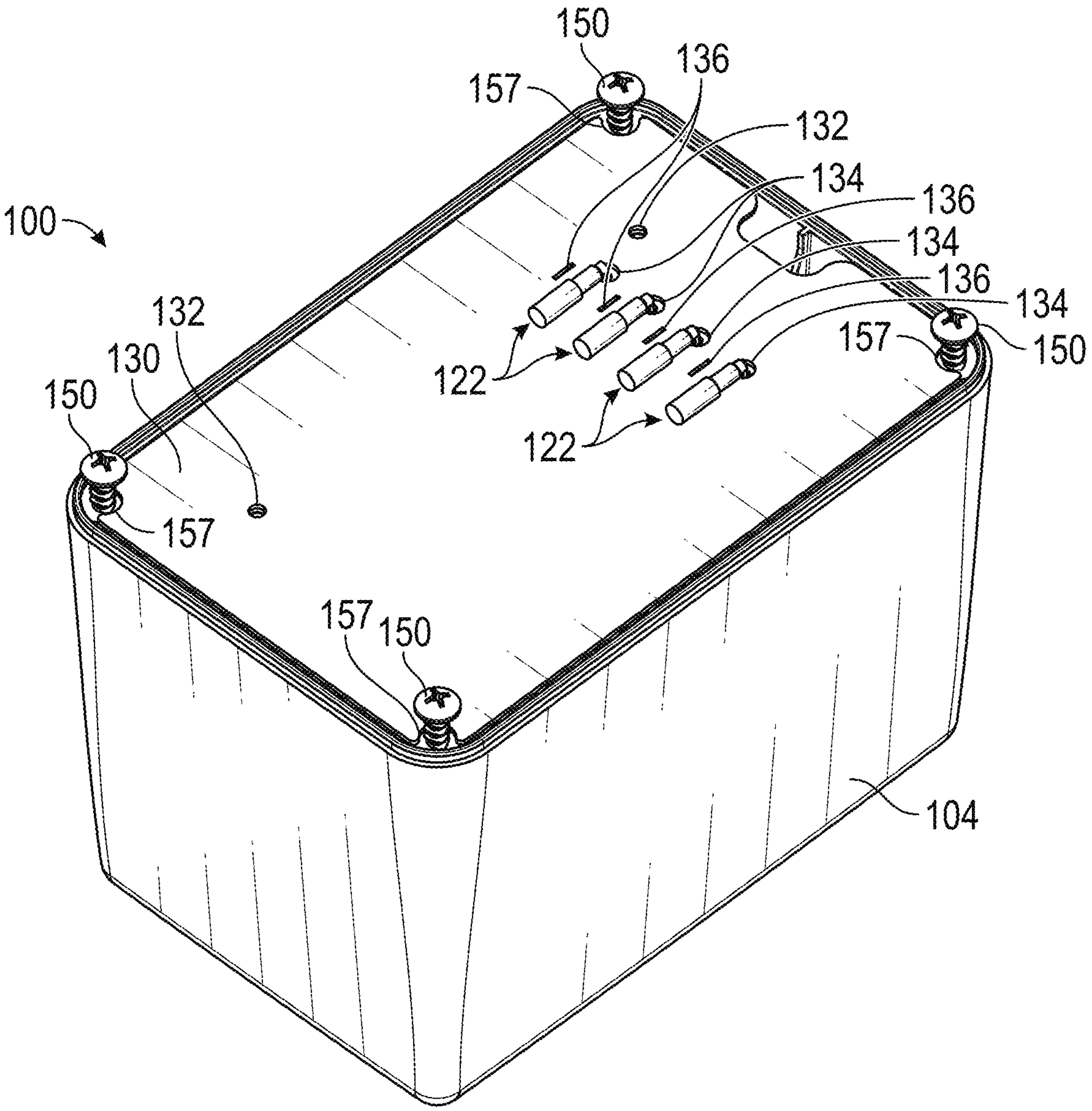
FIG. 2B illustrates a bottom perspective view of the antenna assembly of FIG. 1 with the base removed.
Figure 5A:
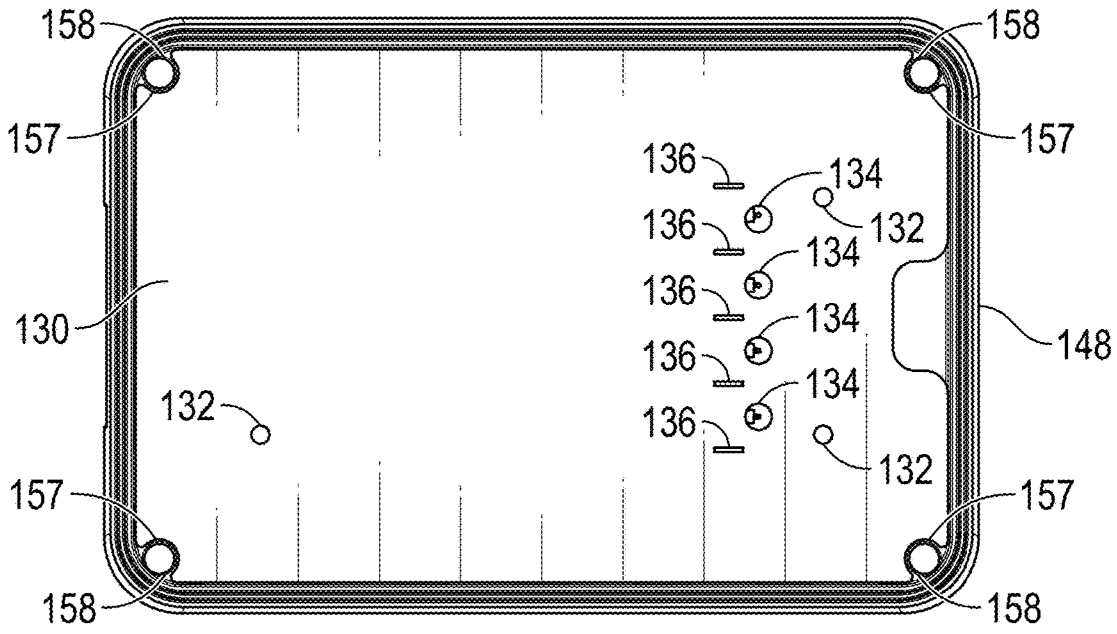
FIG. 5A illustrates a top view of an internal ground plane positioned on the base of the antenna assembly of FIG. 1.

Referring now to FIG. 2B, which illustrates a perspective bottom view of the internal ground plane 130 positioned in the antenna assembly 100 with the support base 148 removed, and FIG. 5A, which illustrates a top view of the internal ground plane 130 positioned on the support base 148, the internal ground plane 130 may serve as the ground plane for at least the radiating antenna elements 110A, 110B, 112A, 112B and the microstrip transmission lines 116. The internal ground plane 130 is configured to be housed within the multi-element multi-band antenna 102 (e.g., between the radome 104 and the support base 148). The internal ground plane 130 may serve as an electrical reference point for operation of the multi-element multi-band antenna 102. In some embodiments, the internal ground plane 130 establishes a surface for the coaxial cables 122 to use as a reference for continuation of the signal from the radio to the radiating elements 110A, 110B, 112A, 112B.

The internal ground plane 130 can include one or more tooling holes 132, a plurality of cable holes 134, and/or a plurality of slits 136. The tooling holes 132 may serve the alignment function described above. The number of cable holes cable holes 134 in the internal ground plane 130 can be defined by the number of radiating elements in the multi-element multi-band antenna 102. For example, where the multi-element multi-band antenna 102 includes four radiating elements, the internal ground plane 130 can include four cable holes 134 where the terminated coaxial cables 122 may be installed. The four cable holes 134 may be arranged in a collinear manner, which allows for the center conductor 124 of each terminated coaxial cable 122 to pass through the internal ground plane 130 without being in electrical contact with the internal ground plane 130. The plurality of slits 136 can be positioned around the cable holes 134. For example, one or more slits 136 can be positioned around each terminated coaxial cables 122. The slits 136 can provide a thermal barrier between the outer conductors 126 of neighboring terminated coaxial cables 122 when using a soldering process to establish electrical connection between the internal ground plane 130 and the outer conductors 126 of the terminated coaxial cables 122. For example, the slits 136 can be heat relief features.

As shown in FIG. 2B, in some embodiments, the terminated coaxial cables 122 may be arranged on the bottom side of the internal ground plane 130 with each outer conductor 126 positioned between a pair of adjacent slits 136. The outer conductors 126 of the terminated coaxial cables 122 may be soldered to the bottom side of the internal ground plane 130 to electrically connect each outer conductor 126 to the internal ground plane 130. When arranged in the manner shown in FIG. 2B, the plurality of slits 136 may serve as a stopping point or a dam to contain the placement of the solder during the soldering process. For example, the plurality of slits 136 can provide thermal management, such as inhibiting the conduction of heat in its flow into the expanse of the PCB 108 during the assembly (e.g., soldering) process. The size and shape (e.g., diameter) of the coaxial inputs 118 and cable holes 134 can be selected to obtain an impedance match between the terminated coaxial cables 122 and the microstrip transmission lines 116.

The internal ground plane 130 can include a plurality of fastener openings 157 that can extend through the internal ground plane 130. The fastener openings 157 can be positioned in the corners of the internal ground plane 130. The fastener openings 157 can be aligned with fastener holes 156 of the radome 104 (see e.g., FIG. 4A) and fastener holes 158 of the support base 148 (see e.g., FIG. 5B). Fasters 150 (see e.g., FIG. 2B) can be used to securely couple the support base 148 to the radome 104, with the internal ground plane 130 therebetween. In some cases, the fastener openings 157 can be sized to prevent contact between the fasteners 150 and the internal ground plane 130.

The internal ground plane 130 can made of a conductive material, such as die cast aluminum. In some cases, the internal ground plane 130 may be a solderable sheet metal material such as brass, copper, tin plated steel, and/or the like. In some embodiments, the antenna assembly 100 can include a PCB support (not shown) that can be positioned between the PCB 108 and the internal ground plane 130. In some cases, the internal ground plane 130 may be a copper surface on the back side of PCB support. When included, the PCB support may serve a supporting substrate for the PCB 108. For example, the PCB support may be positioned between the PCB 108 and the internal ground plane 130 to provide additional spacing (e.g., a gap) between the transmission lines 116 and the internal ground plane 130. This arrangement may provide certain benefits when the non-conductive PCB 108 is not thick enough to provide adequate spacing for the desired performance of the microstrip transmission lines 116. The PCB support can be FR4, plastic, foam, and/or the like. In some embodiments, the PCB support is a single continuous piece. In other embodiments, the PCB support may be a plurality of smaller support portions that may include gaps between the separate support portions.

When included in the antenna assembly 100, the PCB support can include a plurality of cable holes, which may be arranged in a collinear manner. For example, the PCB support may include four collinear cable holes. The cable holes can allow the center conductors 124 of the terminated coaxial cables 122 to pass through the PCB support such that the center conductor 124 can connect to the transmission lines 116 via the coaxial inputs 118 of the PCB 108. The PCB support can include one or more tooling holes. The tooling holes may serve the alignment function described above. In some embodiments, the PCB support may include a hole that can be configured to allow at least a portion the GPS antenna 138 to pass through the PCB support. The hole may be the same shape as the base of the GPS antenna 138. For example, in some embodiments, the hole can be shaped as an octagon of unequal sides. In the assembled configuration, the hole in the PCB support can be aligned with the hole 190 of the PCB 108.

Figure 5B:
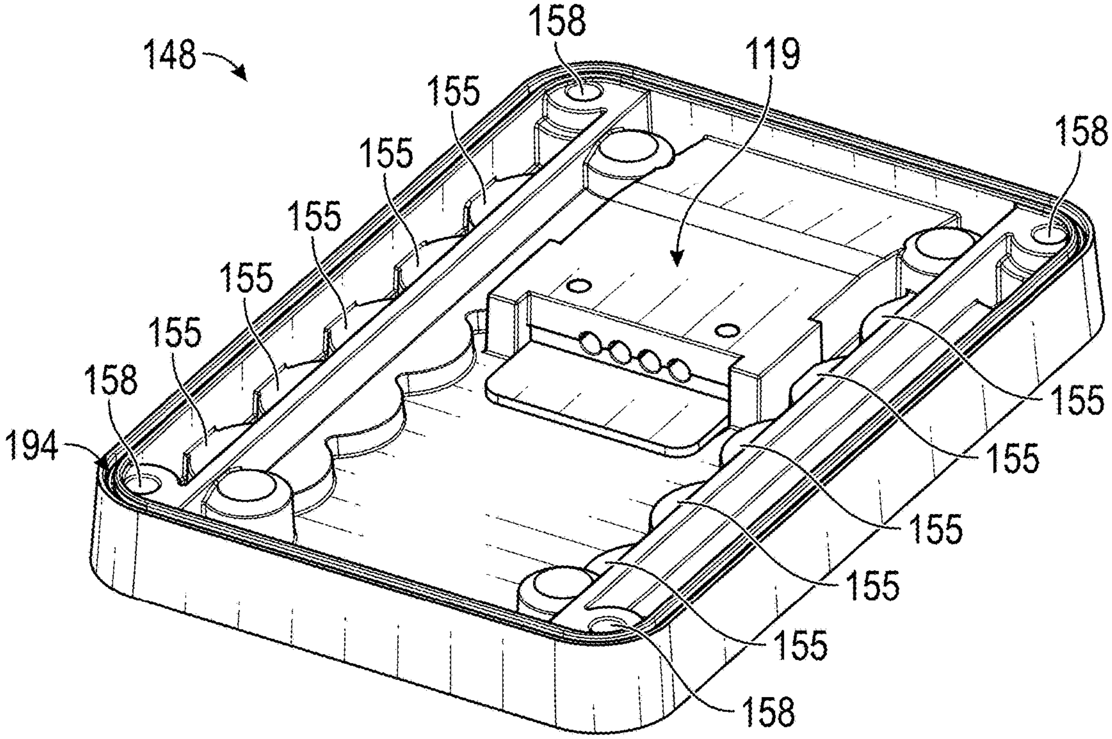
FIG. 5B illustrates a perspective top view of the base of the antenna assembly of FIG. 1.

Turning now to FIG. 5B, a perspective top view of the support base 148 of the multi element multi-band antenna 102 is shown. In some embodiments, the support base 148 may be electrically conductive (e.g., be made of a conductive material). Having a conductive support base 148 for the multi-element multi-band antenna 102 may provide certain advantages, such as providing an electrical connection between the internal ground plane 130, which can be positioned on the support base 148 in the assembled configuration, and a client ground plane (not shown) In some embodiments, the support base 148 includes a plurality of small gaps (not shown) in the surface of the support base 148, which may facilitate the use of non-conductive weather resistant material. In some embodiments, the size and proximity of the support base 148 may be selected to provide an electromagnetic connection between the client ground plane and the internal ground plane 130.

The support base 148 can include a plurality of fastener holes 158 and/or a base slot 194. Either or both of these features may assist with mechanically coupling the support base 148 to the radome 104. For example, a bottom edge 170 of the radome 104 can be received within the base slot 194 when the antenna assembly 100 is in the assembled configuration. In some implementations, a seal (e.g., an O-ring) can be positioned in the base slot 194 prior to inserting the bottom edge 170 of the radome 104. The fastener holes 158 can be aligned with the fastener holes 156 of the radome 104, such that fasteners 150 can extend through the support base 148 via the fastener holes 158 and into the plurality of fastener holes 156 of the radome 104.

The support base 148 can optionally include one or more magnet holders 155. The one or more magnet holders 155 can extend upwardly from the bottom of the internal ground plane 130 and may be configured to receive magnets 154 of the antenna assembly 100. For example, FIG. 2A shows a bottom view of the antenna assembly 100, with the magnets 154 positioned in the magnet holders 155. The magnets 154 may be positioned in the support base 148 to allow the antenna assembly 100 to be magnetically coupled to a client ground plane or other magnetic surface. In other embodiments, threaded fasteners or other suitable mechanical means can be used instead of or in addition to the magnets 154 to create the mechanical coupling between the antenna assembly 100 and the client ground plane or other location where the antenna assembly 100 is to be deployed.

With continued reference to FIG. 2A, the antenna assembly 100 can include a gasket 152. The gasket 152 may be a non-conductive or electrically-conductive weather gasket, for example. The gasket 152 may be secured to the bottom side of the support base 148. In this arrangement, the gasket 152 can be positioned between the support base 148 and a deployment surface, such as the client ground plane. The gasket 152 may also provide a non-slip surface between the antenna assembly 100 and the location where the antenna assembly 100 is deployed. The gasket 152 can be fixed to the support base 148 using any conventional means (e.g., adhesive). In some embodiments, the gasket 152 can help prevent fluid from entering the antenna assembly 100 and damaging the multi-element multi-band antenna 102. In some instances, the gasket 152 is an anti-skid gasket to assist the stability of the placement of the antenna assembly 100. In some embodiments, the gasket 152 may include a plurality of openings 153. The openings 153 may be positioned on the gasket 152 so that the openings 153 align with the plurality of magnets 154. The openings 153 may increase a strength of magnetic coupling between the magnets 154 and the deployment location. In other implementations, the gasket 152 may not include the openings 153, and the magnets 154 may be covered by the gasket 152.

Figure 4A:
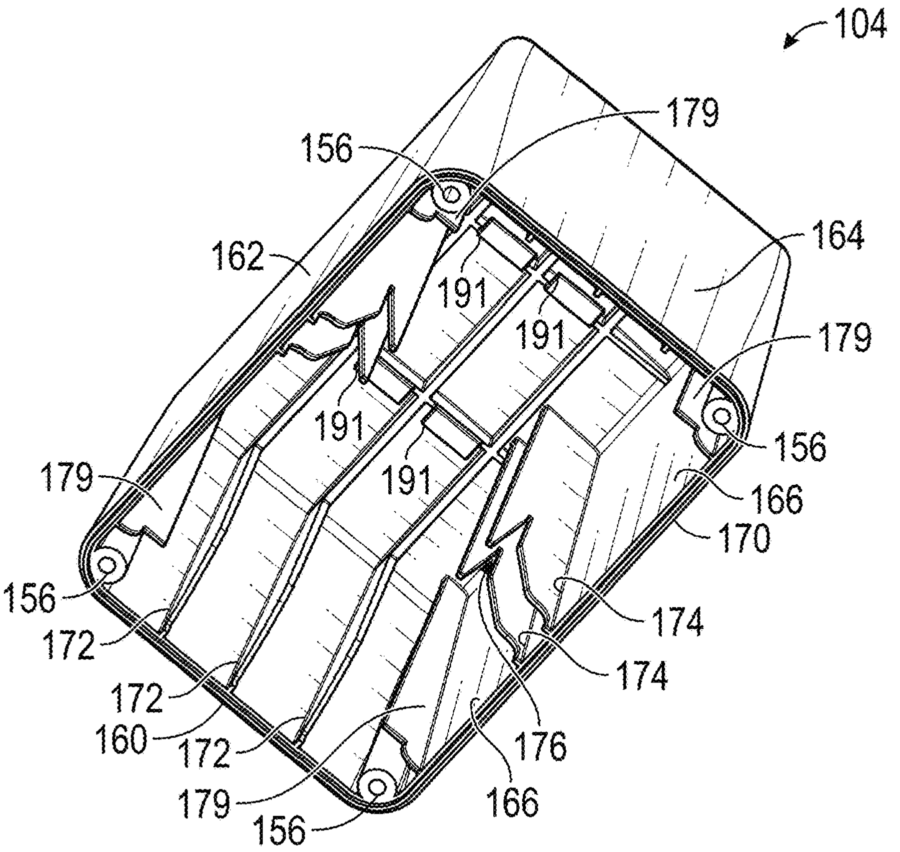
FIG. 4A illustrates a perspective internal view of the cover of the antenna assembly of FIG. 1.
Figure 4B:
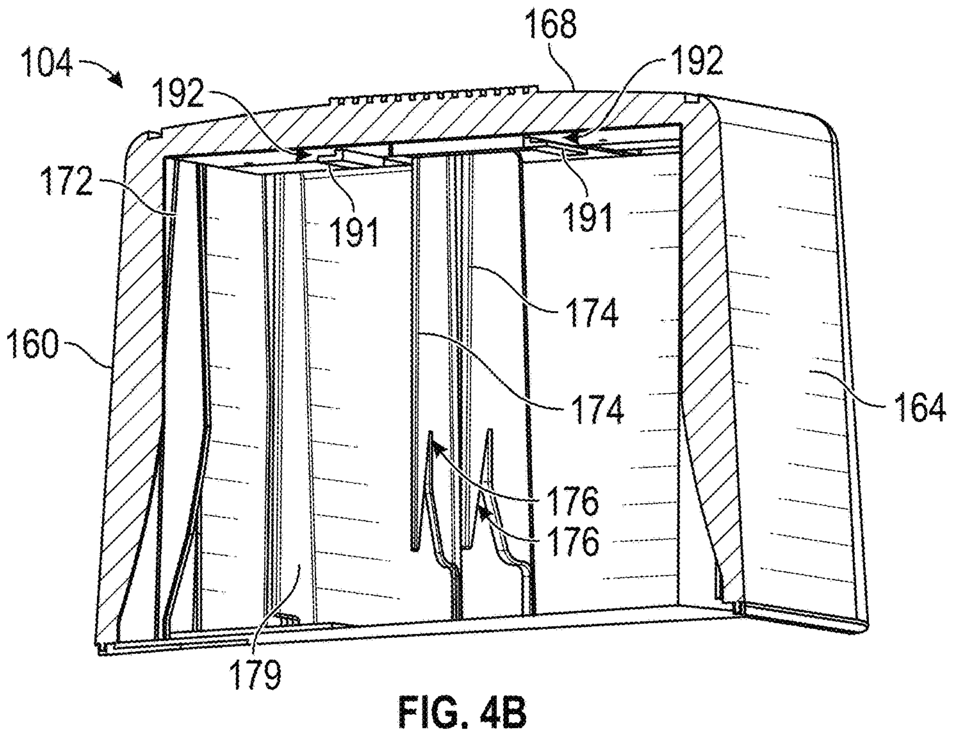
FIG. 4B illustrates a section view of the cover of the antenna assembly of FIG. 1 taken along the line 4B-4B in FIG. 2A.

FIG. 4A shows an internal perspective view of the radome 104 and FIG. 4B shows a perspective section view of the radome 104 taken along the line 4B-4B in FIG. 2A. The radome 104 may provide mechanical support for the multi-element multi-band antenna 102. The radome 104 may be transparent to radiation from the multi-element multi-band antenna 102 and may serve as an environmental shield for the internal components of the multi-element multi-band antenna 102. The radome 104 may be made of a non-conductive material.

In some implementations, the radome 104 may be generally rectangular prism shaped, with an open bottom. In other implementations, other shapes are possible for the radome 104. The radome 104 can include four side walls, 160, 162, 164, and 166 and a top wall 168. The top wall 168 is fixed to the four side walls 160, 162, 164, and 166, which also define a periphery or bottom edge 170 of the radome 104. The side walls 160, 162, 164, and 166 may be substantially perpendicular to the internal ground plane 130 and/or the top wall 168 in the assembled antenna assembly 100. In some embodiments, one or more of the side walls 160, 162, 164, and 166 may have a taper when extending from the bottom edge 170 to the top wall 168. For example, the side walls 160, 162, 164, and 166 may be at an angle less than 90-degrees relative to a plane defined by the internal ground plane 130. In the assembled configuration, the bottom edge 170 of the radome 104 may extend into the base slot 194 of the support base 148 (see e.g., FIG. 5B).

When assembling the antenna assembly 100, the radome 104 can be positioned on the support base 148 (see e.g., FIG. 1) to secure the internal components of the multi-element multi-band antenna 102 and the internal ground plane 130. The radome 104 may include a plurality of fastener holes 156 on the bottom portion of the radome 104. In some embodiments, the plurality of fastener holes 156 may be positioned at each corner of the radome 104 and/or along one or more of the sidewalls 160, 162, 164, 166 of the radome 104. The plurality of fastener holes 156 may extend up the side walls 160, 162, 164, and 166 of the radome 104. In some embodiments, the fastener holes 156 may be tapered. In some embodiments, the fastener holes 156 may be threaded. In some embodiments, the fasteners 150 can be thread forming screws such that the fastener holes 156 may not be tapped prior to installation. The plurality of fastener holes 156 may be aligned with fastener holes 158 of the support base 148 in the assembled antenna assembly 100 and fasteners 150 (see e.g., FIG. 3) can be positioned within the holes 156, 158 to secure the radome 104, the internal ground plane 130 and the internal components of the multi-element multi-band antenna 102 to the support base 148.

In accordance with some embodiments, the radome 104 may include one or more features that can be used to support the radiating elements 110A, 110B, 112A, 112B via the PCB portions 108 and to define the shape of the radiating elements 110A, 110B, 112A, 112B. For example, as shown in FIGS. 4A and 4B, the radome 104 can include one or more first ribs 172, one or more second ribs 174, one or more wall guides 179, and/or one or more top supports 191. The interior ribs and slot features (e.g., the first ribs 172, second ribs 174, slots 176, and top supports 191) of the radome 104 can hold the radiating elements 110A, 110B, 112A, 112B in place for proper mechanical alignment during the fabrication of the multi-element multi-band antenna 102 such that the radiating elements 110A, 110B, 112A, 112B are held in their desired positions so that the multi-element multi-band antenna 102 meets it desired electrical performance for return loss and radiation patterns over the desired frequency band.

Figure 9:
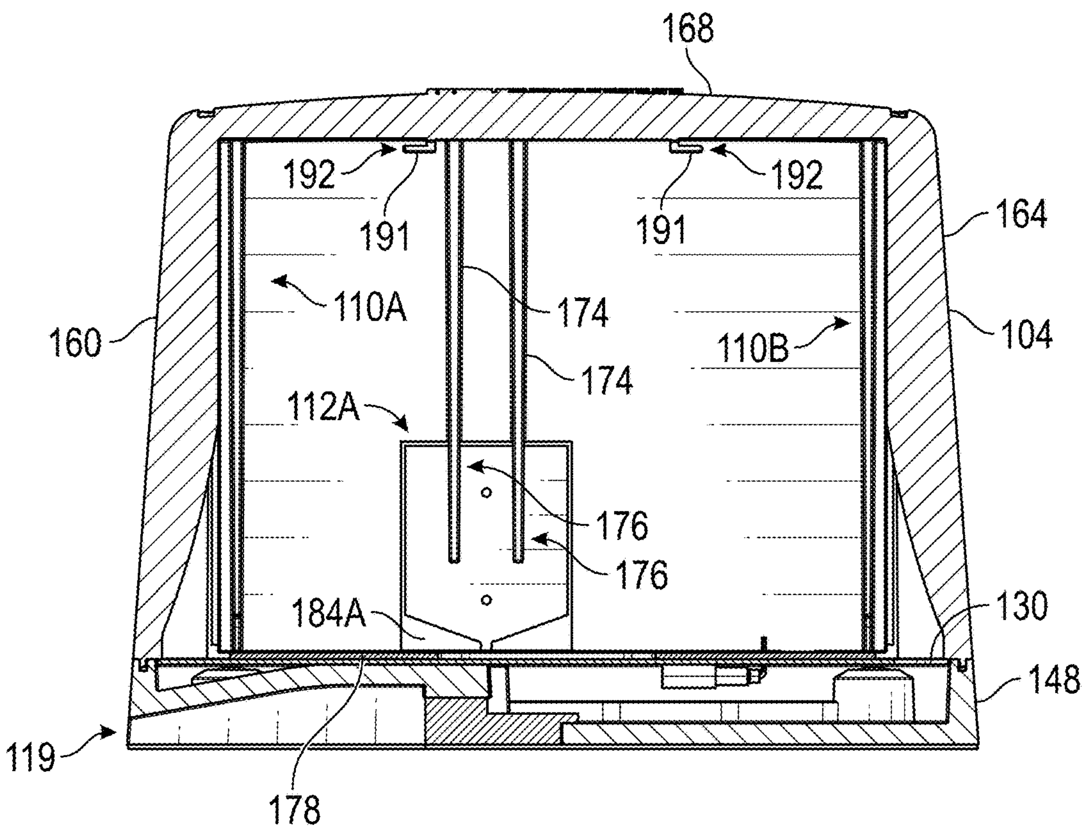
FIGS. 9 and 10 illustrate section views of the antenna assembly of FIG. 1 taken along the line 4B-4B in FIG. 2A.
Figure 10:
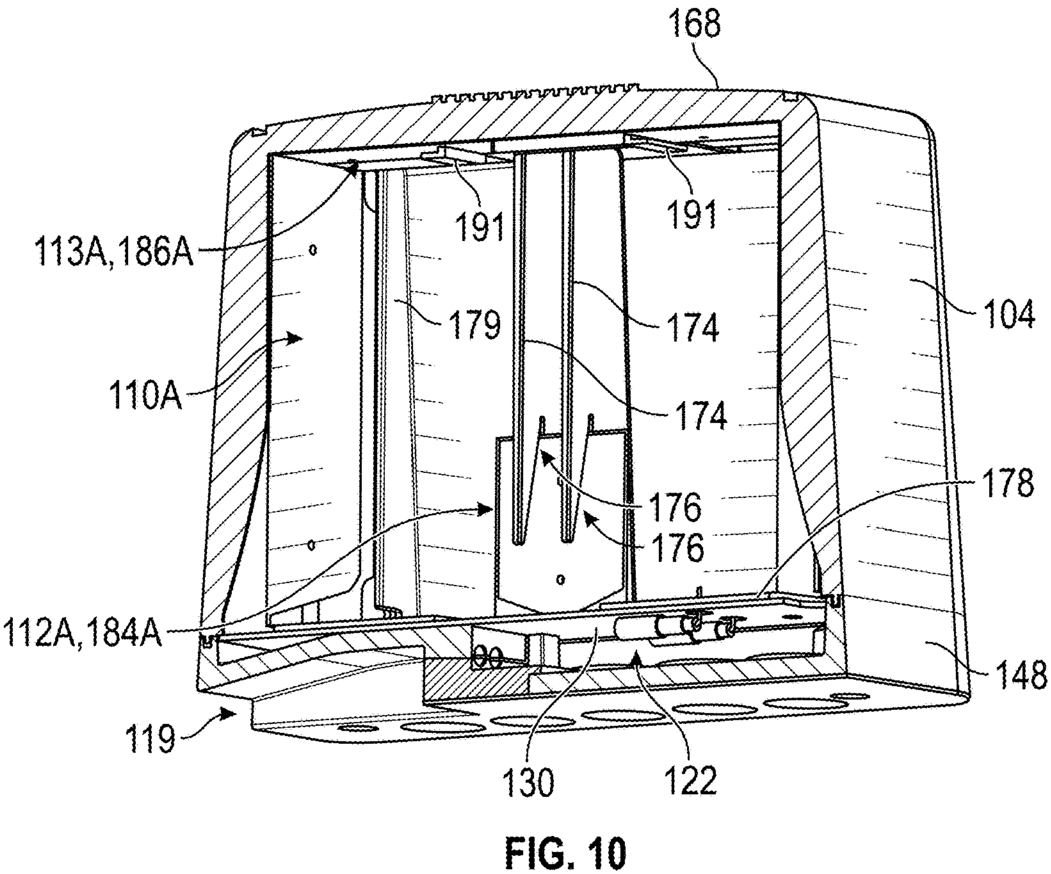

The second ribs 174 can be used to support the radiating elements 112A, 112B in the upright configuration. The second ribs 174 may be projections or catch points extending from the interior sides of the walls of the radome 104. For example, the second ribs 174 can extend inwardly from the side walls 162, 166 towards the center of the interior the radome 104. The second ribs 174 may extend from the bottom edge 170 to the top wall 168. The second ribs 174 may include a bottom tapered portion that is at an angle relative to vertical axis and an upper portion that is generally aligned with the vertical axis. In the embodiment illustrated in FIGS. 4A and 4B, the side walls 162, 166 each includes a pair of second ribs 174, one pair of second ribs 174 for the radiating element 112A and one pair of second ribs 174 for the radiating element 112B. The radome 104 may include more or less second ribs 174, depending on the number of WiFi radiating elements included in the multi-element multi-band antenna 102. Each second rib 174 can include a slot 176. The slots 176 may be generally V-shaped. The outer edge of the slot 176 may extend downwardly to a point before the second rib 174 extends vertically to the top wall 168. The radiating elements 112A, 112B can be received in the slots 176 in the assembled antenna assembly 100. For example, FIG. 9 shows a section view of the antenna assembly 100 taken along the line 4B-4B in FIG. 2A, with the radiating element 112A positioned in the slots 176 of the second ribs 174. In the assembled configuration, the radiating elements 112A, 112B can be received and supported by the second ribs 174 via the slots 176.

In some embodiments, the antenna assembly 100 may include one or more stiffeners 120 (see e.g., FIGS. 6A and 6B), that may be located between each pair of second ribs 174. The stiffeners 120 may be configured to provide structural support to the radiating elements 112A, 112B and may be positioned between the PCB portions 184A, 184B and the side wall 162, 166 of the radome 104. The stiffeners 120 can help the PCB portions 184A, 184B remain planer when installed in the radome 104 and, desirably throughout the life of the multi-element multi-band antenna 102. The stiffeners 120 may be made of any suitable material, such as plastic, FR4, other non-conductive material, and/or the like. Generally, the stiffeners 120 are made of a non-conductive material. In some embodiments, the stiffeners 120 may be mechanically coupled to the back sides of the PCB portions 184A, 184B using any conventional means.

Figure 7A:
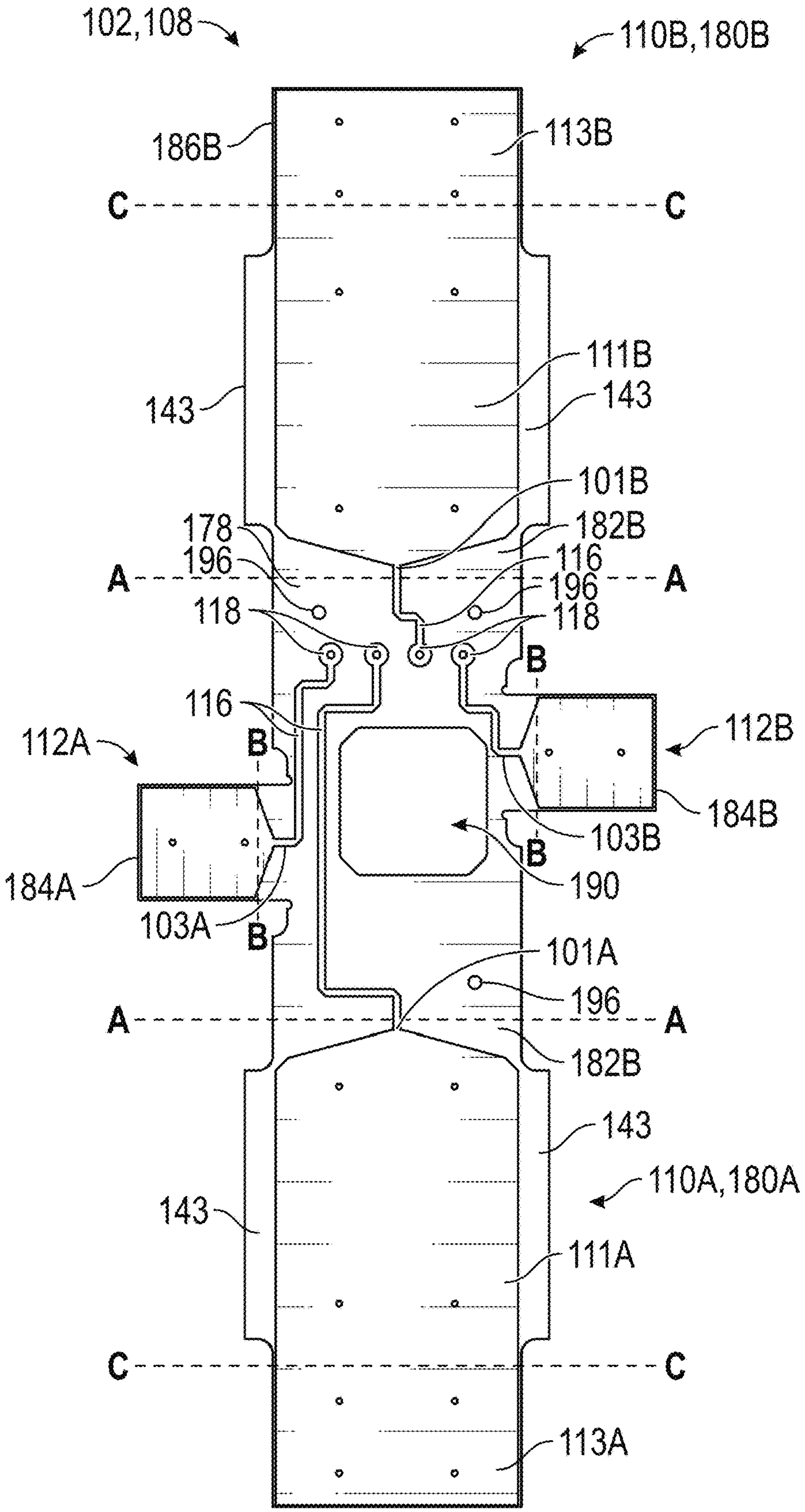
FIGS. 7A-7C illustrate perspective isolation views of the multi-band multi-element antenna of the antenna assembly of FIG. 1 in various assembly configurations.
Figure 7B:
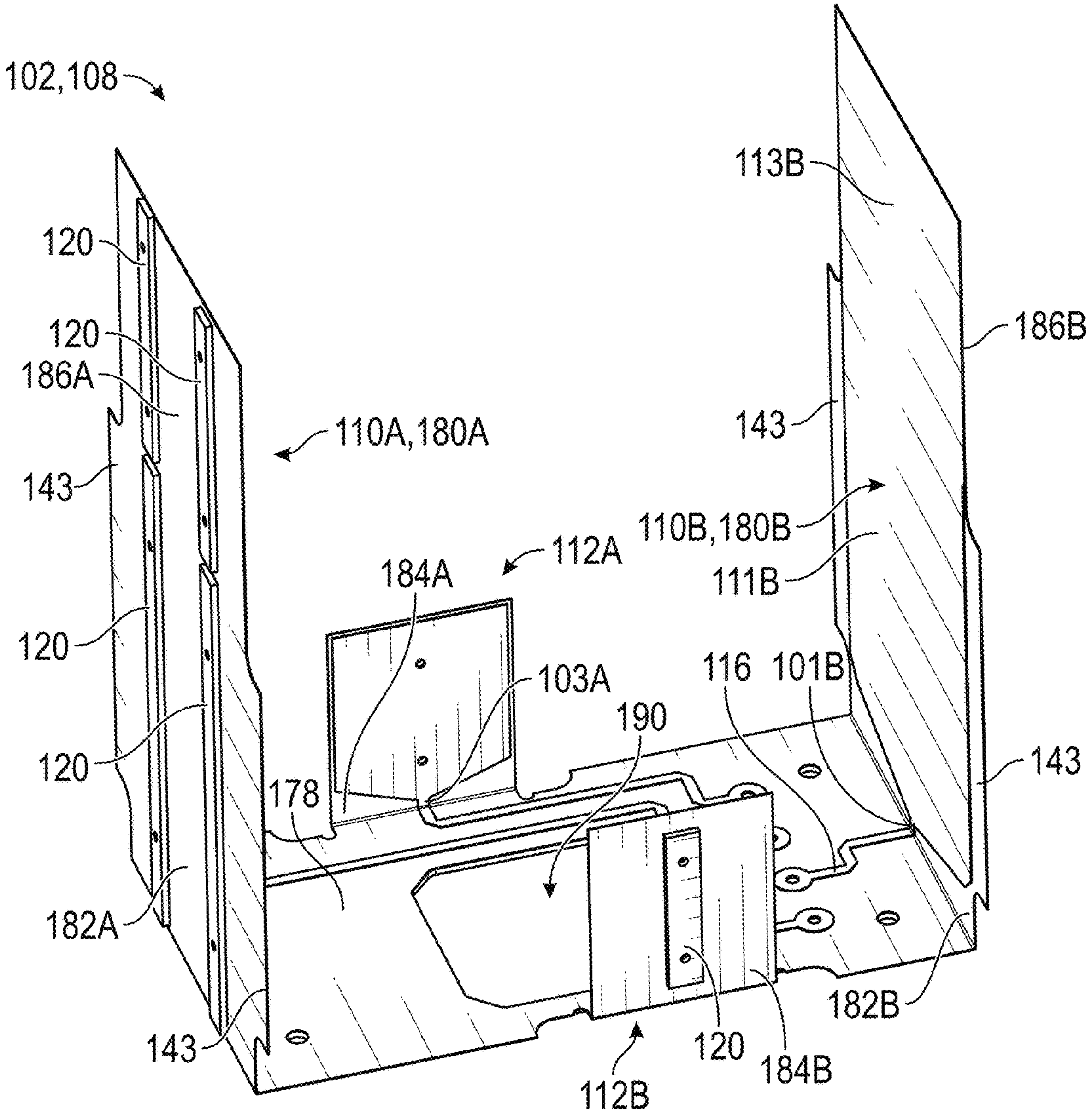
Figure 7C:
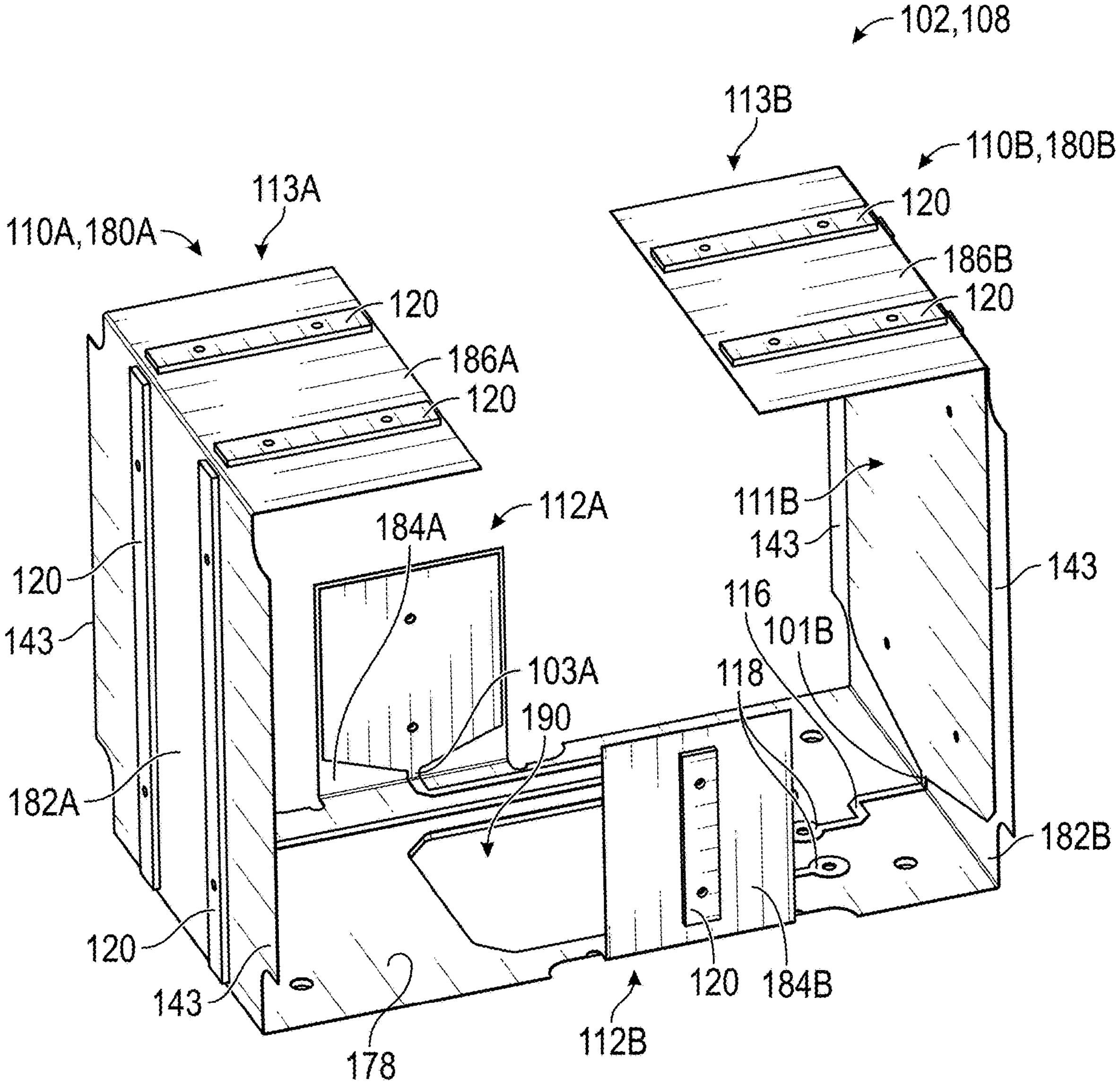
Figure 21:
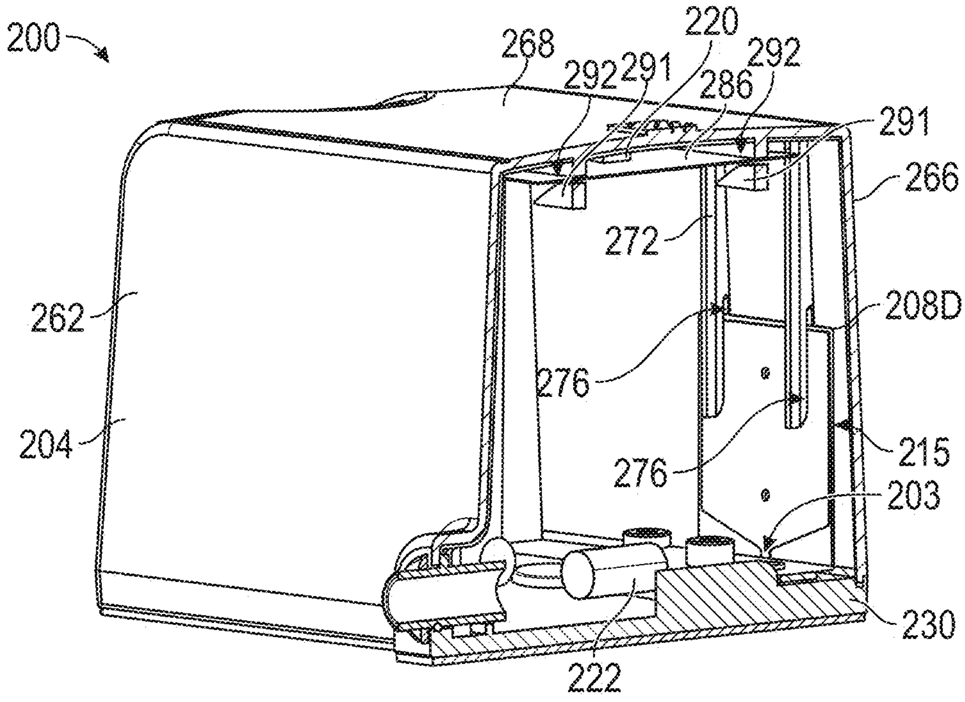
FIG. 21 illustrates a section view of the antenna assembly of FIG. 1 taken along the line 21-21 in FIG. 15.

The first ribs 172 and the wall guides 179 can be used to support the radiating elements 110A, 110B in addition to assisting in the formation of the shape of the radiating elements 110A, 110B, as described further with reference to FIGS. 7A-7C. The first ribs 172 can be projections that extend from the interior sides of the walls of the radome 104. For example, one or more first ribs 172 can extend inwardly from the side wall 160 towards the center of the interior the radome 104 and one or more first ribs 172 can extend inwardly from the side wall 164 towards the center of the interior the radome 104. As shown in FIG. 21, the first ribs 172 can connect to top ribs 193 that extend from the first ribs 172 towards and along the interior of the top wall 168. In some cases, the first ribs 172 can include a curved top portion connecting the first ribs 172 to the top ribs 193. The wall guides 179 can be projections extending from the interior sides of the walls of the radome 104. The wall guides 179 can be substantially perpendicular to the first ribs 172. For example, the wall guides 179 can extend inwardly from the side walls 162, 166 towards the center of the interior of the radome 104. One wall guide 179 can be positioned near each outer first rib 172. Moving inwardly from the side wall 160 or the side wall 164, a gap exists between the first ribs 172 and the wall guides 179. In the assembled antenna assembly 100, a portion of the radiating elements 110A, 110B can be positioned within this gap. For example, as shown in FIG. 21, the radiating element 110A is positioned between the gaps between the first ribs 172 and the wall guides 179. As explained further with reference to FIGS. 7A-7C, the wall guides 179 can be used as a catch feature for mechanical stability for the radiating elements 110A, 110B, along with the stiffeners 120. For example, the stiffeners 120 can be positioned between or against one or more first ribs 172 to provide structural support to the upright radiating portions 111A, 111B of radiating elements 110A, 110B. Additional stiffeners 120 may be configured to support the head radiating portions 113A, 113B. For example, stiffeners 120 may be positioned between the upright PCB portions 182A, 182B and the side wall 160, 164 of the radome 104 respectively and additional stiffeners 120 may be positioned between the top portion PCB portions 186A, 186B and the top wall 168. The stiffeners 120 can help the PCB portions 180A, 180B remain planer when installed in the radome 104 and, desirably throughout the life of the multi-element multi-band antenna 102.

The top supports 191 are configured to provide support for the head radiating portions 113A, 113B of the radiating elements 110A, 110B. The top supports 191 can include slots 192 for receiving the top portion PCB portions 186A, 186B. For example, the edges of the top PCB portions 186A, 186B may extend into the slots 192 to provide support for the radiating elements 110A, 110B and to maintain the desired configuration of the radiating elements 110A, 110B. The top supports 191 can extend vertically from the interior of the top wall 168 towards the support base 148. The top supports 191 may be generally L-shaped projections. Each top support 191 can include a slot 192 that face the side walls 160, 164. In some embodiments, the radome 104 may include four top supports 191, which may include two slots 192 for the first PCB portion 180A and two slots 192 for the second PCB portion 180B.

FIGS. 7A-7C show isolation views of the PCB 108 of the multi-element multi-band antenna 102 in various states of assembly. FIG. 20A shows the PCB 108 of the multi-element multi-band antenna 102 with the radiating elements 110A, 110B, 112A, 112B in a first/pre-assembly configuration, FIG. 20B shows the PCB 108 of the multi-element multi-band antenna 102 with the radiating elements 110A, 110B, 112A, 112B in a second/partial-assembly configuration, and FIG. 20C shows the PCB 108 of the multi-element multi-band antenna 102 with the radiating elements 110A, 110B, 112A, 112B in a third/final-assembly configuration. As noted above, in some embodiments, the interior portion of the radome 104 (e.g., the ribs 172, 174, wall guides 179, and top supports 191) are configured as catch points for the PCB portions 108 and can be used to shape the radiating elements 110A, 110B, 112A, 112B. For example, the interior portions of the radome 104 can hold the radiating elements 110A, 110B, 112A, 112B in place for proper mechanical alignment during the fabrication of the antenna. Proper mechanical alignment can ensure that the radiating elements 110A, 110B, 112A, 112B are held in their proper place so that the multi-element multi-band antenna 102 meets its desired electrical performance for return loss, radiation patterns, and other electrical characteristics over the desired frequency bands. The curved and three-dimensional characteristics of the PCB portions 108 can be obtained during the installation of the PCB portions 108 into the radome 104 due to the interior portion of the radome 104 (e.g., the ribs 172, 174, wall guides 179, and top supports 191) being configured such that the PCB portions 108 are bent during the assembly portion of the manufacturing upon insertion into the radome 104. In some implementations, the curved and three-dimensional characteristics of the PCB portions 108 can be obtained during the installation of the PCB portions 108 into the radome 104 without any manual bending or pre-bending of the PCB portions 108.

Turning to FIG. 20A, in a pre-assembly configuration, the PCB portions 108 may be flat with no bends. For example, the PCB portions 180A, 180B, 184A, 184B may be coplanar with the bottom PCB portion 178. The PCB 108 can be coupled to the internal ground plane 130 via the bottom PCB portion 178. For example, an adhesive can be applied to a bottom side of the bottom PCB portion 178 to allow the bottom PCB portion 178 to be coupled to the internal ground plane 130, as shown in FIGS. 6A and 6B. To ensure proper alignment, the tooling holes 196 of the bottom PCB portion 178 can be aligned with the tooling holes 132 of the internal ground plane 130 before coupling the two components. In this arrangement, the coaxial inputs 118 of the bottom PCB portion 178 should be aligned with the cable holes 134 of the internal ground plane 130.

Once the PCB 108 is coupled to the internal ground plane 130 via the bottom PCB portion 178, one or more of the PCB portions 108 can be bent into a final assembly state by inserting the PCB portions 108 into the radome 104. For example, as shown in FIG. 21, when the radome 104 is positioned on or inserted into the support base 148, the first and second PCB portions 180A, 180B can be guided through the gap between the first ribs 172 and the wall guides 179 (e.g., by a user holding the first and second PCB portions 180A, 180B). In some implementations, the wall guides 179 can be tapered so that the bottom of the wall guides 179 extend further into the interior of the radome 104 that the top. This design ensures that the top PCB portions 186A, 186B remain within the gap on initial insertion of the radome 104 because of potential contact between the top PCB portions 186A, 186B and the wall guides 179, and that the top PCB portions 186A, 186B can extend past the gap into the interior of the radome 104 on further insertion of the radome 104. For example, as the top edge of the first and second PCB portion 180A, 180B contacts the intersection between the first ribs 172 and the top ribs 193, which can be curved in some cases, the first and second PCB portion 180A, 180B are pushed inwardly from the side walls 160, 164 respectively and towards the top supports 191. With the first and second PCB portions 180A, 180B partially contained within the radome 104, the third and fourth PCB portions 184A, 184B can be inserted into the slots 176 of the second ribs 174 (e.g., by a user holding the third and fourth PCB portions 184A, 184B). Insertion of the third and fourth PCB portions 184A, 184B into the slots 176 can cause the third and fourth PCB portions 184A, 184B to bend along the fold lines B-B). The first and second PCB portion 180A, 180B can assume their final "L" shaped form on final insertion of the bottom edge 170 of the radome 104 into the base slot 194, as shown in FIG. 20C (e.g., with both the first and second PCB portion 180A, 180B being bent along the fold lines A-A and C-C due to engagement with the radome 104). The final insertion causes the top PCB portions 186A, 186B to enter the slots 192 of the top supports 191 (see e.g., FIGS. 9 and 10) and the first and second PCB portion 180A, 180B to bend along the bend lines C-C, defining the upright radiating portions 111A, 111B and the head radiating portion 113A, 113B of the radiating elements 110A, 110B respectively. The radome 104 can then be fixed to the support base 148 by threading fasteners 150 through the fastener holes 158 in the support base 148 and into the fastener holes 156 in the radome 104.

In some implementations, the one or more of the PCB portions 108 can be manually folded along the fold lines as part of the assembly process. For example, once the PCB portions 108 are coupled to the internal ground plane 130 via the bottom PCB portion 178, one or more of the PCB portions 108 can be bent into a partial or final assembly state. As noted herein, the PCB 108 can optionally comprise a Flex PCB substrate. As shown in FIG. 20B, the first PCB portion 180A and the second PCB portion 180B can be folded in a direction away from the bottom PCB portion 178 along the fold lines A-A. Folding the PCB portions 180A, 180B in this manner creates an approximately 90-degree angle between the bottom PCB portion 178 and the upright PCB portions 182A, 182B. Optionally, stiffeners 120 can be inserted into the stiffener slots (not shown) in the internal ground plane 130 behind the first PCB portion 180A and the second PCB portion 180B. In some cases, inserting the stiffeners 120 into the stiffener slots can cause the PCB portions 180A, 180B to bend approximately along the fold lines A-A. While the flex-circuit design of the radiating elements 110A, 110B, 112A, 112B may not require fold lines that are intended to bend, in some implementations, the fold lines (e.g., fold lines A-A, B-B, C-C, etc.) can be areas of the radiating elements 110A, 110B, 112A, 112B that are intentionally designed to bend, and the fold lines can guide and control the bending process. For example, the fold lines can be areas of the radiating elements 110A, 110B, 112A, 112B that comprise thinner or perforated substrate to facilitate bending without damaging the conductive traces. Other methods of enabling the PCB portions 108 to bend along a desired plane can also be implemented. Bendable fold lines may provide a particular benefit when the radiating elements 110A, 110B, 112A, 112B comprise sheet metal or another rigid material.

Optionally, when the PCB portions 108 are in the partially assembled state and coupled to the internal ground plane 130, the terminated coaxial cables 122 can be electrically connected to the antenna assembly 100, as described with reference to FIG. 11.

To complete the assembly of the multi-element multi-band antenna 102, the third and fourth PCB portions 184A, 184B can be folded in a direction away from the internal ground plane 130 along the fold lines B-B. Folding the PCB portions 184A, 184B in this manner creates an approximately 90-degree angle between the bottom PCB portion 178 and remainder of the PCB portions 184A, 184B. Optionally, additional stiffeners can be added to any of the PCB portions 108, such as on the back sides of the PCB portions 184A, 184B and on the top PCB portions 186A, 186B. The radome 104 can then be positioned on the top side of the support base 148, causing the first and second PCB portion 180A, 180B to assume their final three-dimensional form, as shown in FIG. 20C.

When the radome 104 is inserted onto the support base 148, the first and second PCB portions 180A, 180B can be guided through the gap between the first ribs 172 and the wall guides 179. In some implementations, the wall guides 179 can tapered so that the bottom of the wall guides 179 extend further into the interior of the radome 104 that the top. As the top edge of the first and second PCB portion 180A, 180B contacts the intersection between of the first ribs 172 and the top ribs 193, the first and second PCB portion 180A, 180B are pushed inwardly from the side walls 160, 164 respectively and towards the top supports 191. Continued insertion of the radome 104 causes the third and fourth PCB portions 184A, 184B to extend into the slots 176 of the second ribs 174. The first and second PCB portion 180A, 180B can assume their final "L" shaped form on final insertion of the bottom edge 170 of the radome 104 into the base slot 194, as shown in FIG. 20C. The final insertion causes the top PCB portions 186A, 186B to enter the slots 192 of the top supports 191 (see e.g., FIGS. 9 and 10) and the first and second PCB portion 180A, 180B to bend along the bend lines C-C, defining the upright radiating portions 111A, 111B and the head radiating portion 113A, 113B of the radiating elements 110A, 110B respectively. The radome 104 can then be fixed to the support base 148 by threading fasteners 150 through the fastener holes 158 in the support base 148 and into the fastener holes 156 in the radome 104.

The three-dimensional forming of the radiating elements 110A, 110B, 112A, 112B by the radome 104 during the assembly process advantageously reduces manufacturing time and expense and provides for properly shaped and positioned radiating elements 110A, 110B, 112A, 112B. For example, the radome 104 is used to form the radiating elements 110A, 110B, 112A, 112B into a desired "C" shape, "L" shape, or another suitable and desired three-dimensional shape.

Figure 11:
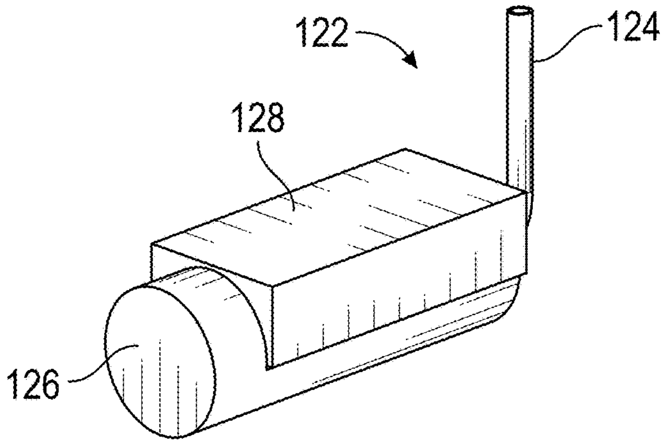
FIG. 11 illustrates an isolation view of a terminated coaxial cabled of the antenna assembly of FIG. 1.

FIG. 11 illustrates a perspective view of a terminated coaxial cable 122 of the multi-element multi-band antenna 102. The coaxial cables are the transmission lines that allow for the RF signal to travel from the output of the radio used to establish the wireless link from the basestation to the mobile radio of the users of the wireless network. The terminated coaxial cables 122 may require proper connection to the particular components of the multi-element multi-band antenna 102 so that it can function properly.

The terminated coaxial cables 122 may each include a center conductor 124 positioned within an outer conductor 126. The terminated coaxial cable 122 shown in FIG. 11 includes a schematic representation of solder 128. The solder 128 may be used to establish a soldered connection between the outer conductors 126 and the internal ground plane 130. For example, as shown in FIG. 2B, four coaxial cables 122 are soldered onto a bottom surface of the internal ground plane 130, with the center conductors 124 extending through cable holes 134 of the internal ground plane 130 towards the coaxial inputs 118 of the PCB 108.

In the multi-element multi-band antenna 102, the center conductors 124 can be electrically connected to the microstrip transmission lines 116 at the coaxial inputs 118. In accordance with some embodiments, including the illustrated embodiments, the center conductor 124 of the coaxial cables 122 are soldered to the coaxial inputs 118 of the PCB 108, which results in the coaxial cables 122 being electrically coupled to the microstrip transmission lines 116 and the radiating elements 110A, 110B, 112A, 112B. In some embodiments, other techniques can be employed to establish the electrical connection. For example, mechanical clamps with threaded fasteners can be used, spring loaded contacts can be used, electromagnetic coupling can be used, and/or the like. In the electromagnetic coupling example, the two conducting surface (e.g., the center conductor 124 and the transmission lines 116) do not physically touch but are in sufficiently close proximity to one another by a non-conductive material that provides a stable and consistent mechanical alignment. While soldering is used to establish the electrical connection between the outer conductors 126 of the coaxial cables 122 in the illustrated embodiment, in other embodiments, the same types of connection discussed for the center conductor 124 can be used to electrically couple the outer conductor 126 and the internal ground plane 130 of the multi-element multi-band antenna 102.

When assembling the antenna assembly 100, once the terminated coaxial cable 122 are electrically coupled to the internal ground plane 130, the internal ground plane 130 can be positioned on the support base 148. In some cases, an adhesive may be used to couple the internal ground plane 130 to the support base 148. In this arrangement, the coaxial cables (not shown) can be extend through the cable opening 119 of the support base 148 and out of the antenna assembly 100.

Referring back to FIGS. 6A and 6B, in some implementations, the multi-element multi-band antenna 102 can include a GPS antenna 138. The GPS antenna 138 is not shown in FIG. 3 for illustrative purposes. The GPS antenna 138 may also be referred to herein as a "GPS radiating device" 138. The GPS antenna 138 can be used to collect signal(s) from geosynchronous satellites so that the GPS function of a radio including the multi-element multi-band antenna 102 can determine where the multi-element multi-band antenna 102 is positioned relative to a global coordinate system. In some embodiments, the GPS antenna 138 may be secured to the internal ground plane 130. In the assembled antenna assembly 100, the GPS antenna 138 may be supported by and/or mechanically bonded to a top side of the internal ground plane 130. For example, an adhesive can be applied to the bottom of the GPS antenna 138.

In an assembled configuration, the multi-element multi-band antenna 102 may include the gasket 152 secured to the bottom side of the support base 148 with the magnets 154 positioned within the support base 148. The internal ground plane 130 may be positioned on the support base 148 with the terminated coaxial cables 122 coupled to the bottom side of the internal ground plane 130 via the outer conductors 126 and the center conductors 124 extending through the cable holes 134. The GPS antenna 138 may be coupled to the top side of the internal ground plane 130. The PCB support, when included, may be positioned on internal ground plane 130, with the GPS antenna 138 extending through a hole in the PCB support. The PCB 108 may be positioned within the radome 104, with the radome 104 allowing the PCB 108 to assume the three-dimensional shape illustrated in FIG. 20C during the installation process. The assembled radome 104 (e.g., with the PCB 108 secured) may be positioned on the support base 148, with the bottom edge 170 of the radome 104 extending into the base slot 194 of the support base 148 and the fastener holes 156 of the radome 104 aligned with the fastener holes 158 of the support base 148. Finally, the radome 104 can be fixed to the support base 148 via the fasteners 150.

FIGS. 12 and 13 illustrate alternative embodiments of the antenna assembly 100 with the radome 104 removed. FIG. 12 shows the antenna assembly 100 where the multi-element multi-band antenna 102 can include a first radiating element 110A, a second radiating element 110B, a third radiating element 112A, and a GPS antenna 138. FIG. 13 shows the antenna assembly 100 where the multi-element multi-band antenna 102 can include a first radiating element 110A, a second radiating element 110B, and a GPS antenna 138.

Second Antenna Assembly

The system and method in accordance with the present disclosure overcomes one or more of the above-discussed problems commonly associated with traditional antenna systems. In particular, the system of the present disclosure is an antenna system having a radome, a formed multi-band radiating elements supported on flexible printed circuit board (PCB) structures configured and adapted to be housed within the radome such that four bent PCB portions are positioned in a bent orientation during assembly. The PCB portions of the radiating element are paired with a formed ground plane that permits a frequency range of 450 MHz to 8 GHz, which provides a wider range of frequencies than antenna systems currently known in the art, with improved cost effectiveness and simplicity of manufacture. The four bent PCB portions allow for the antenna to be compact, making it ideal for compact 3GPP or other telecommunication transmitters. These and other unique features of the system are discussed below and illustrated in the accompanying drawings.

Figure 14:
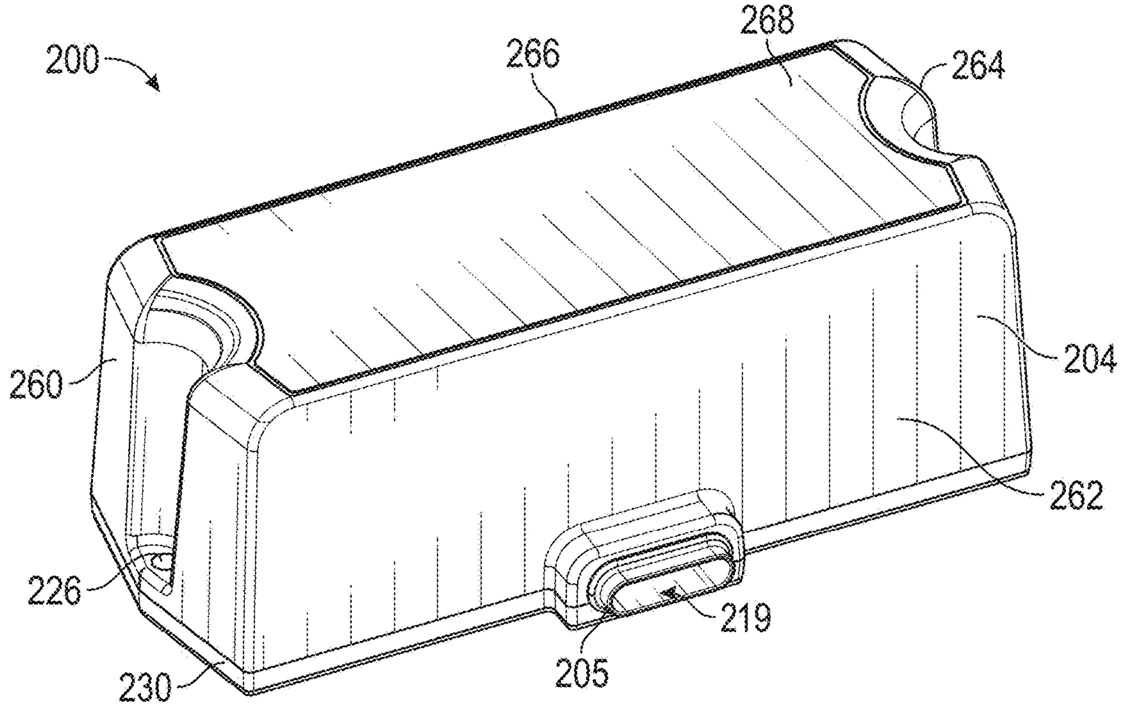
FIG. 14 illustrates a perspective view of an antenna assembly that includes a multi-element multi-band antenna enveloped by a non-conductive cover, according to some embodiments.
Figure 19A:
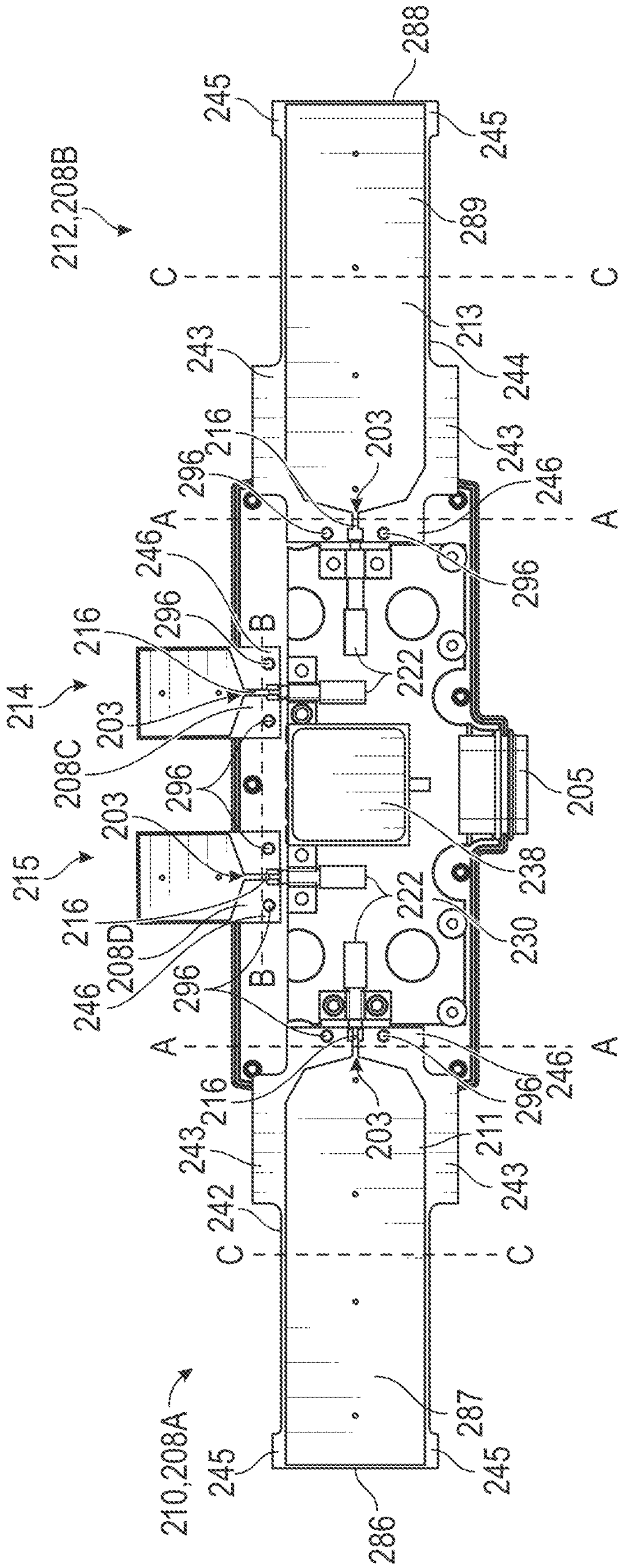
FIGS. 19A-19C illustrate perspective views of the antenna assembly of FIG. 14 with the non-conductive cover removed and the multi-band multi-element antenna in various assembly configurations.
Figure 19B:
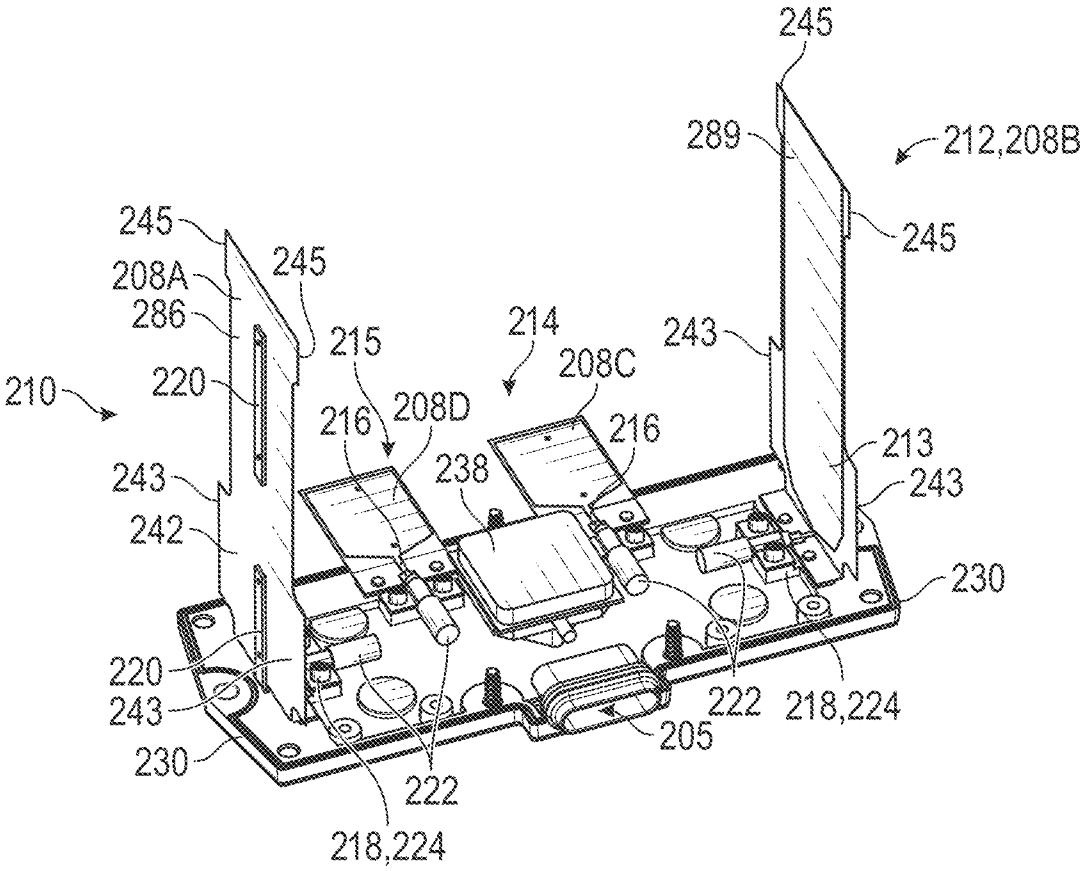
Figure 19C:
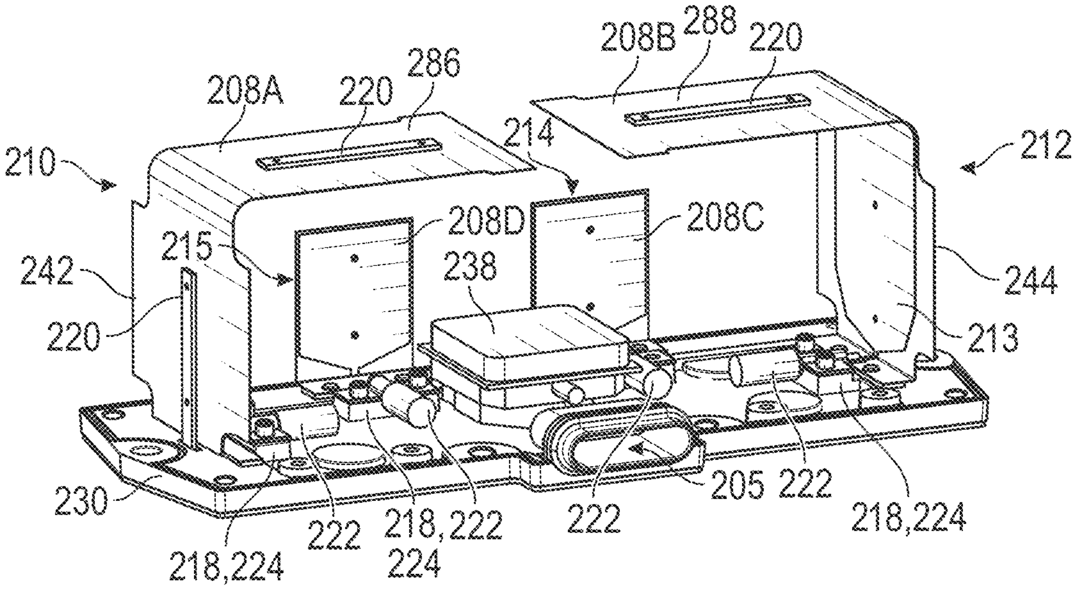
Figure 20:
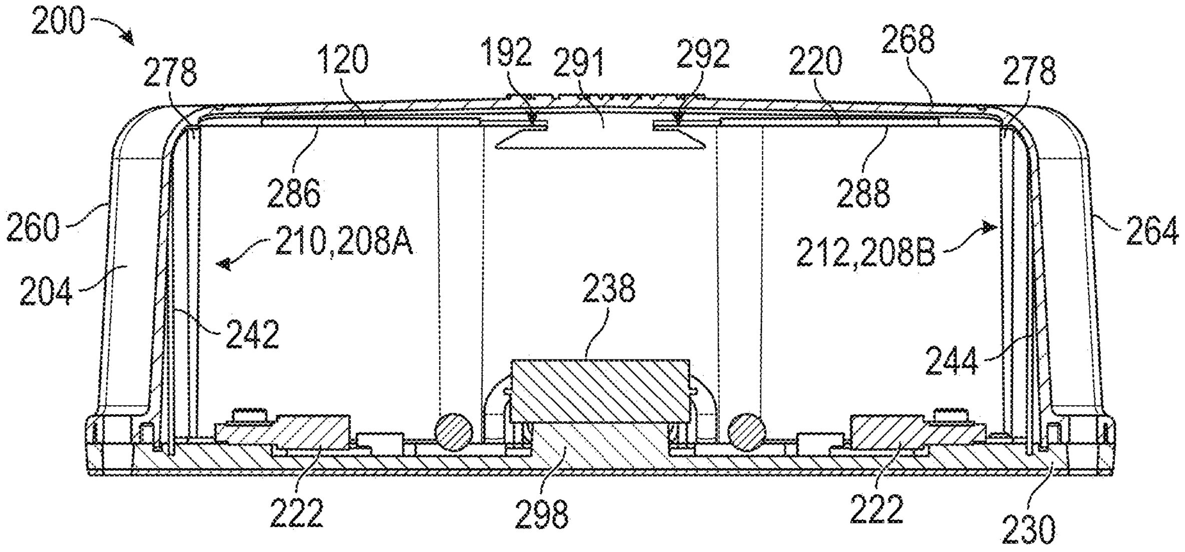
FIG. 20 illustrates a section view of the antenna assembly of FIG. 14 taken along the line 20-20 in FIG. 15.

Referring now to the drawings wherein like reference characters identify corresponding or similar elements in form and function throughout the several views. FIG. 14 illustrates a top perspective view of an antenna assembly that can include a multi-element multi-band antenna enveloped by a non-conductive cover. FIGS. 15-18 illustrate various views of components of the antenna assembly, according to some embodiments. FIGS. 19A-19C illustrate the antenna assembly with the multi-element multi-band antenna in various assembly configurations, according to some embodiments. FIGS. 20 and 21 illustrate section views of the antenna assembly, according to some embodiments.

According to some embodiments, features and aspects of this disclosure, a multi-band antenna system can be a multi-band monopole antenna system that has a configuration that, when used in conjunction with high order electromagnetic modes generated or received by a transceiver and/or receiver, permit the multi-element multi-band antenna system to have an operating frequency range of between about 450 MHz to about 8 GHz. A radome can be advantageously configured and adapted to have ribs, slots, catch points, and/or the like features within an interior portion of the radome to hold the radiating elements of the antenna in place for proper mechanical alignment during the fabrication of the antenna. Proper mechanical alignment can ensure that the radiating elements are held in their proper place so that the antenna meets it desired electrical performance for return loss and radiation patterns over the desired frequency bands. Flex circuit support portions and/or PCB portions can be made of polyimide or other similar flexible material and can support copper features of one or more radiating elements etched into its structure. The curved features of the flex circuits can be preferably and advantageously obtained during the installation of the flex circuits into the radome due to the unique ribbing and configuration of the interior of the radome such that portions of the flex circuits are bent during manufacturing upon insertion into the radome. The two shorter of the four radiating elements can be configured and adapted to be used for communication between about 1 GHz to about 8 GHz. The two tall radiating elements can be configured and adapted to be used for communication between about 450 MHz to about 8 GHz. The radiating elements are similar in nature to what is commonly known as a monopole antenna. According to some embodiments, systems, and methods, antenna systems disclosed herein present exceptional performance given the volume and profile of the antenna system. The cubic inches of the enclosed space in the radome provide for an advantageous height of the radome above the groundplane. Microstrip transmission lines are used between the coaxial cable conductors and the radiating elements. The coaxial cable conductors can be positioned at or near the radiating elements to reduce a length of the microstrip transmission lines. The antenna system comprises a plurality of monopole antenna elements for all bands including the cellular antenna elements. The 3D forming of the antenna elements (that are constructed from flex circuits) by the radome during the assembly process advantageously reduces manufacturing time and expense and provides for properly shaped and positioned antenna elements for a single band as well as a multi-band application. According to some methods, antenna elements are positioned within the radome during manufacturing. While positioning the antenna elements into the radome, the antenna elements are formed into position for use in the desired communication configuration. The interior surfaces of the radome as well as the flat sheets of flex material are configured and adapted such that during the installation of the flex material into the radome, the radome forms the flat sheets of flex material into an "L" shape, a "C" shape, or another suitable and desired three-dimensional shape. Additionally, according to some embodiments, a single thread faster can be used per cable clamp to reduce the number of components and reduce labor costs as well.

Figure 16:
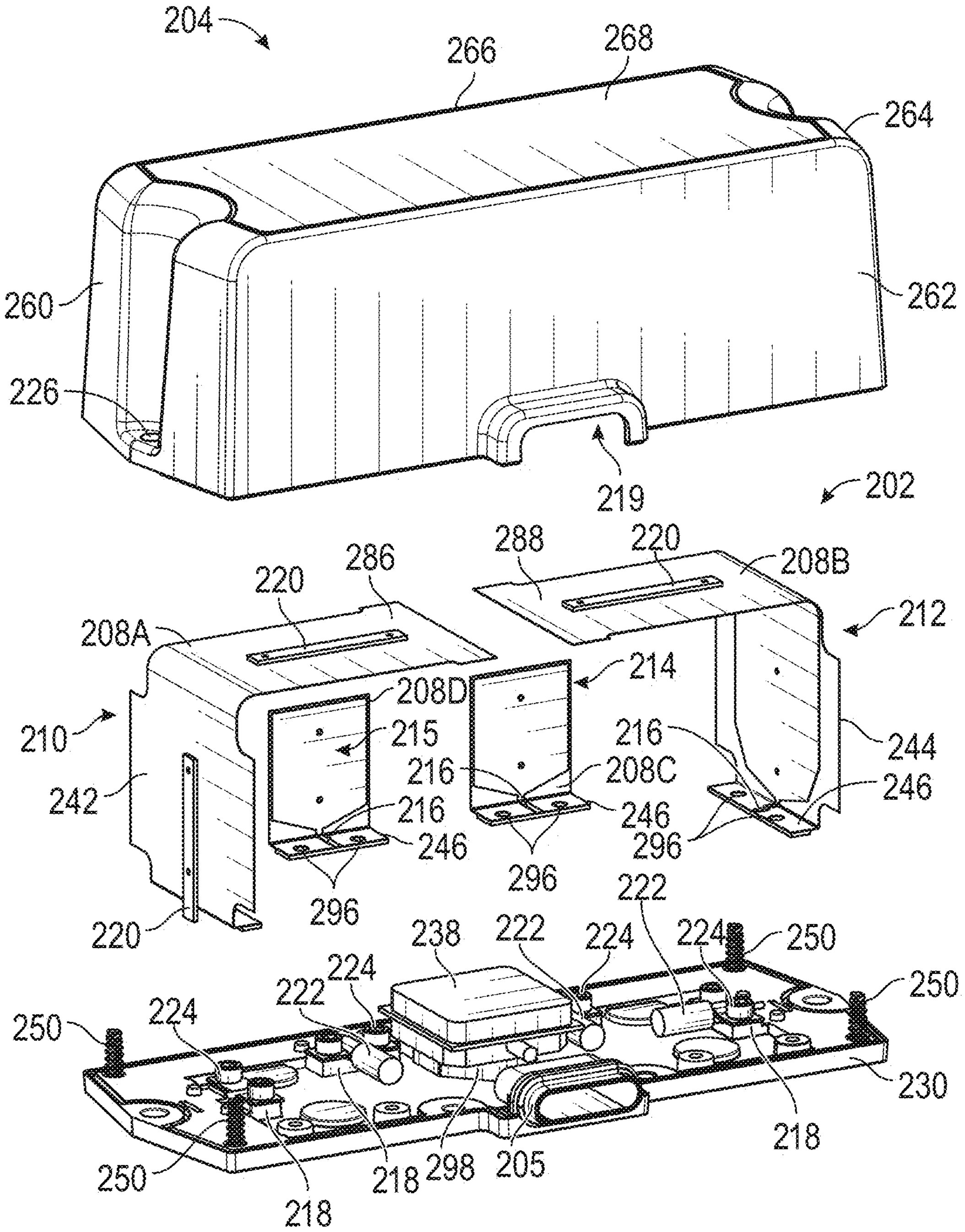
FIG. 16 illustrates an exploded view of the antenna assembly of FIG. 14.

With reference to FIG. 14, a perspective view of an antenna assembly 200 is illustrated in accordance with an embodiment of the present disclosure. The antenna assembly 200 may include a multi-element multi-band antenna 202, as shown in FIG. 16. The multi-element multi-band antenna 202 may be configured to provide wireless internet connectivity for a plurality of uses (e.g., data, voice communication, and/or the like). The antenna assembly 200 may have particular benefits when used in places such as kiosks and vehicles, however, the multi-element multi-band antenna 202 may be used in a wide range of applications. For example, the antenna assembly 200 may be a fixed or transportable solution, such as a hot spot accessory. In another example, the antenna assembly 200 can be used to provide cellular backup for internet connectivity for server rooms. Additionally, the antenna assembly 200 can be used for utility monitoring, last mile wireless internet for homes, small offices, and courtyards, to fill a coverage hole in the WiFi network, as a portable or fixed WiFi hot spot for multiple IOT devices, and/or the like. The multi-element multi-band antenna 202 may have a smaller volume and profile when compared to other antenna systems. For example, the multi-element multi-band antenna 202 housed in the radome 204 (as described below) may have a cubic volume of about 25.5 cubic inches. In other examples, the multi-element multi-band antenna 202 housed in the radome 204 may have a cubic volume between 6 and 30 cubic inches (e.g., between 6 and 30 cubic inches, 15 and 25 cubic inches, 18 and 23 cubic inches, values between the foregoing, etc.). The antenna assembly 200 can be a IP67-rated antenna that can be easy to install on kiosks, POTS replacement boxes, and/or other equipment using a magnetic or adhesive base. In some implementations, the antenna assembly 200 can include a screw on option for secured mounting.

In some embodiments, the antenna assembly 200 may be mounted on a client ground plane (not shown). The client ground plane may be in the form of conducting surfaces on vehicles, buildings, indoor or outdoor equipment enclosures, and other such customer premise equipment. Those skilled in the art would understand that the nature of the deployment of the antenna assembly 200 will change slightly in the deployed performance based on type of structure the antenna assembly 200 is attached to as well as the surroundings in which it is deployed. Those skilled in the art realize that the lower frequency bands of the multi-element multi-band antenna 202 may have optimal performance when placed on a client ground plane but that a client ground plane is not required for all applications, particularly where a reduction in the level of performance is acceptable. Accordingly, in some embodiments, the client ground plane is not required.

FIG. 16 illustrates an exploded view of the antenna assembly 200. The antenna assembly 200 can include the multi-element multi-band antenna 202, the radome 204 (also referred to herein as the "cover" 204 and the "non-conductive cover" 204), and an internal ground plane 230. The internal ground plane 230 can act as the base for the antenna assembly 200. The components of the multi-element multi-band antenna 202 may be concealed and/or secured within the radome 204 and may be positioned between the radome 204 and the internal ground plane 230. As shown in at least FIGS. 16 and 19A-19C, the multi-element multi-band antenna 202 may include one or more of the following components: a first radiating element 210, a second radiating element 212, a third radiating element 214, a fourth radiating element 215, and/or a GPS antenna 238. The antenna assembly 200 may include additional components to enable the function of the multi-element multi-band antenna 202, as described herein. To secure the multi-element multi-band antenna 202 within the antenna assembly 200, the radome 204 can be coupled to the internal ground plane 230. For example, the antenna assembly 200 may include a plurality of fasteners 250 to secure the internal ground plane 230 to the radome 204. The radome 204 may include a cable opening 219 to facilitate connection of coaxial cables (not shown) to the multi-element multi-band antenna 202. The terminated coaxial cables 222 may be positioned in interior of the multi-element multi-band antenna 202 (i.e., between the radome 204 and the internal ground plane 230) so that the coaxial cables extend out of the antenna assembly 200 through the cable opening 219.

The internal ground plane 230 can serve as a ground plane for the multi-element multi-band antenna 202. For example, the internal ground plane 230 can serve as an electrical reference point for operation of the multi-element multi-band antenna 202. In some embodiments, the internal ground plane 230 establishes a surface for the coaxial cables to use as a reference for continuation of the signal from the radio to the radiating elements 210, 212, 214, 215.

The radiating elements (e.g., radiating elements 210, 212, 214, 215) of the multi-element multi-band antenna 202 may also be referred to herein as "radiating antenna elements", "antenna elements" and "radiating portions". The radiating elements can be constructed of any suitable antenna material, such as metal, PCB substrates with conductive traces, dielectric materials, plastics with conductive coatings, ceramics, composite materials, and/or the like. In the illustrated example, the radiating elements comprise portions of PCB substrates with conductive features. For example, each radiating element can include a PCB portion 208. The PCB portions 208 may be made of flexible substrate materials (e.g., polyimide) that acts as the non-conductive support material and may include and a ductile copper or other suitable conductive material for the electrically conductive features. As such, the PCB portions 208 may be flex circuits. The PCB portions 208 may provide structure for the radiating elements 210, 212, 214, 215 of the multi-element multi-band antenna 202. For example, conductive material may be etched into the structure of the PCB portions 208 to form the radiating elements 210, 212, 214, 215. In some embodiments, the multi-element multi-band antenna 202 may include a plurality of the PCB portions 208 extending from the internal ground plane 230. As such, the multi-element multi-band antenna 202 is a three-dimensional antenna, as opposed to a two-dimensional antenna, which may provide certain benefits. For example, having a three-dimensional antenna can reduce the overall size of the antenna assembly 200 when compared to a two-dimensional antenna, while still maintaining the effectiveness of the multi-element multi-band antenna 202. In some implementations, it is desirable to make the multi-element multi-band antenna 202 as compact as possible. Having three-dimensional antenna can help reduce the overall size of the multi-element multi-band antenna 202, which is desirable in some use cases, particularly when it is not desirable to see the antenna assembly 200. The multi-element multi-band antenna 202 may be a multi-band monopole antenna that has a configuration that, when used in conjunction with high order electromagnetic modes generated or received by a transceiver and/or receiver, permit the multi-element multi-band antenna 202 to have an operating frequency range of 450 MHz to 8 GHz.

The number of PCB portions 208 included in the antenna assembly 200 may be defined by the number of radiating elements included in the multi-element multi-band antenna 202. For example, in the illustrated embodiments, the multi-element multi-band antenna 202 includes a first PCB portion 208A, a second PCB portion 208B, a third PCB portion 208C, and a fourth PCB portion 208D (collectively PCB portions 208). However, more or less PCB portions 208 are possible. The PCB portions 208 may be coupled to the internal ground plane 230. The PCB portions 208 may extend from the internal ground plane 230 in a generally vertical direction when the antenna assembly 200 is assembled. The PCB portions 208 may extend from the internal ground plane 230 at approximately 90-degree angles in accordance with some embodiments. In some embodiments, PCB portions 208 may extend from internal ground plane 230 at an angle between 85-degrees and 95-degrees (e.g., between 85 and 95 degrees, 87 and 93 degree, 89 and 91 degrees, values between the foregoing, etc.).

The PCB portions 208 may be sized based on the desired size and function of the different radiations elements 210, 212, 214, 215 included in the multi-element multi-band antenna 202. For example, the first and second radiating elements 210, 212 may be configured for cellular communication. Accordingly, the first and second radiating elements 210, 212 may be referred to as "cellular radiating elements" or "cellular antennas". The third and fourth radiating elements 214, 215, may be configured as WiFi radios. Accordingly, the third and fourth radiating elements 214, 215 may be referred to as "WiFi antennas" or "WiFi radiating elements". Due to the different functions of the different radiating elements, the first and second PCB portions 208A, 208B may be a different size and shape than the third and fourth PCB portions 208C, 208D. In some implementations, the cellular radiating elements 210, 212 may be used for communication between approximately 450 MHz and 8 GHz. For example, the first and second radiating elements 210, 212 may be able to operate at low bands, mid bands, and high bands. In other embodiments, different frequency ranges are possible. Similarly, in some embodiments, the WiFi radiating elements 214, 215 may be used for communication between approximately 1 GHz and 8 GHz. For example, the radiating elements 214, 215 may be able to operate at mid band and high band. In other embodiments, different frequency ranges are possible. The radiating elements 210, 212, 214, 215 may be/function as monopole antennas. In some embodiments, each radiating elements 210, 212, 214, 215 covers the full bandwidth of the radio that is connected to it, with each radiating elements 210, 212, 214, 215 having a unique radio. The four radiating elements 210, 212, 214, 215 can work together in a Multiple-Input Multiple-Output ("MiMo") aspect of the radio link.

In accordance with some embodiments, the first and second PCB portions 208A, 208B may be bent or have a three-dimensional configuration. For example, each PCB portion 208A, 208B may include an upright PCB portion and a top PCB portion, with the conductive material of the radiating element formed on both the upright and top PCB portions. For example, in the illustrated embodiment, the first PCB portion 208A can include a first upright PCB portion 242 and a first top PCB portion 286, as shown in FIG. 16. Similarly, the second PCB portion 208B can include a second upright PCB portion 244 and a second top PCB portion 288. The top PCB portions 286, 288 may be horizontal extensions extending from the upright PCB portions 242, 244 respectively. In some embodiments, the top portions 286, 288 extend at approximately a 90-degree angle from the upright PCB portions 242, 244 in a direction over the internal ground plane 230 and towards each other. The 90-degree angle may follow a curved path between the upright PCB portions 242, 244 and the top portions 286, 288. In some embodiments, the angle of the bend in the PCB portions 208A, 208B may be between 85-degrees and 95-degrees (e.g., between 85 and 95 degrees, 87 and 93 degree, 89 and 91 degrees, values between the foregoing, etc.). One or both of the upright PCB portions 242, 244 and the top PCB portions 286, 288 can include support portions for engaging with features of the radome 204 during assembly and for supporting the radiating elements 210, 212 during use. For example, the upright PCB portions 242, 244 can include upright support portions 243 that extend laterally from the sides of the upright PCB portions 242, 244 and are co-planar to the upright PCB portions 242, 244. The upright support portions 243 can be sections of the PCB portions 208A, 208B that do not include conductive material. The upright support portions 243 can be near the bottom of the upright PCB portions 242, 244 and may not extend to the top edge of the upright PCB portions 242, 244 that is defined by the bend between the upright PCB portions 242, 244 and the top PCB portions 286, 288. Similarly, the top PCB portions 286, 288 can include top support portions 245 that extend laterally from the sides of the top PCB portions 286, 288 and are co-planar to the top PCB portions 286, 288. The top support portions 245 can be sections of the PCB portions 208A, 208B that do not include conductive material.

The conductive material that forms a part of the radiating elements 210, 212 may extend at least along both the upright PCB portions 242, 244 and the top PCB portions 286, 288. For example, the radiating element 210 may include an upright radiating portion 211 formed on the first upright PCB portion 242 and a head radiating portion 287 formed on the first top PCB portion 286, with the bend in the first PCB portion 208A defining the two radiating portions 211, 287 of the radiating element 210. Similarly, the radiating element 212 may include an upright radiating portion 213 formed on the second upright PCB portion 244 and a head radiating portion 289 formed on the second top PCB portion 288, with the bend in the second PCB portion 208B defining the two radiating portions 213, 289 of the radiating element 212. In some embodiments, advantages of a bent of three-dimensional radiating element (e.g., radiating elements 210, 212) can include having two distinct radiating portions, reducing the total height of the multi-element multi-band antenna 202 to be more compact and conserve space, and configuring the radome 204 to be able to easily cover and provide protection for the system in a compact configuration with multi-band coverage. For example, the head radiating portions 287, 289 of the radiating elements 210, 212 can provide further multi-band performance as well as low band performance while maintaining an efficient volume for the multi-element multi-band antenna 202.

In some embodiments, the upright radiating portion 211 of the first radiating element 210 may face the upright radiating portion 213 of the second radiating element 212. For example, the upright radiating portion 211 may face in a first direction and the upright radiating portion 213 may face in a second direction that is substantially opposite the first direction. In some embodiments, the upright radiating portion 211 and the upright radiating portion 213 can be the same height and/or width. In some embodiments, the upright radiating portion 211 and the upright radiating portion 213 can have different heights and/or widths. In some embodiments, the head radiating portion 287 of the first radiating element 210 may be co-planer with the head radiating portion 289 of the second radiating element 212. In some embodiments, the head radiating portion 287 of the first radiating element 210 may be not co-planer with the head radiating portion 289 of the second radiating element 212. In some embodiments, the head radiating portion 287 and the head radiating portion 289 can be the same length and/or width. In some embodiments, the head radiating portion 287 and the head radiating portion 289 can have different length and/or widths. In some embodiments, the radiating elements 210, 212, 214, 215 are spaced close together to reduce the overall volume of the multi-element multi-band antenna 202.

In some implementations, the top PCB portions 286, 288 may engage with features (e.g., slots 292) of the radome 204 to provide support for the PCB portions 208A, 208B as well as to define their shape and placement, as shown and described further with reference to at least FIGS. 19A-19C, 20, and 21. Similarly, the third and fourth PCB portions 208C, 208D of the radiating elements 214, 215 may engage with features (e.g., slots 276) of the radome 204, as described below to provide support for the PCB portions 208C, 208D as well as to define their shape and placement. In some embodiments, the shape of the PCB portions 208 may be obtained during installation of the PCB portions 208 into the radome 204. For example, prior to installation, the PCB portions 208 may be assembled as flat sheets (see e.g., FIG. 19A) and bent to define the upright portions and top portions (see e.g., FIGS. 19B and 19C) when inserted and engaged with the ribbings and slots of the radome 204.

In some embodiments, one or both of the first and second PCB portions 208A, 208B may not include the top portions 286, 288 respectively. For example, one or both of the first and second PCB portions 208A, 208B may be substantially vertical such that they only include the upright PCB portions 242, 244. In this example, the radiating element 212 would not include the head radiating portion 289 and/or the radiating element 210 would not include the head radiating portion 287. Having vertical radiating elements 210, 212 can simplify the assembly of the multi-element multi-band antenna 202 and may be desirable when the size/height of the multi-element multi-band antenna 202 is not an important design consideration. However, including bends in the radiating elements 210, 212 (e.g., having both upright radiating portions 211, 213 and head radiating portions 287, 289) can provide a benefit of reducing the overall size of the multi-element multi-band antenna 202, which can be desirable. Bending the radiating elements 210, 212 may also define the radiation patterns of the higher order modes.

In some embodiments, one or more of the radiating elements 210, 212, 214, 215 can include one or more apertures. For example, the one or more apertures may extend through the radiating elements 210, 212, 214, 215 (e.g., through both the conductive material and the PCB portions 208. The apertures can be any suitable shape, such as circular, oval, square, rectangular, elliptical, and/or the like. In some embodiments, including radiating elements 210, 212, 214, 215 with apertures can enhance the multi-element multi-band antenna's 202 performance and characteristics for some applications. In one example, apertures can be used to shape the radiation pattern of the multi-element multi-band antenna 202 (e.g., the shape and size of apertures can be used to direct and focus the radiation pattern on the multi-element multi-band antenna 202 in a specific direction, which can increase the gain and/or enhance the multi-element multi-band antenna's 202 directivity). In another example, apertures can be used as resonant structures such that the multi-element multi-band antenna 202 is a frequency-selective antenna (e.g., the size and shape of the apertures can be tuned to resonate at a specific frequency, which would make the multi-element multi-band antenna 202 more responsive at the specific frequency). Other benefits, such as impedance matching and antenna radiation pattern shaping, can also be realized by including apertures in one or more of the radiating elements 210, 212, 214, 215.

With continued reference to FIG. 16, each PCB portion 208 can include a base portion 246. The base portions 246 can be formed from a bend in the bottom of the PCB portions 208 (see e.g., fold lines A-A, B-B in FIG. 19A). The base portions 246 can be used to support the respective PCB portions 208. For example, the base portions 246 can be connected or coupled to the internal ground plane 230. The base portions 246 can be horizontal extension extending from the bottom of the PCB portions 208 in a substantially perpendicular manner. For example, the first PCB portion 208A can include a base portion 246 that extends horizontally from the bottom of the upright PCB portions 242. In the example of the first and second PCB portions 208A, 208B, the base portions 246 can be substantially parallel to the top PCB portions 286, 288. Each base portion 246 can include one or more alignment holes 296 that are configured to receive protrusions 232 of the internal ground plane 230 (see e.g., FIG. 18). The alignment holes 296 and the protrusions 232 can serve as reference points during the manufacturing and assembly of the multi-element multi-band antenna 202. For example, the alignment holes 296 and protrusions 232 facilitate accurate and consistent positioning of the components of the multi-element multi-band antenna 202 during production (e.g., fabrication, assembly, and testing). For example, the alignment holes 296 and the protrusions 232 may facilitate alignment of terminated coaxial cables 222 with microstrip transmission lines to the radiating elements 210, 212, 214, 215 to facilitate consistent electrical performance of the multi-element multi-band antenna 202. For case of illustration, only a portion of the coaxial cables (i.e., the terminated coaxial cables 222) that could be used with the antenna assembly 200 are illustrated. In the assembled antenna assembly 200, the coaxial cables may be fed through a cable opening 219 in the radome 204 to facilitate connection of the multi-element multi-band antenna 202 to the coaxial cables. In some implementations, the antenna assembly 200 may include a cable holder 205 (e.g., a grommet) that can group the coaxial cables together and be positioned within the cable opening 219. The cable holder 205 can also create a seal in the cable opening 219 to reduce the chance of liquid from entering the antenna assembly 200.

As shown in FIG. 16, the antenna assembly 200 can optionally include a GPS antenna 238. The GPS antenna 238 may also be referred to herein as a "GPS radiating device" 238. The GPS antenna 238 can be used to collect signal(s) from geosynchronous satellites so that the GPS function of a radio including the multi-element multi-band antenna 202 can determine where the multi-element multi-band antenna 202 is positioned relative to a global coordinate system. In some embodiments, the GPS antenna 238 may be secured to a base 298 of the internal ground plane 230. In the assembled antenna assembly 200, the GPS antenna 238 may be supported by and/or mechanically bonded a top side of the base 298. For example, an adhesive can be applied to the bottom of the GPS antenna 238. The base 298 can raise the GPS antenna 238 above the internal ground plane 230 so that the terminated coaxial cables 222 are positioned below the radiating portion of the GPS antenna 238. This arrangement can prevent the terminated coaxial cables 222 from disturbing the radiation characteristics of the GPS antenna 238.

Referring now to FIG. 19A, which shows the multi-element multi-band antenna 202 in an initial assembly state, each radiating element 210, 212, 214, 215 can include a feed point 203. The feed points 203 are the locations in the multi-element multi-band antenna 202 where the radio frequency (RF) signal is applied to or extracted from the respective radiating element 210, 212, 214, 215. The feed points 203 can be connected to microstrip transmission lines 216 of the multi-element multi-band antenna 202. In the illustrated embodiment, the transmission lines 216 may be embedded in at least a portion of the PCB portions 208. For example, each PCB portion 208 can include a transmission line 216 that is embedded in the base portions 246 that extends toward the center of the internal ground plane 230. The number of microstrip transmission lines 216 included in the multi-element multi-band antenna 202 may be defined by the number of radiating elements in the multi-element multi-band antenna 202. For example, in the illustrated embodiment, the multi-element multi-band antenna 202 includes four microstrip transmission lines 216, one for each of the radiating elements 210, 212, 214, 215. More or less transition lines are also possible, where the multi-element multi-band antenna 202 includes a different number radiating elements. The transmission lines 216 facilitate an electrical connection between the terminated coaxial cables 222, and the feed points 203 of the radiating elements 210, 212, 214, 215 to electrically excite the radiating elements 210, 212, 214, 215.

The geometry of the feed points 203 can impact the performance (e.g., impedance matching, radiation pattern, polarization, gain and directivity, bandwidth, and/or the like) of the radiating elements 210, 212, 214, 215. As such, the geometry of the feed points 203 may vary between the radiating elements 210, 212, 214, 215, depending on the desired performance. The feed points 203 can be tapered or "V" shaped portions at the bottom of the radiating elements 210, 212, 214, 215 respectively. The angle of the V-shaped portions relative to the horizontal (e.g., defined by the internal ground plane 230) and/or the starting point of the V-shaped portions (e.g., relative to the vertical) can be selected to obtain impedance matching over a broad frequency range between the radiating elements 210, 212, 214, 215 and the microstrip transmission lines 216. In some embodiments, the starting point and angle of the V-shaped portions can differ between the radiating elements 210, 212, 214, 215. In some embodiments, the starting point and angle of the V-shaped portions can be the same for one of more of the radiating elements 210, 212, 214, 215. In some embodiments, where the radiating elements 210, 212, 214, 215 include one or more apertures, as described herein, an aperture can be placed slightly above the V-shaped portions, which can help with impedance matching. In other implementations, other feeding systems are possible.

Figure 18:
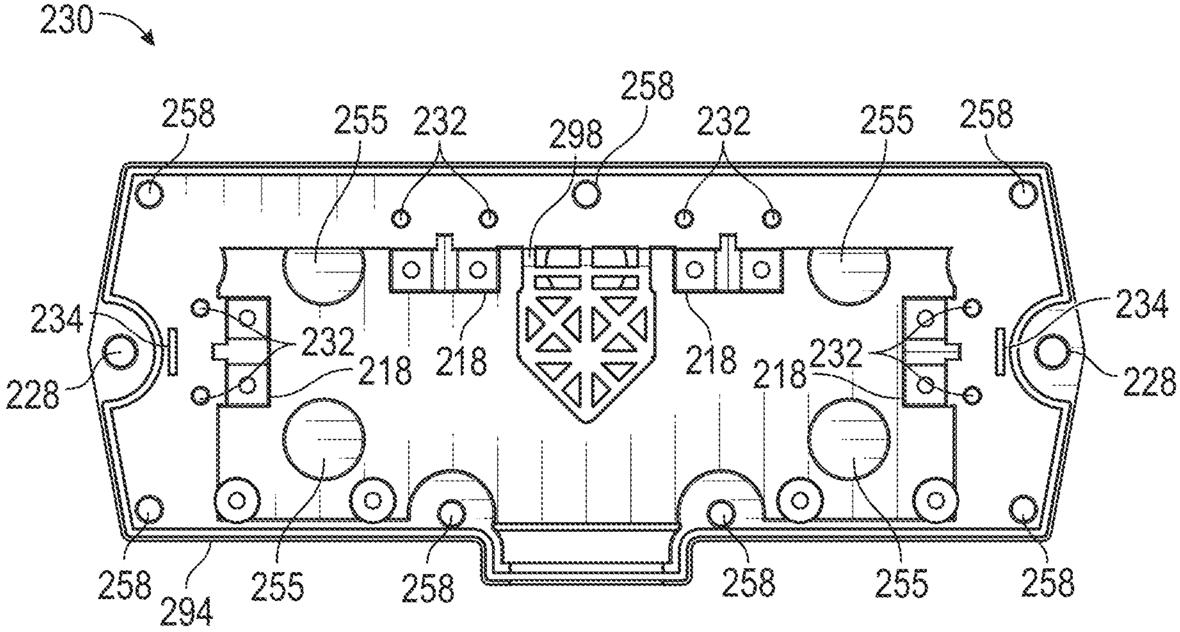
FIG. 18 illustrates a top view of an internal ground plane of the antenna assembly of FIG. 14.

Turning now to FIG. 18, which illustrates a top view of the internal ground plane 230, that can act as the base of the internal ground plane 230. The internal ground plane 230 can made of a conductive material, such as die cast aluminum. In some cases, the internal ground plane 230 may be a solderable sheet metal material such as brass, copper, tin plated steel, and/or the like. The internal ground plane 230 can include a plurality of cable holders 218. The cable holder 218 can be configured to hold the terminated coaxial cables 222 in a fixed position when used in combination with cable brackets 224 (see e.g., FIG. 16). For example, when assembling the antenna assembly 200, the outer conductors of the terminated coaxial cables 222 can be positioned on the cable holders 218 and fixed to the internal ground plane 230 using the cable brackets 224 and one or more fasteners. This mechanical clamp solution can establish a connection between the outer conductors of the coaxial cables and the internal ground plane 230 of the antenna assembly 200. In the assembled position, between the cable holders 218 and the cable brackets 224, the terminated coaxial cables 222 can be aligned with the transmission lines 216 of the radiating elements 210, 212, 214, 215, allowing the inner connectors of the coaxial cables to be electrically coupled to the radiating elements 210, 212, 214, 215. In this arrangement, the microstrip transmission lines 216 allow the radio frequency ("RF") signals to propagate from the attachment point of the terminated coaxial cables 222 to the feeding points 203 of the radiating elements 210, 212, 214, 215.

The internal ground plane 230 can be the base of the antenna assembly 200. In some implementations, the antenna assembly 200 can include an additional base component, and the internal ground plane 230 can be secured to the additional base component. The internal ground plane 230 can include a plurality of fastener holes 258 that extend through the internal ground plane 230. The fastener holes 258 can be aligned with fastener holes 256 of the radome 204 (see e.g., FIG. 17) and fasters 250 (see e.g., FIG. 16) can be used to securely couple the internal ground plane 230 to the radome 204. In other implementations, different fastening means can be used to couple the radome 204 to the internal ground plane 230. In some implementations, the internal ground plane 230 can include one or more stiffener slots 234. The stiffener slots 234 can be positioned outwardly from the protrusions 232 and can be configured to receive stiffeners (e.g., stiffeners 220) to assist in the stability of one or more of the radiating elements 210, 212, 214, 215.

Figure 15:
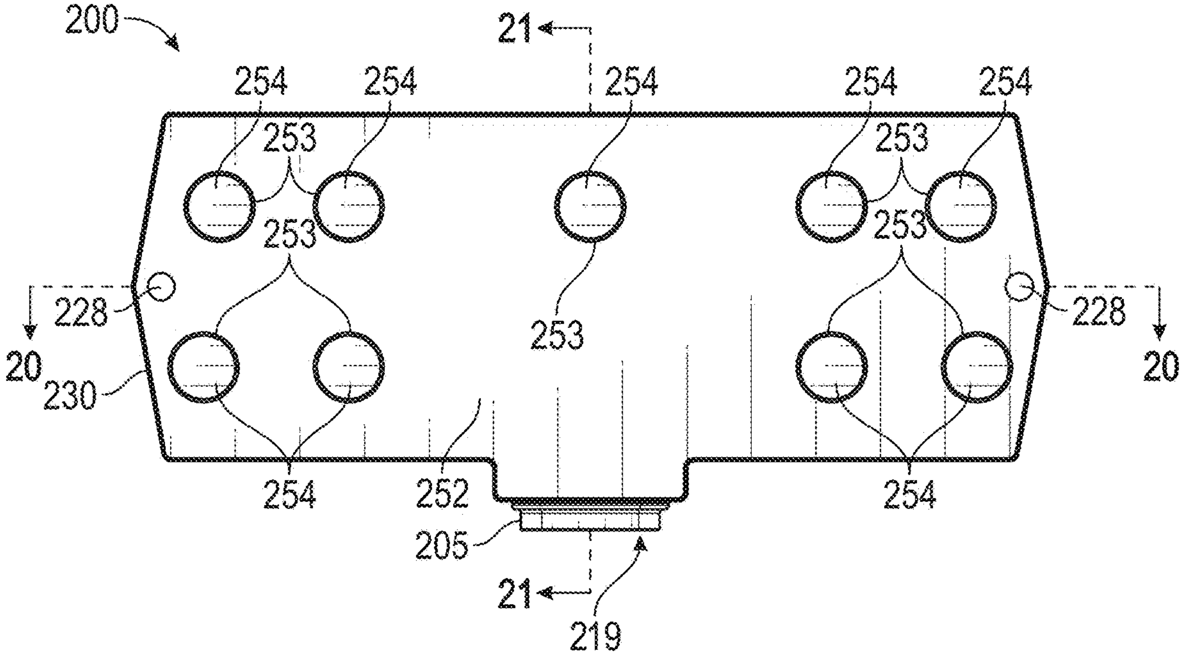
FIG. 15 illustrates a bottom view of the antenna assembly of FIG. 14.

The internal ground plane 230 can optionally include one or more magnet holders 255. The one or more magnet holders 255 can extend upwardly from the bottom of the internal ground plane 230 and may be configured to receive magnets 254 of the antenna assembly 200. For example, FIG. 15 shows a bottom view of the antenna assembly 200, with the magnets 254 positioned in the magnet holders 255. The magnets 254 may be positioned the internal ground plane 230 to allow the antenna assembly 200 to be magnetically coupled to a client ground plane or other magnetic surface. In other embodiments, threaded fasteners or other suitable mechanical means can be used instead of or in addition to the magnets 254 to create the mechanical coupling between the antenna assembly 200 and the client ground plane or other location where the antenna assembly 200 is to be deployed. For example, as shown in at least FIGS. 17 and 18, the radome 204 can optionally include one or more external fastener holes 226 and the internal ground plane 230 can include one or more corresponding external fastener holes 228 that can be aligned in the assembled antenna assembly 200. The external fasteners holes 226, 228 can be used with external fasteners to couple the antenna assembly 200 to a deployment location.

With continued reference to FIG. 15, the antenna assembly 200 can include a gasket 252. The gasket 252 may be a non-conductive or electrically-conductive weather gasket, for example. The gasket 252 may be secured to the bottom side of the internal ground plane 230. In this arrangement, the gasket 252 can be positioned between the internal ground plane 230 and a deployment surface, such as the client ground plane. The gasket 252 may also provide a non-slip surface between the antenna assembly 200 and the location where the antenna assembly 200 is deployed. The gasket 252 can be fixed to the internal ground plane 230 using any conventional means (e.g., adhesive). In some embodiments, the gasket 252 can help prevent fluid from entering the antenna assembly 200 and damaging the multi-element multi-band antenna 202. In some instances, the gasket 252 is an anti-skid gasket to assist the stability of the placement of the antenna assembly 200. In some embodiments, the gasket 252 may include a plurality of openings 253. The openings 253 may be positioned on the gasket 252 so that the openings 253 align with the plurality of magnets 254. The openings 253 may increase a strength of magnetic coupling between the magnets 254 and the deployment location.

Figure 17:
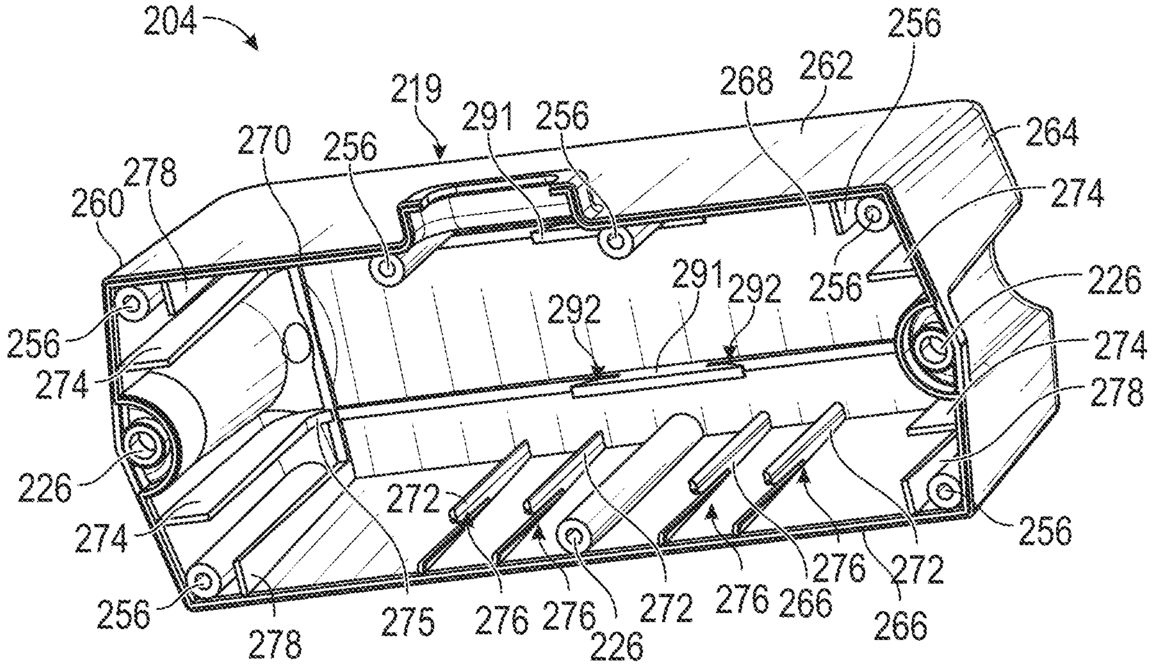
FIG. 17 illustrates a perspective internal view of the non-conductive cover of the antenna assembly of FIG. 14.

Turning now to FIG. 17, an internal perspective view of the radome 204 is shown. The radome 204 may provide mechanical support for the multi-element multi-band antenna 202. The radome 204 may be transparent to radiation from the multi-element multi-band antenna 202 and may serve as an environmental shield for the internal components of the multi-element multi-band antenna 202. The radome 204 may be made of a non-conductive material.

In some implementations, the radome 204 may be generally rectangular prism shaped, with an open bottom. In other implementations, other shapes are possible for the radome 204. The radome 204 can include four side walls, 260, 262, 264, and 266 and a top wall 268. The top wall 268 is fixed to the four side walls 260, 262, 264, and 266, which also define a periphery or bottom edge 270 of the radome 204. The side walls 260, 262, 264, and 266 may be substantially perpendicular to the internal ground plane 230 and/or the top wall 268 in the assembled antenna assembly 200. In some embodiments, one or more of the side walls 260, 262, 264, and 266 may have a taper when extending from the bottom edge 270 to the top wall 268. For example, the side walls 260, 262, 264, and 266 may be at an angle less than 90-degrees relative to a plane defined by the internal ground plane 230. In the assembled configuration, the bottom edge 270 of the radome 204 may extend into a base slot 294 of the internal ground plane 230 (see e.g., FIG. 18).

When assembling the antenna assembly 200, the radome 204 can be positioned on the internal ground plane 230 (see e.g., FIG. 14) to secure the internal components of the multi-element multi-band antenna 202. The radome 204 may include a plurality of fastener holes 256 on the bottom portion of the radome 204. In some embodiments, one or more the plurality of fastener holes 256 may be positioned at each corner of the radome 204 and/or along one or more of the sidewalls 260, 262, 264, 266 of the radome 204. The plurality of fastener holes 256 may extend up the side walls 260, 262, 264, and 266 of the radome 204. In some embodiments, the fastener holes 256 may be tapered. In some embodiments, the fastener holes 256 may be threaded. In some embodiments, the fasteners 250 can be thread forming screws such that the fastener holes 256 may not be tapped prior to installation. These plurality of fastener holes 256 may be aligned with fastener holes 258 of the internal ground plane 230 in the assembled antenna assembly 200 and fasteners 250 (see e.g., FIG. 16) can be positioned within the holes 256, 258 to secure the radome 204 and the internal components of the multi-element multi-band antenna 202 to the internal ground plane 230.

In accordance with some embodiments, the radome 204 may include one or more features that can be used to support the radiating elements 210, 212, 214, 215 via the PCB portions 208 and to define the shape of the radiating elements 210, 212, 214, 215. For example, as shown in FIG. 17, the radome 204 can include on or more first ribs 272, one or more second ribs 274, one or more wall guides 278, and/or one or more top supports 291. The interior ribs and slot features (e.g., the first ribs 272, second ribs 274, slots 276, and top supports 291) of the radome 204 hold the radiating elements 210, 212, 214, 215 in place for proper mechanical alignment during the fabrication of the multi-element multi-band antenna 202 such that the radiating elements 210, 212, 214, 215 are held in their desired positions so that the multi-element multi-band antenna 202 meets it desired electrical performance for return loss and radiation patterns over the desired frequency band.

Figure 8:
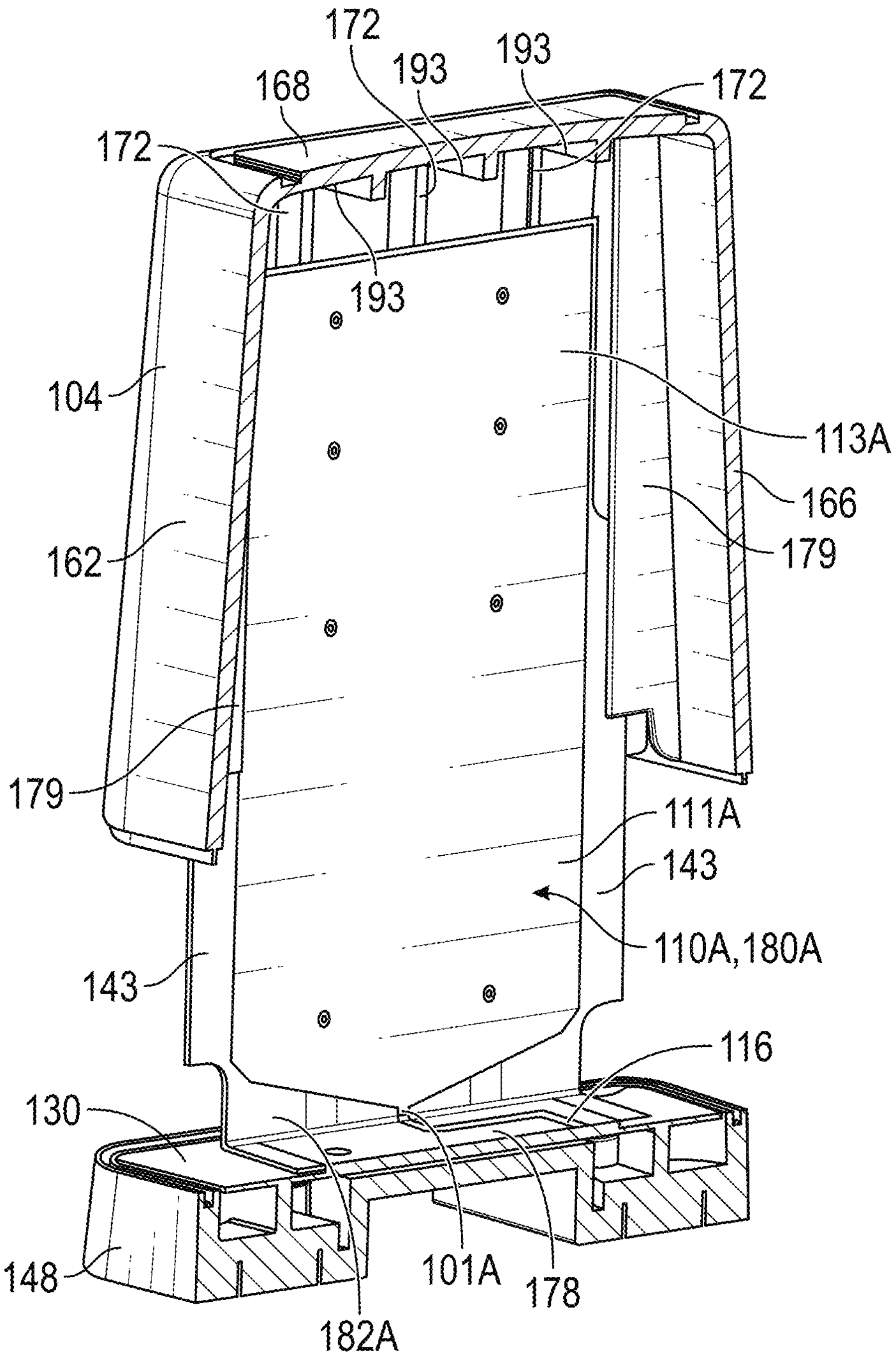
FIG. 8 illustrates a partial section view of the cover engaged with a radiating element of the multi-band multi-element antenna of the antenna assembly of FIG. 1 in a partial assembly configuration.

The first ribs 272 can be used to support the radiating elements 214, 215 in the upright configuration. The first ribs 272 may be projections or catch points extending from the interior sides of the walls of the radome 204. For example, the first ribs 272 can extend inwardly from the side wall 266 towards the center of the interior the radome 204. The first ribs 272 may extend from the bottom edge 270 to the top wall 268. The first ribs 272 may include a bottom tapered portion that is at an angle relative to vertical axis and an upper portion that is generally aligned with the vertical axis. In the embodiment illustrated in FIG. 17, the side wall 266 includes two pairs of first ribs 272, one pair for the radiating element 214 and one pair for the radiating element 215. The radome 204 may include more or less first ribs 272, depending on the number of WiFi radiating elements includes in the multi-element multi-band antenna 202. Each first rib 272 can include a slot 276. The slots 276 may be generally V-shaped. The outer edge of the slot 276 may extend downwardly to a point before the first rib 272 extends vertically to the top wall 268. The radiating elements 214, 215 can be received in the slots 276 in the assembled antenna assembly 200. For example, FIG. 8 shows a section view of the antenna assembly 200 taken along the line 8-8 in FIG. 15, with the radiating elements 215 positioned in the slots 276 of the first ribs 272. In the assembled configuration, the radiating elements 214, 215 are received and supported by the first ribs 272 via the slots 274. In FIG. 8, the GPS antenna 238 is not shown for illustrative purposes.

In some embodiments, the antenna assembly 200 may include one or more stiffeners 220 (see e.g., FIG. 16), that may be located between each pair of first ribs 272. The stiffeners 220 may be configured to provide structural support to the radiating elements 214, 215 and may be positioned between the PCB portions 208C, 208D and the side wall 266 of the radome 204. The stiffeners 220 can help the PCB portions 208C, 208D remain planer when installed in the radome 204 and, desirably throughout the life of the multi-element multi-band antenna 202. The stiffeners 220 may be made of any suitable material, such as plastic, FR4, other non-conductive material, and/or the like. Generally, the stiffeners 220 are made of a non-conductive material. In some embodiments, the stiffeners 220 may be mechanically coupled to the back sides of the PCB portions 208C, 208D using any conventional means.

The second ribs 274 and the wall guides 278 can be used to support the radiating elements 210, 212 in addition to assisting in the formation of the shape of the radiating elements 210, 212, as described further with reference to FIGS. 19A-19C. The second ribs 274 can be projections that extend from the interior sides of the walls of the radome 204. For example, a pair of second ribs 274 can extend inwardly from the side wall 260 towards the center of the interior the radome 204 and another pair of second ribs 274 can extend inwardly from the side wall 264 towards the center of the interior the radome 204. The second ribs 274 can include a curved top portion 275 that extends from the second rib 274 towards and along the interior of the top wall 268. The curved top portions 275 can be used to cause the radiating elements 210, 212 to assume their three dimensional shape during assembly. The wall guides 278 can be projections extending from the interior sides of the walls of the radome 204. The wall guides 278 can be substantially perpendicular to the second ribs 274. For example, the wall guides 278 can extend inwardly from the side walls 262, 266 towards the center of the interior of the radome 204. One wall guide 278 can be positioned near each second rib 274. Moving inwardly from the side wall 260 or the side wall 264, a gap exists between the second ribs 274 and the wall guides 278. In the assembled antenna assembly 200, a portion of the radiating elements 210, 212 can be positioned within this gap. For example, as shown in FIG. 7, the radiating elements 210, 212 are positioned between the gaps between the second ribs 274 and the wall guides 278. As explained further with reference to FIGS. 19A-19C, the wall guides 278 can be used as a catch feature for mechanical stability for the radiating elements 210, 212, along with the stiffeners 220. For example, the stiffeners 220 can be positioned between each pair of second ribs 274 to provide structural support to the upright radiating portions 211, 213 of radiating elements 210, 212. Additional stiffeners 220 may be configured to support the head radiating portions 287, 289. For example, stiffeners 220 may be positioned between the upright PCB portions 242, 244 and the side wall 260, 264 of the radome 204 respectively and additional stiffeners 220 may be positioned between the top portion PCB portions 286, 288 and the top wall 268. The stiffeners 220 can help the PCB portions 208A, 208B remain planer when installed in the radome 204 and, desirably throughout the life of the multi-element multi-band antenna 202.

The top supports 291 are configured to provide support for the head radiating portions 287, 289 of the radiating elements 210, 212. The top supports 291 can include slots 292 for receiving the top portion PCB portions 286, 288. For example, the edges of the top PCB portions 286, 288 may extend into the slots 292 to provide support for the radiating elements 210, 212 and to maintain the desired configuration of the radiating elements 210, 212. The top supports 291 can extend vertically from the interior of the top wall 268 towards the internal ground plane 230. The top supports 291 may be generally L-shaped projections. Each top support 291 can include two slots 292 that face the side walls 260, 264 . . . This arrangement is shown more clearly in FIGS. 20 and 21. In some embodiments, the radome 204 may include two top supports 291, which may include two slots 292 for the first PCB portion 208A and two slots 292 for the second PCB portion 208B.

FIGS. 19A-19C show the antenna assembly 200 without the radome 204 in various states of assembly. FIG. 19A shows the antenna assembly 200 with the radiating elements 210, 212, 214, 215 in a first/pre-assembly configuration, FIG. 19B shows the antenna assembly 200 with the radiating elements 210, 212, 214, 215 in in a second/partial-assembly configuration, and FIG. 19C shows the antenna assembly 200 with the radiating elements 210, 212, 214, 215 in a third/final-assembly configuration. As noted above, in some embodiments, the interior portion of the radome 204 (e.g., the ribs 272, 274, wall guides 278, and top supports 291) are configured as catch points for the PCB portions 208 and can be used to shape the radiating elements 210, 212, 214, 215. For example, the interior portions of the radome 204 can hold the radiating elements 210, 212, 214, 215 in place for proper mechanical alignment during the fabrication of the antenna. Proper mechanical alignment can ensure that the radiating elements 210, 212, 214, 215 are held in their proper place so that the multi-element multi-band antenna 202 meets its desired electrical performance for return loss, radiation patterns, and other electrical characteristics over the desired frequency bands. The curved and three-dimensional characteristics of the PCB portions 208 can be obtained during the installation of the PCB portions 208 into the radome 204 due to the interior portion of the radome 204 (e.g., the ribs 272, 274, wall guides 278, and top supports 291) being configured such that the PCB portions 208 are bent during the assembly portion of the manufacturing upon insertion into the radome 204. In some implementations, the curved and three-dimensional characteristics of the PCB portions 208 can be obtained during the installation of the PCB portions 208 into the radome 204 without any manual bending or pre-bending of the PCB portions 208.

Turning to FIG. 19A, in a pre-assembly configuration, the PCB portions 208 may be in flat with no bends. The PCB portions 208 can be coupled to the internal ground plane 230 by aligning the alignment holes 296 in the base portions 246 with the appropriate protrusions 232 of the internal ground plane 230. In some implementations, the bottom side of the base portions 246 may include an adhesive such that the base portions 246 can be coupled to the internal ground plane 230. In this arrangement, the PCB portions 208 may be co-planar to each other and aligned with cable holders 218. While FIG. 19A shows the terminated coaxial cables 222, it is recognized that the coaxial cables may be connected at a different time in the assembly process.

Once the PCB portions 208 are coupled to the internal ground plane 230 via the base portions 246, one or more of the PCB portions 208 can be bent into a final assembly state by inserting the PCB portions 208 into the radome 204. For example, when the radome 204 is inserted onto the internal ground plane 230, the first and second PCB portions 208A, 208B can be guided through the gap between the second ribs 274 and the wall guides 278 (e.g., by a user holding the first and second PCB portions 208A, 208B). In some implementations, the wall guides 278 can be tapered so that the bottom of the wall guides 278 extend further into the interior of the radome 204 that the top. This design ensures that the top PCB portions 286, 288 remain within the gap on initial insertion of the radome 204 because of potential contact between the top support portions 245 and the wall guides 278, and that the top PCB portions 286, 288 can extend past the gap into the interior of the radome 204 on further insertion of the radome 204. For example, as the top edge of the first and second PCB portion 208A, 208B contacts the curved top portion 275 of the second ribs 274, the first and second PCB portion 208A, 208B are pushed inwardly from the side walls 260, 264 respectively and towards the top supports 291. Continued insertion of the radome 204 causes the upright support portions 243 to extend into the gap between the second ribs 274 and the wall guides 278. With the first and second PCB portions partially contained within the radome 204, the third and fourth PCB portions 208C, 208D can be inserted into the slots 276 of the first ribs 272 (e.g., by a user holding the third and fourth PCB portions 208C, 208D). Insertion of the third and fourth PCB portions 208C, 208D into the slots 276 can cause the third and fourth PCB portions 208C, 208D to bend along the fold lines B-B). The first and second PCB portion 208A, 208B can assume their final "L" shaped form on final insertion of the bottom edge 270 of the radome 204 into the base slot 294, as shown in FIG. 19C (e.g., with both the first and second PCB portion 208A, 208B being bent along the fold lines A-A and C-C due to engagement with the radome 204). The final insertion causes the top PCB portions 286, 288 to enter the slots 292 of the top supports 291 (see e.g., FIGS. 20 and 21) and the first and second PCB portion 208A, 208B to bend along the bend lines C-C, defining the upright radiating portions 211, 213 and the head radiating portion 287, 289 of the radiating elements 210, 212 respectively. The radome 204 can then be fixed to the internal ground plane 230 by threading fasteners 250 through the fastener holes 256 in the internal ground plane 230 and into the fastener holes 258 in the radome 204.

In some implementations, the one or more of the PCB portions 208 can be manually folded along the fold lines as part of the assembly process. For example, once the PCB portions 208 are coupled to the internal ground plane 230 via the base portions 246, one or more of the PCB portions 208 can be bent into a partial or final assembly state. As noted herein, the PCB portion 208 can optionally comprises a Flex PCB substrate. As shown in FIG. 19B, the first PCB portion 208A and the second PCB portion 208B can be folded in a direction away from the internal ground plane 230 along the fold lines A-A. Folding the PCB portions 208A, 208B in this manner creates an approximately 90-degree angle between the base portions 246 and the upright PCB portions 242, 244. Optionally, stiffeners 220 can be inserted into the stiffener slots 234 behind the first PCB portion 208A and the second PCB portion 208B. In some cases, inserting the stiffeners 220 into the stiffener slots 234 can cause the PCB portions 208A, 208B to bend approximately along the fold lines A-A. While the flex-circuit design of the radiating elements 210, 212, 214, 215 may not require fold lines that are intended to bend, in some implementations, the fold lines (e.g., fold lines A-A, B-B, C-C, etc.) can be areas of the radiating elements 210, 212, 214, 215 that are intentionally designed to bend, and the fold lines can guide and control the bending process. For example, the fold lines can be areas of the radiating elements 210, 212, 214, 215 that comprise thinner or perforated substrate to facilitate bending without damaging the conductive traces. Other methods of enabling the PCB portions 208 to bend along a desired plane can also be implemented. Bendable fold lines may provide a particular benefit when the radiating elements 210, 212, 214, 215 comprise sheet metal or another rigid material.

Optionally, when the PCB portions 208 are in the partially assembled state and coupled to the internal ground plane 230, the coaxial cables can be electrically connected to the antenna assembly 200. For example, the coaxial cables can be slid through the cable holder 205 and the terminated coaxial cables 222 can be positioned in the cable holders 218 such that the outer conductors are in contact with the internal ground plane 230 via the cable holders 218 and the inner conductors are positioned over the microstrip transmission lines 216. The cable brackets 224 can then be secured to the cable holders 218 (e.g., using one or more fasteners) with the terminated coax in between. The center conductors of the coaxial cables can then be soldered to the microstrip transmission lines 216 on the PCB portions 208, which results in the coaxial cables being electrically coupled to the radiating elements 210, 212, 214, 215. By coupling the coaxial cables in this manner, the center conductors are positioned at or near the feed points 203 of the radiating elements 210, 212, 214, 215, which minimizes the required length of the microstrip transmission lines 216 (i.e., a distance between the terminated coaxial cables 222 and the radiating elements 210, 212, 214, 215).

To complete the assembly of the multi-element multi-band antenna 202, the third and fourth PCB portions 208C, 208D can be folded in a direction away from the internal ground plane 230 along the fold lines B-B. Folding the PCB portions 208C, 208D in this manner creates an approximately 90-degree angle between the base portions 246 and remainder of the PCB portions 208C, 208D. Optionally, additional stiffeners can be added to any of the PCB portions 208, such as on the back sides of the PCB portions 208C, 208D and on the top PCB portions 286, 288. The radome 204 can then be positioned on the top side of the internal ground plane 230, causing the first and second PCB portion 208A, 208B to assume their final three-dimensional form, as shown in FIG. 19C.

When the radome 204 is inserted onto the internal ground plane 230, the first and second PCB portions 208A, 208B can be guided through the gap between the second ribs 274 and the wall guides 278. In some implementations, the wall guides 278 can tapered so that the bottom of the wall guides 278 extend further into the interior of the radome 204 that the top. This design ensures that the top PCB portions 286, 288 remain within the gap on initial insertion of the radome 204 because of potential contact between the top support portions 245 and the wall guides 278, and that the top PCB portions 286, 288 can extend past the gap into the interior of the radome 204 on further insertion of the radome 204. For example, as the top edge of the first and second PCB portion 208A, 208B contacts the curved top portion 275 of the second ribs 274, the first and second PCB portion 208A, 208B are pushed inwardly from the side walls 260, 264 respectively and towards the top supports 291. Continued insertion of the radome 204 causes the upright support portions 243 to extend into the gap between the second ribs 274 and the wall guides 278 and the third and fourth PCB portions 208C, 208D to extend into the slots 276 of the first ribs 272. The first and second PCB portion 208A, 208B can assume their final "L" shaped form on final insertion of the bottom edge 270 of the radome 204 into the base slot 294, as shown in FIG. 19C. The final insertion causes the top PCB portions 286, 288 to enter the slots 292 of the top supports 291 (see e.g., FIGS. 20 and 21) and the first and second PCB portion 208A, 208B to bend along the bend lines C-C, defining the upright radiating portions 211, 213 and the head radiating portion 287, 289 of the radiating elements 210, 212 respectively. The radome 204 can then be fixed to the internal ground plane 230 by threading fasteners 250 through the fastener holes 256 in the internal ground plane 230 and into the fastener holes 258 in the radome 204.

The three-dimensional forming of the radiating elements 210, 212, 214, 215 by the radome 204 during the assembly process advantageously reduces manufacturing time and expense and provides for properly shaped and positioned radiating elements 210, 212, 214, 215. For example, the radome 204 is used to form the radiating elements 210, 212 into a desired "C" shape, "L" shape, or another suitable and desired three-dimensional shape.

In some embodiments, the antenna assembly 200 may include one or more additional substrate components for support of the PCB portions 208 (e.g., PCB supports). These PCB support(s) may be positioned between the PCB portions 208 and the internal ground plane 230 to provide additional spacing (e.g., a gap) between the transmission lines 216 (formed on the base portions 246) and the internal ground plane 230. This arrangement may provide certain benefits when the non-conductive PCB portions 208 are not of sufficient thickness to provide adequate spacing for the desired performance of the microstrip transmission lines 216. The PCB supports can be FR4, plastic, foam, and/or the like. In some embodiments, the PCB support may be a single continuous piece that covers at least a portion of the internal ground plane 230. In other embodiments, the PCB support may be a plurality of smaller support portions positioned between each of the PCB portions 208 and the internal ground plane 230.

In an assembled configuration, the antenna assembly 200 may include the gasket 252 secured to the bottom side of the internal ground plane 230 with the magnets 254 positioned within the internal ground plane 230. The coaxial cables for the radiating elements 210, 212, 214, and 215 and the GPS antenna 238 cable may be coupled to the top side of the internal ground plane 230. The radiating elements 210, 212, 214, 215 may be positioned within the radome 204, with the radome 204 allowing the radiating elements 210, 212, 214, 215 to assume the three-dimensional shape illustrated in at least FIG. 19C during the installation process. The assembled radome 204 may be positioned on the internal ground plane 230, with the bottom edge 270 of the radome 204 extending into the base slot 294 of the internal ground plane 230 and the fastener holes 256 of the radome 204 aligned with the fastener holes 258 of the internal ground plane 230. Finally, the radome 204 can be fixed to the internal ground plane 230 via the fasteners 250.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

Example Clauses

Various examples of systems relating to an antenna system are found in the following clauses:

Clause 1. An antenna assembly comprising: a cover comprising one or more side walls and a top wall; a base, the base configured to couple to the cover; a PCB positioned between the cover and the base, the PCB comprising: a base portion; a first arm; a second arm; and a third arm; and a multi-band antenna formed on the PCB, the multi-band antenna comprising: a first radiating element formed on the first arm; a second radiating element formed on the second arm; and a third radiating element formed on the third arm.

Clause 2. The antenna assembly of Clause 1, wherein the PCB comprises a flex circuit.

Clause 3. The antenna assembly of Clause 1 or Clause 2, wherein the PCB has a first configuration and a second configuration, wherein the PCB is substantially flat in the first configuration, wherein the PCB has a three-dimensional shape in the second configuration.

Clause 4. The antenna assembly of Clause 3, wherein the base portion is coplanar to the first arm, the second arm, and the third arm in the first configuration, wherein the base portion is not-coplanar to the first arm, the second arm, or the third arm in the second configuration.

Clause 5. The antenna assembly of Clause 3 or Clause 4, wherein the PCB moves from the first configuration to the second configuration when inserted into the cover during assembly of the antenna assembly.

Clause 6. The antenna assembly of any of Clause 1-5, wherein the cover comprises a plurality of ribs formed on internal surfaces of the one or more side walls.

Clause 7. The antenna assembly of Clause 6, wherein the plurality of ribs are configured as catch points for the PCB, wherein engagement between the plurality of ribs and the PCB causes the PCB to move from the first configuration to the second configuration during assembly of the antenna assembly.

Clause 8. The antenna assembly of Clause 7, wherein the plurality of ribs provide support for the first arm, the second arm, and the third arm.

Clause 9. The antenna assembly of Clause 8, wherein at least one of the plurality of ribs comprises a slot, the slot configured to receive and support one or more of: the first arm, the second arm, or the third arm.

Clause 10. The antenna assembly of any of Clauses 1-9, wherein the first arm, the second arm, and the third arm are orthogonal to the base portion.

Clause 11. The antenna assembly of any of Clauses 1-10, wherein the first arm is coplanar to the third arm.

Clause 12. The antenna assembly of any of Clauses 1-11, further comprising an internal ground plane, the internal ground plane positioned between the base and a bottom side of the base portion of the PCB.

Clause 13. The antenna assembly of any of Clauses 1-11, further comprising an internal ground plane, the internal ground plane formed on a bottom side of the base portion of the PCB.

Clause 14. The antenna assembly of any of Clauses 1-13, wherein the base comprises a plurality of magnets positioned between a top side of the base and a bottom side of the base, the plurality of magnets configured to allow the antenna assembly to be magnetically coupled to an external ground plane.

Clause 15. The antenna assembly of any of Clauses 11-14, further comprising a GPS antenna, the GPS antenna supported by the base and positioned between the base and the cover.

Clause 16. The antenna assembly of any of Clauses 11-15, wherein the first radiating element and the third radiating element are configured for communication between approximately 500 MHz and 8 GHz and the second radiating element is configured for communication between approximately 2 GHz and 8 GHz.

Clause 17. The antenna assembly of any of Clauses 11-16, wherein the first arm comprises a first upright portion and a first top portion, the first upright portion extending from a top edge of the first upright portion, the first top portion orthogonal to the first upright portion.

Clause 18. The antenna assembly of Clause 17, wherein the first radiating element comprises a first upright radiating element and a first head radiating element, the first upright radiating element formed on the first upright portion, the first head radiating element formed on the first top portion.

Clause 19. The antenna assembly of any of Clauses 11-18, wherein the third arm comprises a third upright portion and a third top portion, the third upright portion extending from a top edge of the third upright portion, the third top portion orthogonal to the third upright portion.

Clause 20. The antenna assembly of Clause 19, wherein the third radiating element comprises a third upright radiating element and a third head radiating element, the third upright radiating element formed on the third upright portion, the third head radiating element formed on the third top portion.

Clause 21. The antenna assembly of Clause 20, wherein the third head radiating element is coplanar to the first head radiating element.

Clause 22. The antenna assembly of any of Clauses 1-21, wherein the top wall of the cover comprises a plurality of slot projections.

Clause 23. The antenna assembly of Clause 22, wherein plurality of slot projections are configured to support the first top portion of the first arm and the third top portion of the third arm.

Clause 24. The antenna assembly of any of Clauses 1-23, wherein the cover and the base when coupled define an internal compact volume of less than 20 cubic inches.

Clause 25. A method of assembling an antenna assembly, the method comprising inserting a PCB into a cover, the PCB having a first configuration before being inserted into the cover and a second configuration after being inserted into the cover, wherein in the first configuration, the PCB is substantially flat, wherein in the second configuration, the PCB has a three-dimensional shape; and coupling a base to the cover, the PCB positioned between the base and the cover.

Clause 26. The method of Clause 25, wherein the PCB comprises a flex circuit.

Clause 27. The method of Clause 25 or 26, wherein the PCB comprises: a base portion; a first arm; a second arm; and a third arm.

Clause 28. The method of Clause 27, wherein the base portion is coplanar to the first arm, the second arm, and the third arm in the first configuration, wherein the base portion is not-coplanar to the first arm, the second arm, or the third arm in the second configuration.

Clause 29. The method of any of Clauses 25-28, wherein the cover comprises one or more side walls and a plurality of ribs formed on internal surfaces of the one or more side walls, the plurality of ribs configured as catch points for the PCB, wherein engagement between the plurality of ribs and the PCB causes the PCB to move from the first configuration to the second configuration.

Clause 30. The method of Clause 29, wherein the plurality of ribs provide support for the first arm, the second arm, and the third arm.

Clause 31. The method of Clause 30, wherein at least one of the plurality of ribs comprises a slot, the slot configured to receive and support one or more of: the first arm, the second arm, or the third arm.

Clause 32. The method of any of Clauses 27-31, wherein the first arm, the second arm, and the third arm are orthogonal to the base portion.

Clause 33. The method of Clause 32, wherein the first arm is coplanar to the third arm.

Clause 34. The method of any of Clauses 25-33, wherein a multi-band antenna is formed on the PCB, the multi-band antenna comprising: a first radiating element formed on the first arm; a second radiating element formed on the second arm; and a third radiating element formed on the third arm.

Clause 35. The method of any of Clauses 27-34, further comprising: coupling an internal ground plane to a top side of the base, the internal ground plane positioned between the base and a bottom side of the base portion of the PCB.

Clause 36. The method of any of Clauses 27-34, wherein an internal ground plane is formed on a bottom side of the base portion of the PCB.

Clause 37. The method of any of Clauses 25-36, wherein the base comprises a plurality of magnets positioned between a top side of the base and a bottom side of the base, the plurality of magnets configured to allow the antenna assembly to be magnetically coupled to an external ground plane.

Clause 38. The method of any of Clauses 25-37, further comprising: inserting a GPS antenna into the antenna assembly, the GPS antenna supported by the base and positioned between the cover and the base.

Clause 39. The method of any of Clauses 34-38, wherein the first radiating element and the third radiating element are configured for communication between approximately 500 MHz and 8 GHz and the second radiating element is configured for communication between approximately 2 GHz and 8 GHz.

Clause 40. The method of any of Clauses 27-39, wherein the first arm comprises a first upright portion and a first top portion, the first upright portion extending from a top edge of the first upright portion, the first top portion orthogonal to the first upright portion.

Clause 41. The method of Clause 40, wherein the first radiating element comprises a first upright radiating element and a first head radiating element, the first upright radiating element formed on the first upright portion, the first head radiating element formed on the first top portion.

Clause 42. The method of any of Clauses 27-41, wherein the third arm comprises a third upright portion and a third top portion, the third upright portion extending from a top edge of the third upright portion, the third top portion orthogonal to the third upright portion.

Clause 43. The method of Clause 42, wherein the third radiating element comprises a third upright radiating element and a third head radiating element, the third upright radiating element formed on the third upright portion, the third head radiating element formed on the third top portion.

Clause 44. The method of Clause 43, wherein the third head radiating element is coplanar to the first head radiating element.

Clause 45. The method of any of Clauses 25-44, wherein the cover comprises a top wall, the top wall of the cover comprises a plurality of slot projections.

Clause 46. The method of Clause 45, wherein plurality of slot projections are configured to support the first top portion of the first arm and the third top portion of the third arm.

Clause 47. The method of any of Clauses 25-46, wherein the cover and the base when coupled define an internal compact volume of less than 20 cubic inches.

Clause 48. An antenna assembly comprising: a cover comprising one or more side walls and a top wall; a base, the base configured to couple to the cover; a PCB positioned between the cover and the base, the PCB comprising: a base PCB portion; a first PCB portion; a second PCB portion; and a third PCB portion; and a multi-band antenna formed on the PCB, the multi-band antenna comprising: a first radiating element formed on the first PCB portion; a second radiating element formed on the second PCB portion; and a third radiating element formed on the third PCB portion.

Clause 49. The antenna assembly of Clause 48, wherein the PCB comprises a flex circuit.

Clause 50. The antenna assembly of Clause 48 or Clause 49, wherein the PCB has a first configuration and a second configuration, wherein the PCB is substantially flat in the first configuration, wherein the PCB has a three-dimensional shape in the second configuration.

Clause 51. The antenna assembly of Clause 50, wherein the base PCB portion is coplanar to the first PCB portion, the second PCB portion, and the third PCB portion in the first configuration, wherein the base PCB portion is not-coplanar to the first PCB portion, the second PCB portion, or the third PCB portion in the second configuration.

Clause 52. The antenna assembly of Clause 50 or Clause 51, wherein the PCB moves from the first configuration to the second configuration when inserted into the cover during assembly of the antenna assembly.

Clause 53. The antenna assembly of any of Clause 48-52, wherein the cover comprises a plurality of ribs formed on internal surfaces of the one or more side walls.

Clause 54. The antenna assembly of Clause 53, wherein the plurality of ribs are configured as catch points for the PCB, wherein engagement between the plurality of ribs and the PCB causes the PCB to move from the first configuration to the second configuration during assembly of the antenna assembly.

Clause 55. The antenna assembly of Clause 54, wherein the plurality of ribs provide support for the first PCB portion, the second PCB portion, and the third PCB portion.

Clause 56. The antenna assembly of Clause 55, wherein at least one of the plurality of ribs comprises a slot, the slot configured to receive and support one or more of: the first PCB portion, the second PCB portion, or the third PCB portion.

Clause 57. The antenna assembly of any of Clauses 48-56, wherein the first PCB portion, the second PCB portion, and the third PCB portion are orthogonal to the base PCB portion.

Clause 58. The antenna assembly of any of Clauses 48-57, wherein the first PCB portion is coplanar to the third PCB portion.

Clause 59. The antenna assembly of any of Clauses 48-58, further comprising an internal ground plane, the internal ground plane positioned between the base and a bottom side of the base PCB portion of the PCB.

Clause 60. The antenna assembly of any of Clauses 48-58, further comprising an internal ground plane, the internal ground plane formed on a bottom side of the base PCB portion of the PCB.

Clause 61. The antenna assembly of any of Clauses 48-60, wherein the base comprises a plurality of magnets positioned between a top side of the base and a bottom side of the base, the plurality of magnets configured to allow the antenna assembly to be magnetically coupled to an external ground plane.

Clause 62. The antenna assembly of any of Clauses 58-61, further comprising a GPS antenna, the GPS antenna supported by the base and positioned between the base and the cover.

Clause 63. The antenna assembly of any of Clauses 58-62, wherein the first radiating element and the third radiating element are configured for communication between approximately 500 MHz and 8 GHz and the second radiating element is configured for communication between approximately 2 GHz and 8 GHz.

Clause 64. The antenna assembly of any of Clauses 58-63, wherein the first PCB portion comprises a first upright portion and a first top portion, the first upright portion extending from a top edge of the first upright portion, the first top portion orthogonal to the first upright portion.

Clause 65. The antenna assembly of Clause 64, wherein the first radiating element comprises a first upright radiating element and a first head radiating element, the first upright radiating element formed on the first upright portion, the first head radiating element formed on the first top portion.

Clause 66. The antenna assembly of any of Clauses 58-65, wherein the third PCB portion comprises a third upright portion and a third top portion, the third upright portion extending from a top edge of the third upright portion, the third top portion orthogonal to the third upright portion.

Clause 67. The antenna assembly of Clause 66, wherein the third radiating element comprises a third upright radiating element and a third head radiating element, the third upright radiating element formed on the third upright portion, the third head radiating element formed on the third top portion.

Clause 68. The antenna assembly of Clause 67, wherein the third head radiating element is coplanar to the first head radiating element.

Clause 69. The antenna assembly of any of Clauses 48-68, wherein the top wall of the cover comprises a plurality of slot projections.

Clause 70. The antenna assembly of Clause 69, wherein plurality of slot projections are configured to support the first top portion of the first PCB portion and the third top portion of the third PCB portion.

Clause 71. The antenna assembly of any of Clauses 48-70, wherein the cover and the base when coupled define an internal compact volume of less than 20 cubic inches.

Clause 72. A method of assembling an antenna assembly, the method comprising inserting a PCB into a cover, the PCB having a first configuration before being inserted into the cover and a second configuration after being inserted into the cover, wherein in the first configuration, the PCB is substantially flat, wherein in the second configuration, the PCB has a three-dimensional shape; and coupling a base to the cover, the PCB positioned between the base and the cover.

Clause 73. The method of Clause 72, wherein the PCB comprises a flex circuit.

Clause 74. The method of Clause 72 or 73, wherein the PCB comprises: a base PCB portion; a first PCB portion; a second PCB portion; and a third PCB portion.

Clause 75. The method of Clause 74, wherein the base PCB portion is coplanar to the first PCB portion, the second PCB portion, and the third PCB portion in the first configuration, wherein the base PCB portion is not-coplanar to the first PCB portion, the second PCB portion, or the third PCB portion in the second configuration.

Clause 76. The method of any of Clauses 72-75, wherein the cover comprises one or more side walls and a plurality of ribs formed on internal surfaces of the one or more side walls, the plurality of ribs configured as catch points for the PCB, wherein engagement between the plurality of ribs and the PCB causes the PCB to move from the first configuration to the second configuration.

Clause 77. The method of Clause 76, wherein the plurality of ribs provide support for the first PCB portion, the second PCB portion, and the third PCB portion.

Clause 78. The method of Clause 77, wherein at least one of the plurality of ribs comprises a slot, the slot configured to receive and support one or more of: the first PCB portion, the second PCB portion, or the third PCB portion.

Clause 79. The method of any of Clauses 74-78, wherein the first PCB portion, the second PCB portion, and the third PCB portion are orthogonal to the base PCB portion.

Clause 80. The method of Clause 79, wherein the first PCB portion is coplanar to the third PCB portion.

Clause 81. The method of any of Clauses 72-80, wherein a multi-band antenna is formed on the PCB, the multi-band antenna comprising: a first radiating element formed on the first PCB portion; a second radiating element formed on the second PCB portion; and a third radiating element formed on the third PCB portion.

Clause 82. The method of any of Clauses 74-81, further comprising: coupling an internal ground plane to a top side of the base, the internal ground plane positioned between the base and a bottom side of the base PCB portion of the PCB.

Clause 83. The method of any of Clauses 74-81, wherein an internal ground plane is formed on a bottom side of the base PCB portion of the PCB.

Clause 84. The method of any of Clauses 72-83, wherein the base comprises a plurality of magnets positioned between a top side of the base and a bottom side of the base, the plurality of magnets configured to allow the antenna assembly to be magnetically coupled to an external ground plane.

Clause 85. The method of any of Clauses 72-84, further comprising: inserting a GPS antenna into the antenna assembly, the GPS antenna supported by the base and positioned between the cover and the base.

Clause 86. The method of any of Clauses 81-85, wherein the first radiating element and the third radiating element are configured for communication between approximately 500 MHz and 8 GHz and the second radiating element is configured for communication between approximately 2 GHz and 8 GHz.

Clause 87. The method of any of Clauses 74-86, wherein the first PCB portion comprises a first upright portion and a first top portion, the first upright portion extending from a top edge of the first upright portion, the first top portion orthogonal to the first upright portion.

Clause 88. The method of Clause 87, wherein the first radiating element comprises a first upright radiating element and a first head radiating element, the first upright radiating element formed on the first upright portion, the first head radiating element formed on the first top portion.

Clause 89. The method of any of Clauses 74-88, wherein the third PCB portion comprises a third upright portion and a third top portion, the third upright portion extending from a top edge of the third upright portion, the third top portion orthogonal to the third upright portion.

Clause 90. The method of Clause 89, wherein the third radiating element comprises a third upright radiating element and a third head radiating element, the third upright radiating element formed on the third upright portion, the third head radiating element formed on the third top portion.

Clause 91. The method of Clause 90, wherein the third head radiating element is coplanar to the first head radiating element.

Clause 92. The method of any of Clauses 72-91, wherein the cover comprises a top wall, the top wall of the cover comprises a plurality of slot projections.

Clause 93. The method of Clause 92, wherein plurality of slot projections are configured to support the first top portion of the first PCB portion and the third top portion of the third PCB portion.

Clause 94. The method of any of Clauses 72-93, wherein the cover and the base when coupled define an internal compact volume of less than 20 cubic inches.

Clause 95. An antenna assembly comprising: a cover comprising one or more side walls and a top wall; a base configured to be coupled to the cover to define an internal volume; an internal ground plane configured to be positioned within the internal volume; a PCB configured to be positioned above the internal ground plane within the internal volume, the PCB comprising: a base PCB portion; a first PCB portion extending from the base PCB portion; a second PCB portion extending from the base PCB portion; and a third PCB portion extending from the base PCB portion; and a multi-band antenna formed on the PCB, the multi-band antenna comprising a plurality of radiating elements comprising: a first cellular radiating element formed on the first PCB portion, the first cellular radiating element comprising a first upright radiating portion and a first head radiating portion; a second cellular radiating element formed on the second PCB portion of the PCB, the second cellular radiating element comprising a second upright radiating portion and a second head radiating portion; and a WiFi radiating element formed on the third PCB portion; wherein the first cellular radiating element and the second cellular radiating element are configured to move from a first configuration prior to engagement with the cover to a second configuration when the cover is coupled to the base, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

Clause 96. The antenna assembly of Clause 95, wherein the PCB comprises a flex circuit.

Clause 97. The antenna assembly of Clause 95 or Clause 96, wherein the cover comprises a plurality of ribs formed on internal surfaces of the one or more side walls, the plurality of ribs configured to engage the plurality of radiating elements.

Clause 98. The antenna assembly of Clause 97, wherein the plurality of ribs are configured as catch points for the plurality of radiating elements, wherein engagement between one or more of the plurality of ribs and the first cellular radiating element and the second cellular radiating element causes the first cellular radiating element and the second cellular radiating element to move from the first configuration to the second configuration.

Clause 99. The antenna assembly of Clause 97 or Clause 98, wherein the plurality of ribs support the plurality of radiating elements in a desired orientation relative to the internal ground plane.

Clause 100. The antenna assembly of any of Clauses 97-99, wherein at least one of the plurality of ribs comprises a slot, the slot configured to receive and support the WiFi radiating element.

Clause 101. The antenna assembly of any of Clauses 95-100, wherein the plurality of radiating elements extend from the base PCB portion at a substantially orthogonal angle relative to the base PCB portion.

Clause 102. The antenna assembly of any of Clauses 95-101, wherein the first head radiating portion is substantially coplanar to the second head radiating portion.

Clause 103. The antenna assembly of any of Clauses 95-102, wherein the base PCB portion is coupled to the internal ground plane.

Clause 104. The antenna assembly of any of Clauses 95-103, further comprising a plurality of magnets, the plurality of magnets housed in the base and configured to allow the antenna assembly to be magnetically coupled to an external surface.

Clause 105. The antenna assembly of any of Clauses 95-104, further comprising a GPS antenna, the GPS antenna coupled to the internal ground plane and positioned within the internal volume.

Clause 106. The antenna assembly of any of Clauses 95-105, wherein the first cellular radiating element and the second cellular radiating element are configured for communication between approximately 450 MHz and 8 GHz and the WiFi radiating element is configured for communication between approximately 1 GHz and 8 GHz.

Clause 107. The antenna assembly of any of Clauses 95-106, wherein the first upright radiating portion is substantially orthogonal to the first head radiating portion and the second upright radiating portion is substantially orthogonal to the second head radiating portion.

Clause 108. The antenna assembly of any of Clauses 95-107, wherein the cover comprises one or more support portions extending inwardly from the top wall towards the base, the one or more support portions comprising slots configured to receive and support the first head radiating portion and the second head radiating portion.

Clause 109. The antenna assembly of any of Clauses 95-108, wherein the internal volume is less than 20 cubic inches.

Clause 110. The antenna assembly of any of Clauses 95-109, wherein the PCB is substantially flat in the first configuration, wherein the PCB has a three-dimensional shape in the second configuration.

Clause 111. The antenna assembly of any of Clause 95-110, wherein the base PCB portion is coplanar to the first PCB portion, the second PCB portion, and the third PCB portion in the first configuration, wherein the base PCB portion is not-coplanar to the first PCB portion, the second PCB portion, or the third PCB portion in the second configuration.

Clause 112. The antenna assembly of any of Clauses 95-111, wherein the first PCB portion, the second PCB portion, and the third PCB portion are substantially orthogonal to the base PCB portion in the second configuration.

Clause 113. The antenna assembly of any of Clauses 95-112, wherein the internal ground plane is formed on a bottom side of the base PCB portion.

Clause 114. The antenna assembly of any of Clauses 95-113, further comprising a supporting substrate, the supporting substrate positioned between the PCB and the internal ground plane.

Clause 115. The antenna assembly of any of Clauses 95-114, further comprising a second WiFi radiating element formed on a fourth PCB portion of the PCB.

Clause 116. The antenna assembly of any of Clause 95-115, wherein the multi-band antenna further comprises a plurality of microstrip transmission lines and a plurality of coaxial inputs formed on the base PCB portion, each microstrip transmission line of the plurality of microstrip transmission lines extending between a feeding portion of one radiating element of the plurality of radiating elements and one coaxial input of the plurality of coaxial inputs.

Clause 117. The antenna assembly of Clause 116, further comprising a plurality of coaxial cables, each coaxial cable of the plurality of coaxial cables comprising an outer connector and an inner connector, wherein the outer connectors are configured to be coupled to a bottom side of the internal ground plane, wherein the inner connectors are configured to extend through openings in the internal ground plane and into the plurality of coaxial inputs.

Clause 118. The antenna assembly of Clause 117, wherein the outer connecters are soldered to the bottom side of the internal ground plane.

Clause 119. The antenna assembly of Clause 118, wherein the bottom side of the internal ground plane comprises a plurality of heat relief features.

Clause 120. The antenna assembly of Clause 119, wherein each outer connector is positioned between at least two heat relief features of the plurality of heat relief features, the plurality of heat relief features configured to provide a thermal barrier between adjacent outer connectors.

Clause 121. The antenna assembly of Clause 120, where each heat relief feature of the plurality of heat relief features comprises a slit extending from the bottom side of the internal ground plane towards a top side of the internal ground plane.

Clause 122. A method of assembling an antenna assembly, the method comprising: coupling one or more radiating elements in a first configuration to an internal ground plane; positioning the internal ground plane on a base; and positioning a cover on the base, with the one or more radiating elements positioned between the cover and the internal ground plane, wherein positioning the cover on the base causes at least a first radiating element of the one or more radiating elements to move to a second configuration, wherein in the first configuration, the first radiating element is substantially flat, wherein in the second configuration, the first radiating element has a three-dimensional shape.

Clause 123. The method of Clause 122, wherein the one or more radiating elements comprise one or more PCB portions of a PCB, the PCB comprising a flex circuit.

Clause 124. The method of Clause 122 or Clause 123, wherein the cover comprises a plurality of ribs formed on internal surfaces of one or more side walls of the cover, the plurality of ribs configured to engage the one or more radiating elements.

Clause 125. The method of Clause 124, wherein the plurality of ribs are configured as catch points for the one or more radiating elements, wherein engagement between one or more of the plurality of ribs and the first radiating element causes the first radiating element to move from the first configuration to the second configuration during assembly of the antenna assembly.

Clause 126. The method of Clause 124 or Clause 125, wherein the plurality of ribs support the one or more radiating elements in a desired orientation relative to the internal ground plane.

Clause 127. The method of any of Clauses 124-126, wherein the one or more radiating elements further comprise a second radiating element and a third radiating element.

Clause 128. The method of any of Clause 127, wherein at least one of the plurality of ribs comprises a slot, the slot configured to receive and support the third radiating element.

Clause 129. The method of any of Clauses 123-128, wherein PCB further comprises a base PCB portion, the one or more PCB portions extending from the base PCB portion.

Clause 130. The method of Clause 129, wherein the base PCB portion is coupled to the internal ground plane.

Clause 131. The method of Clause 129 or Clause 130, wherein the one or more radiating elements extend from the base PCB portion at a substantially orthogonal angle relative to the base PCB portion.

Clause 132. The method of any of Clauses 127-131, wherein the first radiating element comprising a first upright radiating portion and a first head radiating portion, wherein the second radiating element comprising a second upright radiating portion and a second head radiating portion.

Clause 133. The method of Clause 132, wherein the first head radiating portion is substantially coplanar to the second head radiating portion.

Clause 134. The method of any of Clauses 127-133, wherein the first radiating element and the second radiating element are configured for communication between approximately 450 MHz and 8 GHz and the third radiating element is configured for communication between approximately 1 GHz and 8 GHz.

Clause 135. The method of any of Clauses 132-134, wherein the first upright radiating portion is substantially orthogonal to the first head radiating portion and the second upright radiating portion is substantially orthogonal to the second head radiating portion.

Clause 136. The method of any of Clauses 122-135, wherein the antenna assembly further comprises a plurality of magnets, the plurality of magnets housed in the base and configured to allow the antenna assembly to be magnetically coupled to an external surface.

Clause 137. The method of any of Clauses 122-136, further comprising: inserting a GPS antenna into the antenna assembly, the GPS antenna coupled to the internal ground plane and positioned between the cover and the internal ground plane.

Clause 138. The method of any of Clauses 132-137, wherein the cover comprises one or more support portions extending inwardly from a top wall of the cover towards the internal ground plane, the one or more support portions comprising slots configured to receive and support the first head radiating portion and the second head radiating portion.

Clause 139. The method of any of Clauses 122-138, wherein the cover and the base when coupled define an internal compact volume of less than 20 cubic inches.

Clause 140. The method of any of Clauses 123-139, wherein the PCB is substantially flat in the first configuration, wherein the PCB has a three-dimensional shape in the second configuration.

Clause 141. The method of any of Clause 129-140, wherein the internal ground plane is formed on a bottom side of the base PCB portion.

Clause 142. The method of any of Clauses 123-141, further comprising positioning a supporting substrate between the PCB and the internal ground plane.

Clause 143. The method of any of Clauses 127-142, wherein the one or more radiating elements further comprise a fourth radiating element.

Clause 144. The method of any of Clause 129-143, wherein the PCB further comprises a plurality of microstrip transmission lines and a plurality of coaxial inputs formed on the base PCB portion, each microstrip transmission line of the plurality of microstrip transmission lines extending between a feeding portion of one radiating element of the one or more radiating elements and one coaxial input of the plurality of coaxial inputs.

Clause 145. The method of Clause 144, further comprising: coupling outer connectors of one or more coaxial cables to a bottom side of the internal ground plane, wherein inner connectors of the one or more coaxial cables are configured to extend through openings in the internal ground plane and into the plurality of coaxial inputs.

Clause 146. The method of Clause 145, wherein the outer connecters are soldered to the bottom side of the internal ground plane.

Clause 147. The method of Clause 146, wherein the bottom side of the internal ground plane comprises a plurality of heat relief features.

Clause 148. The method of Clause 147, wherein each outer connector is positioned between at least two heat relief features of the plurality of heat relief features, the plurality of heat relief features configured to provide a thermal barrier between adjacent outer connectors.

Clause 149. The method of Clause 148, where each heat relief feature of the plurality of heat relief features comprises a slit extending from the bottom side of the internal ground plane towards a top side of the internal ground plane.

Clause 150. An antenna assembly comprising: a cover comprising one or more side walls and a top wall; a base configured to be coupled to the cover to define an internal volume; an internal ground plane configured to be positioned within the internal volume; a PCB configured to be positioned above the internal ground plane within the internal volume, the PCB comprising: a base PCB portion; and a first PCB portion extending from the base PCB portion; and a multi-band antenna positioned between the cover and the internal ground plane, the multi-band antenna comprising a one or more radiating elements comprising: a first radiating element formed on the first PCB portion, the first radiating element comprising a first upright radiating portion and a first head radiating portion; wherein the first radiating element is configured to move from a first configuration prior to engagement with the cover to a second configuration when the cover is coupled to the base, wherein in the first configuration the first upright radiating portion is coplanar to the first head radiating portion, wherein in the second configuration, the first upright radiating portion is at an angle relative to the first head radiating portion.

Clause 151. The antenna assembly of Clause 150, wherein the PCB comprises a flex circuit.

Clause 152. The antenna assembly of Clause 150 or Clause 151, wherein the cover comprises a plurality of ribs formed on internal surfaces of the one or more side walls, the plurality of ribs configured to engage the one or more radiating elements.

Clause 153. The antenna assembly of Clause 152, wherein the plurality of ribs are configured as catch points for the one or more radiating elements, wherein engagement between one or more of the plurality of ribs and the first radiating element causes the first radiating element to move from the first configuration to the second configuration.

Clause 154. The antenna assembly of Clause 152 or Clause 153, wherein the plurality of ribs support the one or more radiating elements in a desired orientation relative to the internal ground plane.

Clause 155. The antenna assembly of any of Clauses 150-154, wherein the one or more radiating elements further comprise a second radiating element formed on a second PCB portion of the PCB and a third radiating element formed on a third PCB portion of the PCB, the second radiating element comprising a second upright radiating portion and a second head radiating portion.

Clause 156. The antenna assembly of Clause 155, wherein at least one of the plurality of ribs comprises a slot, the slot configured to receive and support the third radiating element.

Clause 157. The antenna assembly of any of Clauses 150-156, wherein the one or more radiating elements extend from the base PCB portion at a substantially orthogonal angle relative to the base PCB portion.

Clause 158. The antenna assembly of any of Clauses 155-157, wherein the first head radiating portion is substantially coplanar to the second head radiating portion.

Clause 159. The antenna assembly of any of Clauses 150-158, wherein the base PCB portion is coupled to the internal ground plane.

Clause 160. The antenna assembly of any of Clauses 150-159, further comprising a plurality of magnets, the plurality of magnets housed in the base and configured to allow the antenna assembly to be magnetically coupled to an external surface.

Clause 161. The antenna assembly of any of Clauses 150-160, further comprising a GPS antenna, the GPS antenna coupled to the internal ground plane and positioned within the internal volume.

Clause 162. The antenna assembly of any of Clauses 155-161, wherein the first radiating element and the second radiating element are configured for communication between approximately 450 MHz and 8 GHz and the third radiating element is configured for communication between approximately 1 GHz and 8 GHz.

Clause 163. The antenna assembly of any of Clauses 155-162, wherein the first upright radiating portion is substantially orthogonal to the first head radiating portion and the second upright radiating portion is substantially orthogonal to the second head radiating portion.

Clause 164. The antenna assembly of any of Clauses 155-163, wherein the cover comprises one or more support portions extending inwardly from the top wall towards the base, the one or more support portions comprising slots configured to receive and support the first head radiating portion and the second head radiating portion.

Clause 165. The antenna assembly of any of Clauses 150-164 wherein the internal volume is less than 20 cubic inches.

Clause 166. The antenna assembly of any of Clauses 150-165, wherein the PCB is substantially flat in the first configuration, wherein the PCB has a three-dimensional shape in the second configuration.

Clause 167. The antenna assembly of any of Clause 155-166 wherein the base PCB portion is coplanar to the first PCB portion, the second PCB portion, and the third PCB portion in the first configuration, wherein the base PCB portion is not-coplanar to the first PCB portion, the second PCB portion, or the third PCB portion in the second configuration.

Clause 168. The antenna assembly of any of Clauses 155-167, wherein the first PCB portion, the second PCB portion, and the third PCB portion are substantially orthogonal to the base PCB portion in the second configuration.

Clause 169. The antenna assembly of any of Clauses 150-168, wherein the internal ground plane is formed on a bottom side of the base PCB portion.

Clause 170. The antenna assembly of any of Clauses 150-169, further comprising a supporting substrate, the supporting substrate positioned between the PCB and the internal ground plane.

Clause 171. The antenna assembly of any of Clauses 155-170, further comprising a fourth radiating element formed on a fourth PCB portion of the PCB, the fourth radiating element configured for communication between approximately 1 GHz and 8 GHz.

Clause 172. The antenna assembly of any of Clause 150-171, wherein the multi-band antenna further comprises a plurality of microstrip transmission lines and a plurality of coaxial inputs formed on the base PCB portion, each microstrip transmission line of the plurality of microstrip transmission lines extending between a feeding portion of one radiating element of the one or more radiating elements and one coaxial input of the plurality of coaxial inputs.

Clause 173. The antenna assembly of Clause 172, further comprising a plurality of coaxial cables, each coaxial cable of the plurality of coaxial cables comprising an outer connector and an inner connector, wherein the outer connectors are configured to be coupled to a bottom side of the internal ground plane, wherein the inner connectors are configured to extend through openings in the internal ground plane and into the plurality of coaxial inputs.

Clause 174. The antenna assembly of Clause 173, wherein the outer connecters are soldered to the bottom side of the internal ground plane.

Clause 175. The antenna assembly of Clause 174, wherein the bottom side of the internal ground plane comprises a plurality of heat relief features.

Clause 176. The antenna assembly of Clause 175, wherein each outer connector is positioned between at least two heat relief features of the plurality of heat relief features, the plurality of heat relief features configured to provide a thermal barrier between adjacent outer connectors.

Clause 177. The antenna assembly of Clause 176, where each heat relief feature of the plurality of heat relief features comprises a slit extending from the bottom side of the internal ground plane towards a top side of the internal ground plane.

Clause 178. An antenna assembly comprising: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a plurality of radiating elements comprising: a first cellular radiating element formed on a first PCB portion, the first cellular radiating element comprising a first upright radiating portion and a first head radiating portion; a second cellular radiating element formed on a second PCB portion, the second cellular radiating element comprising a second upright radiating portion and a second head radiating portion; and a WiFi radiating element formed on a third PCB portion; wherein the first cellular radiating element and the second cellular radiating element are configured to move from a first configuration prior to engagement with the cover to a second configuration when the cover is coupled to the internal ground plane, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

Clause 179. The antenna assembly of Clause 178, wherein the first PCB portion, the second PCB portion, and the third PCB portion comprise flex circuits.

Clause 180. The antenna assembly of Clause 178 or Clause 179, wherein the cover comprises a plurality of ribs formed on internal surfaces of the one or more side walls, the plurality of ribs configured to engage the plurality of radiating elements.

Clause 181. The antenna assembly of Clause 180, wherein the plurality of ribs are configured as catch points for the plurality of radiating elements, wherein engagement between one or more of the plurality of ribs and the first cellular radiating element and the second cellular radiating element causes the first cellular radiating element and the second cellular radiating element to move from the first configuration to the second configuration.

Clause 182. The antenna assembly of Clause 180 or Clause 181, wherein the plurality of ribs support the plurality of radiating elements in a desired orientation relative to the internal ground plane.

Clause 183. The antenna assembly of any of Clauses 180-182, wherein at least one of the plurality of ribs comprises a slot, the slot configured to receive and support the WiFi radiating element.

Clause 184. The antenna assembly of any of Clauses 178-183, wherein the plurality of radiating elements extend from the internal ground plane at a substantially orthogonal angle relative to the internal ground plane.

Clause 185. The antenna assembly of any of Clauses 178-184, wherein the first head radiating portion is substantially coplanar to the second head radiating portion.

Clause 186. The antenna assembly of any of Clauses 178-185, wherein the first PCB portion, the second PCB portion, and the third PCB portion are coupled to the internal ground plane.

Clause 187. The antenna assembly of any of Clauses 178-186, further comprising a plurality of magnets, the plurality of magnets housed in the internal ground plane and configured to allow the antenna assembly to be magnetically coupled to an external surface.

Clause 188. The antenna assembly of any of Clauses 178-187, further comprising a GPS antenna, the GPS antenna coupled to the internal ground plane and positioned between the internal ground plane and the cover.

Clause 189. The antenna assembly of any of Clauses 178-188, wherein the first cellular radiating element and the second cellular radiating element are configured for communication between approximately 450 MHz and 8 GHz and the WiFi radiating element is configured for communication between approximately 1 GHz and 8 GHz.

Clause 190. The antenna assembly of any of Clauses 178-189, wherein the first upright radiating portion is substantially orthogonal to the first head radiating portion and the second upright radiating portion is substantially orthogonal to the second head radiating portion.

Clause 191. The antenna assembly of any of Clauses 178-190, wherein the cover comprises one or more support portions extending inwardly from the top wall towards the internal ground plane, the one or more support portions comprising slots configured to receive and support the first head radiating portion and the second head radiating portion.

Clause 192. The antenna assembly of any of Clauses 178-191, wherein the cover and the internal ground plane when coupled define an internal compact volume of less than 30 cubic inches.

Clause 193. The antenna assembly of any of Clauses 178-192, wherein the internal ground plane comprises a plurality of cable clamps configured to mechanically and electrically couple outer conductors of coaxial cables to the internal ground plane.

Clause 194. A method of assembling an antenna assembly, the method comprising: coupling one or more radiating elements in a first configuration to an internal ground plane; and positioning a cover on the internal ground plane, with the one or more radiating elements positioned between the cover and the internal ground plane, wherein positioning the cover on the internal ground plane causes at least a first radiating element of the one or more radiating elements to move to a second configuration, wherein in the first configuration, the first radiating element is substantially flat, wherein in the second configuration, the first radiating element has a three-dimensional shape.

Clause 195. The method of Clause 194, wherein the one or more radiating elements comprise one or more PCB portions, the one or more PCB portions comprising flex circuits.

Clause 196. The method of Clause 194 or Clause 195, wherein the cover comprises a plurality of ribs formed on internal surfaces of one or more side walls of the cover, the plurality of ribs configured to engage the one or more radiating elements.

Clause 197. The method of Clause 196, wherein the plurality of ribs are configured as catch points for the one or more radiating elements, wherein engagement between one or more of the plurality of ribs and the first radiating element causes the first radiating element to move from the first configuration to the second configuration during assembly of the antenna assembly.

Clause 198. The method of Clause 196 or Clause 197, wherein the plurality of ribs support the one or more radiating elements in a desired orientation relative to the internal ground plane.

Clause 199. The method of any of Clauses 196-198, wherein the one or more radiating elements further comprise a second radiating element and a third radiating element.

Clause 200. The method of any of Clause 199, wherein at least one of the plurality of ribs comprises a slot, the slot configured to receive and support the third radiating element.

Clause 201. The method of any of Clauses 194-200, wherein the one or more radiating elements extend from the internal ground plane at a substantially orthogonal angle relative to the internal ground plane.

Clause 202. The method of any of Clauses 199-201, wherein the first radiating element comprising a first upright radiating portion and a first head radiating portion, wherein the second radiating element comprising a second upright radiating portion and a second head radiating portion.

Clause 203. The method of Clause 202, wherein the first head radiating portion is substantially coplanar to the second head radiating portion.

Clause 204. The method of any of Clauses 199-203, wherein the first radiating element and the second radiating element are configured for communication between approximately 450 MHz and 8 GHz and the third radiating element is configured for communication between approximately 1 GHz and 8 GHz.

Clause 205. The method of any of Clauses 202-204, wherein the first upright radiating portion is substantially orthogonal to the first head radiating portion and the second upright radiating portion is substantially orthogonal to the second head radiating portion.

Clause 206. The method of any of Clauses 194-205, wherein the antenna assembly further comprises a plurality of magnets, the plurality of magnets housed in the internal ground plane and configured to allow the antenna assembly to be magnetically coupled to an external surface.

Clause 207. The method of any of Clauses 194-206, further comprising: inserting a GPS antenna into the antenna assembly, the GPS antenna coupled to the internal ground plane and positioned between the cover and the internal ground plane.

Clause 208. The method of any of Clauses 202-207, wherein the cover comprises one or more support portions extending inwardly from a top wall of the cover towards the internal ground plane, the one or more support portions comprising slots configured to receive and support the first head radiating portion and the second head radiating portion.

Clause 209. The method of any of Clauses 194-208, wherein the cover and the internal ground plane when coupled define an internal compact volume of less than 30 cubic inches.

Clause 210. The method of any of Clauses 194-209, wherein the internal ground plane comprises a plurality of cable clamps configured to mechanically and electrically couple outer conductors of coaxial cables to the internal ground plane.

Clause 211. An antenna assembly comprising: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a one or more radiating elements comprising: a first radiating element formed on a first PCB portion, the first radiating element comprising a first upright radiating portion and a first head radiating portion; wherein the first radiating element is configured to move from a first configuration prior to engagement with the cover to a second configuration when the cover is coupled to the internal ground plane, wherein in the first configuration the first upright radiating portion is coplanar to the first head radiating portion, wherein in the second configuration, the first upright radiating portion is at an angle relative to the first head radiating portion.

Clause 212. The antenna assembly of Clause 211, wherein the first PCB portion comprises a flex circuit.

Clause 213. The antenna assembly of Clause 211 or Clause 212, wherein the cover comprises a plurality of ribs formed on internal surfaces of the one or more side walls, the plurality of ribs configured to engage the one or more radiating elements.

Clause 214. The antenna assembly of Clause 213, wherein the plurality of ribs are configured as catch points for the one or more radiating elements, wherein engagement between one or more of the plurality of ribs and the first radiating element causes the first radiating element to move from the first configuration to the second configuration.

Clause 215. The antenna assembly of Clause 213 or Clause 214, wherein the plurality of ribs support the one or more radiating elements in a desired orientation relative to the internal ground plane.

Clause 216. The antenna assembly of any of Clauses 211-215, wherein the one or more radiating elements further comprise a second radiating element formed on a second PCB portion and a third radiating element formed on a third PCB portion, the second radiating element comprising a second upright radiating portion and a second head radiating portion.

Clause 217. The antenna assembly of Clause 216, wherein at least one of the plurality of ribs comprises a slot, the slot configured to receive and support the third radiating element.

Clause 218. The antenna assembly of any of Clauses 211-217, wherein the one or more radiating elements extend from the internal ground plane at a substantially orthogonal angle relative to the internal ground plane.

Clause 219. The antenna assembly of any of Clauses 216-218, wherein the first head radiating portion is substantially coplanar to the second head radiating portion.

Clause 220. The antenna assembly of any of Clauses 216-219, wherein the first PCB portion, the second PCB portion, and the third PCB portion are coupled to the internal ground plane.

Clause 221. The antenna assembly of any of Clauses 211-220, further comprising a plurality of magnets, the plurality of magnets housed in the internal ground plane and configured to allow the antenna assembly to be magnetically coupled to an external surface.

Clause 222. The antenna assembly of any of Clauses 211-221, further comprising a GPS antenna, the GPS antenna coupled to the internal ground plane and positioned between the internal ground plane and the cover.

Clause 223. The antenna assembly of any of Clauses 216-222, wherein the first radiating element and the second radiating element are configured for communication between approximately 450 MHz and 8 GHz and the third radiating element is configured for communication between approximately 1 GHz and 8 GHz.

Clause 224. The antenna assembly of any of Clauses 216-223, wherein the first upright radiating portion is substantially orthogonal to the first head radiating portion and the second upright radiating portion is substantially orthogonal to the second head radiating portion.

Clause 225. The antenna assembly of any of Clauses 216-224, wherein the cover comprises one or more support portions extending inwardly from the top wall towards the internal ground plane, the one or more support portions comprising slots configured to receive and support the first head radiating portion and the second head radiating portion.

Clause 226. The antenna assembly of any of Clauses 211-225, wherein the cover and the internal ground plane when coupled define an internal compact volume of less than 30 cubic inches.

Clause 227. The antenna assembly of any of Clauses 211-226, wherein the internal ground plane comprises a plurality of cable clamps configured to mechanically and electrically couple outer conductors of coaxial cables to the internal ground plane.

Additional Considerations and Terminology

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:

a cover comprising one or more side walls and a top wall;

a base configured to be coupled to the cover to define an internal volume;

an internal ground plane configured to be positioned within the internal volume;

a PCB configured to be positioned above the internal ground plane within the internal volume, the PCB comprising:

a base PCB portion; and a first PCB portion extending from the base PCB portion; and a multi-band antenna positioned between the cover and the internal ground plane, the multi-band antenna comprising one or more radiating elements comprising:

a first radiating element formed on the first PCB portion, the first radiating element comprising a first upright radiating portion and a first head radiating portion;

wherein the first radiating element is configured to move from a first configuration prior to engagement with the cover to a second configuration when the cover is coupled to the base, wherein in the first configuration the first upright radiating portion is coplanar to the first head radiating portion, wherein in the second configuration, the first upright radiating portion is at an angle relative to the first head radiating portion.

2. The antenna assembly of claim 1, wherein the PCB comprises a flex circuit.

3. The antenna assembly of claim 1, wherein the cover comprises a plurality of ribs formed on internal surfaces of the one or more side walls, the plurality of ribs configured to engage the one or more radiating elements.

4. The antenna assembly of claim 3, wherein the plurality of ribs are configured as catch points for the one or more radiating elements, wherein engagement between one or more of the plurality of ribs and the first radiating element causes the first radiating element to move from the first configuration to the second configuration.

5. The antenna assembly of claim 1, wherein the one or more radiating elements further comprise a second radiating element formed on a second PCB portion of the PCB and a third radiating element formed on a third PCB portion of the PCB, the second radiating element comprising a second upright radiating portion and a second head radiating portion.

6. The antenna assembly of claim 5, wherein the first radiating element and the second radiating element are configured for communication between approximately 450 MHz and 8 GHz and the third radiating element is configured for communication between approximately 1 GHz and 8 GHz.

7. The antenna assembly of claim 5, wherein the cover comprises one or more support portions extending inwardly from the top wall towards the base, the one or more support portions comprising slots configured to receive and support the first head radiating portion and the second head radiating portion.

8. The antenna assembly of claim 5, wherein the base PCB portion is coplanar to the first PCB portion, the second PCB portion, and the third PCB portion in the first configuration, wherein the base PCB portion is not-coplanar to the first PCB portion, the second PCB portion, or the third PCB portion in the second configuration.

9. The antenna assembly of claim 5, further comprising a fourth radiating element formed on a fourth PCB portion of the PCB, the fourth radiating element configured for communication between approximately 1 GHz and 8 GHz.

10. The antenna assembly of claim 1, further comprising a plurality of magnets, the plurality of magnets housed in the base and configured to allow the antenna assembly to be magnetically coupled to an external surface.

11. The antenna assembly of claim 1, further comprising a GPS antenna, the GPS antenna coupled to the internal ground plane and positioned within the internal volume.

12. The antenna assembly of claim 1, wherein the internal volume is less than 20 cubic inches.

13. The antenna assembly of claim 1, wherein the internal ground plane is formed on a bottom side of the base PCB portion.

14. The antenna assembly of claim 1, further comprising a supporting substrate, the supporting substrate positioned between the PCB and the internal ground plane.

15. The antenna assembly of claim 1, wherein the multi-band antenna further comprises a plurality of microstrip transmission lines and a plurality of coaxial inputs formed on the base PCB portion, each microstrip transmission line of the plurality of microstrip transmission lines extending between a feeding portion of one radiating element of the one or more radiating elements and one coaxial input of the plurality of coaxial inputs.

16. The antenna assembly of claim 15, further comprising a plurality of coaxial cables, each coaxial cable of the plurality of coaxial cables comprising an outer connector and an inner connector, wherein the outer connectors are configured to be coupled to a bottom side of the internal ground plane, wherein the inner connectors are configured to extend through openings in the internal ground plane and into the plurality of coaxial inputs.

17. The antenna assembly of claim 16, wherein the outer connecters are soldered to the bottom side of the internal ground plane.

18. The antenna assembly of claim 17, wherein the bottom side of the internal ground plane comprises a plurality of heat relief features.

19. The antenna assembly of claim 18, wherein each outer connector is positioned between at least two heat relief features of the plurality of heat relief features, the plurality of heat relief features configured to provide a thermal barrier between adjacent outer connectors.

20. The antenna assembly of claim 19, where each heat relief feature of the plurality of heat relief features comprises a slit extending from the bottom side of the internal ground plane towards a top side of the internal ground plane.

* * * * *